(12) United States Patent
Yamada et al.

(10) Patent No.: US 6,992,842 B2
(45) Date of Patent: Jan. 31, 2006

(54) OPTICAL DEVICE, OPTICAL SYSTEM, METHOD OF PRODUCTION OF SAME, AND MOLD FOR PRODUCTION OF SAME

(75) Inventors: Masahiro Yamada, Kanagawa (JP); Akira Kouchiyama, Kanagawa (JP); Tetsu Watanabe, Tokyo (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 11/103,577

(22) Filed: Apr. 12, 2005

(65) Prior Publication Data

US 2005/0180028 A1 Aug. 18, 2005

Related U.S. Application Data

(60) Continuation of application No. 10/758,182, filed on Jan. 16, 2004, which is a division of application No. 09/842,021, filed on Apr. 26, 2001, now Pat. No. 6,825,995.

(30) Foreign Application Priority Data

| Apr. 27, 2000 | (JP) | ............................ P2000-132897 |
| Jun. 20, 2000 | (JP) | ............................ P2000-189729 |
| Jun. 20, 2000 | (JP) | ............................ P2000-189730 |
| Aug. 16, 2000 | (JP) | ............................ P2000-246934 |

(51) Int. Cl.
*G02B 9/00* (2006.01)

(52) U.S. Cl. ...................... 359/796; 359/741; 359/811

(58) Field of Classification Search ................ 359/796, 359/793–795, 642, 741, 719, 738–740, 808, 359/811

See application file for complete search history.

(56) References Cited

U.S. PATENT DOCUMENTS

| 1,521,563 A | | 12/1924 | Pfleegor ...................... 359/665 |
| 3,532,038 A | | 10/1970 | Rottman ...................... 359/619 |
| 4,304,461 A | * | 12/1981 | Stewart et al. ................ 385/74 |
| 5,781,351 A | * | 7/1998 | Murakami et al. ........... 359/808 |
| 5,867,315 A | | 2/1999 | Koike et al. ................ 359/495 |
| 6,043,940 A | | 3/2000 | Kamiyama et al. ......... 359/719 |
| 6,342,976 B1 | * | 1/2002 | Nomura et al. ............. 359/722 |
| 6,392,819 B1 | * | 5/2002 | Harada ........................ 359/719 |

FOREIGN PATENT DOCUMENTS

| JP | 63 206721 A | 8/1988 |
| JP | 2000-090469 A | 3/2000 |
| WO | WO 97 35811 A | 10/1997 |

* cited by examiner

OTHER PUBLICATIONS

EPO Search Report Dec. 1, 2003.

*Primary Examiner*—Jordan M. Schwartz
(74) *Attorney, Agent, or Firm*—Rader, Fishman & Grauer PLLC; Ronald P. Kananen

(57) ABSTRACT

A first optical device according to the present invention comprises a base made of a first optical material and a second optical material having a refractive index different from that of the first optical material, and the base has a concavity, and the second optical material is filled in this concavity. A second optical device according to the present invention comprises a base made of a first optical material and a second optical material having a refractive index different from the first optical material, and the base comprises first and second faces facing each other, a first concavity is formed in the first face and a second concavity is formed in the second face, and the second optical material is filled in the first and second concavities.

6 Claims, 70 Drawing Sheets

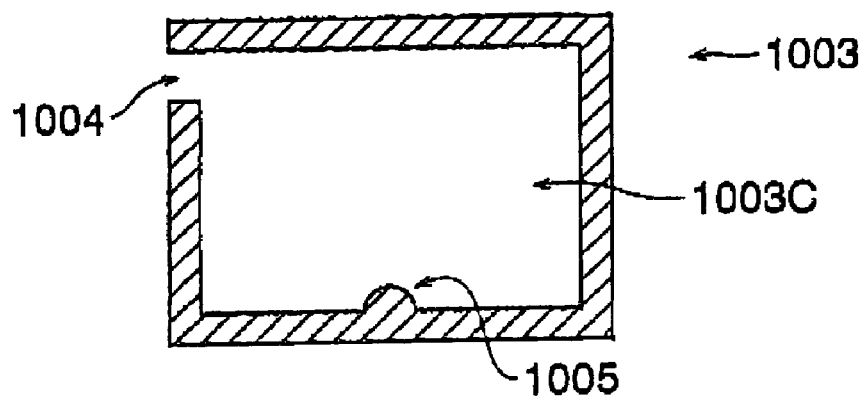
FIG. 2A
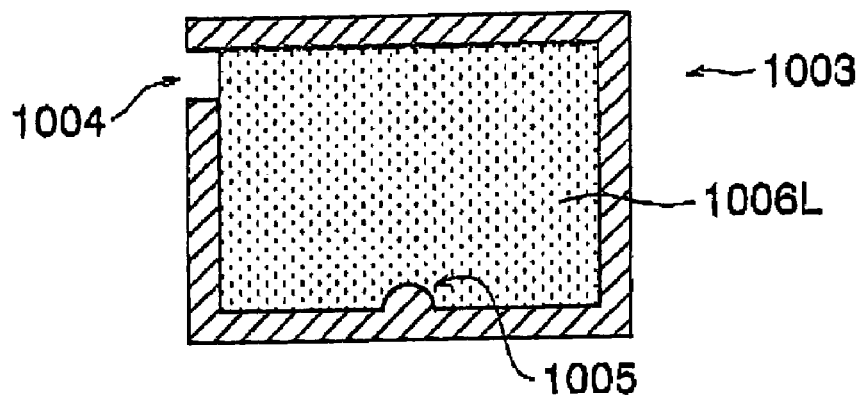
FIG. 2B
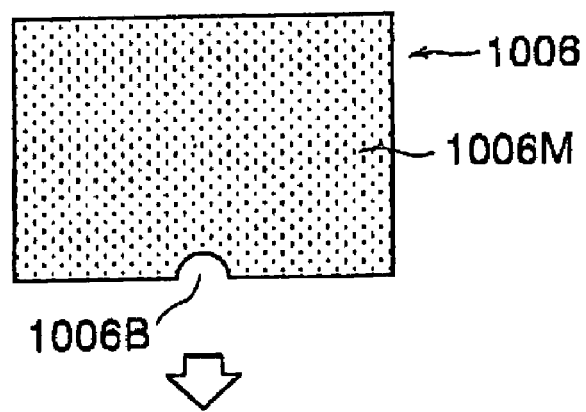
FIG. 2C

FIG. 3D
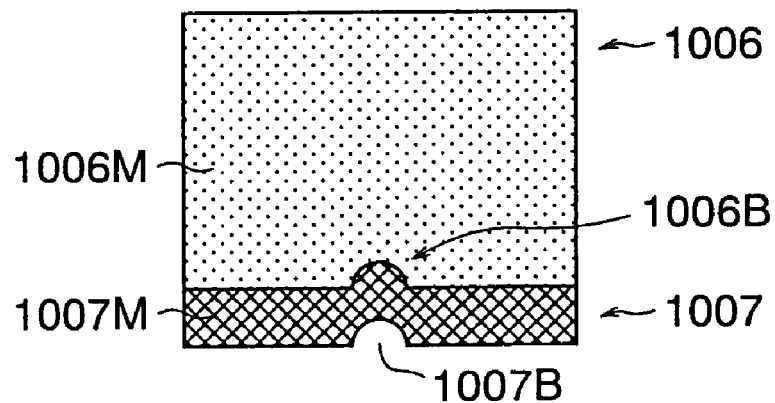
FIG. 3E
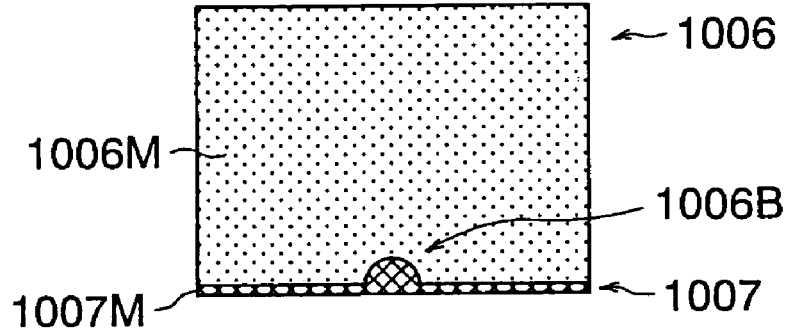

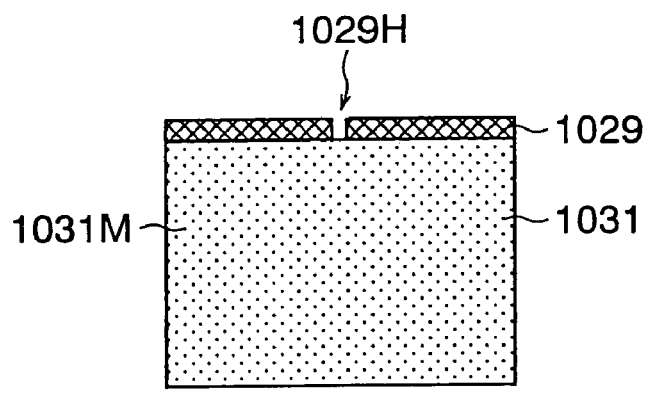
FIG. 8A
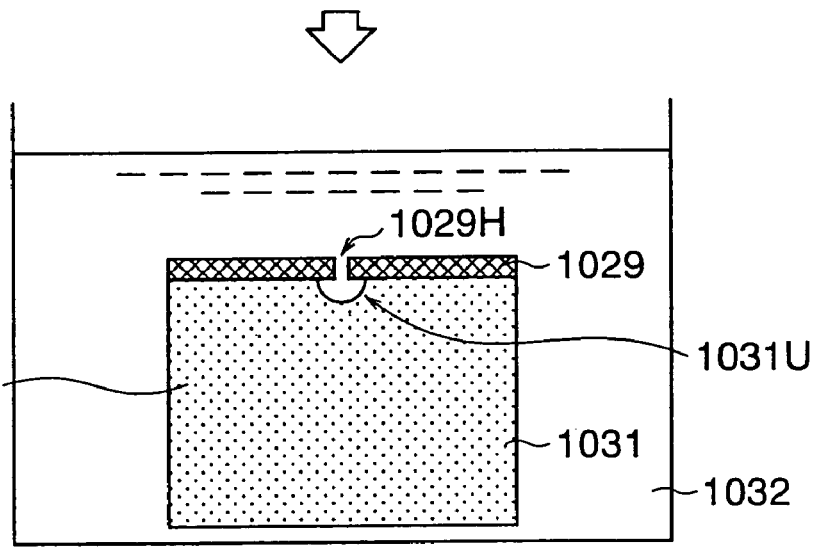
FIG. 8B

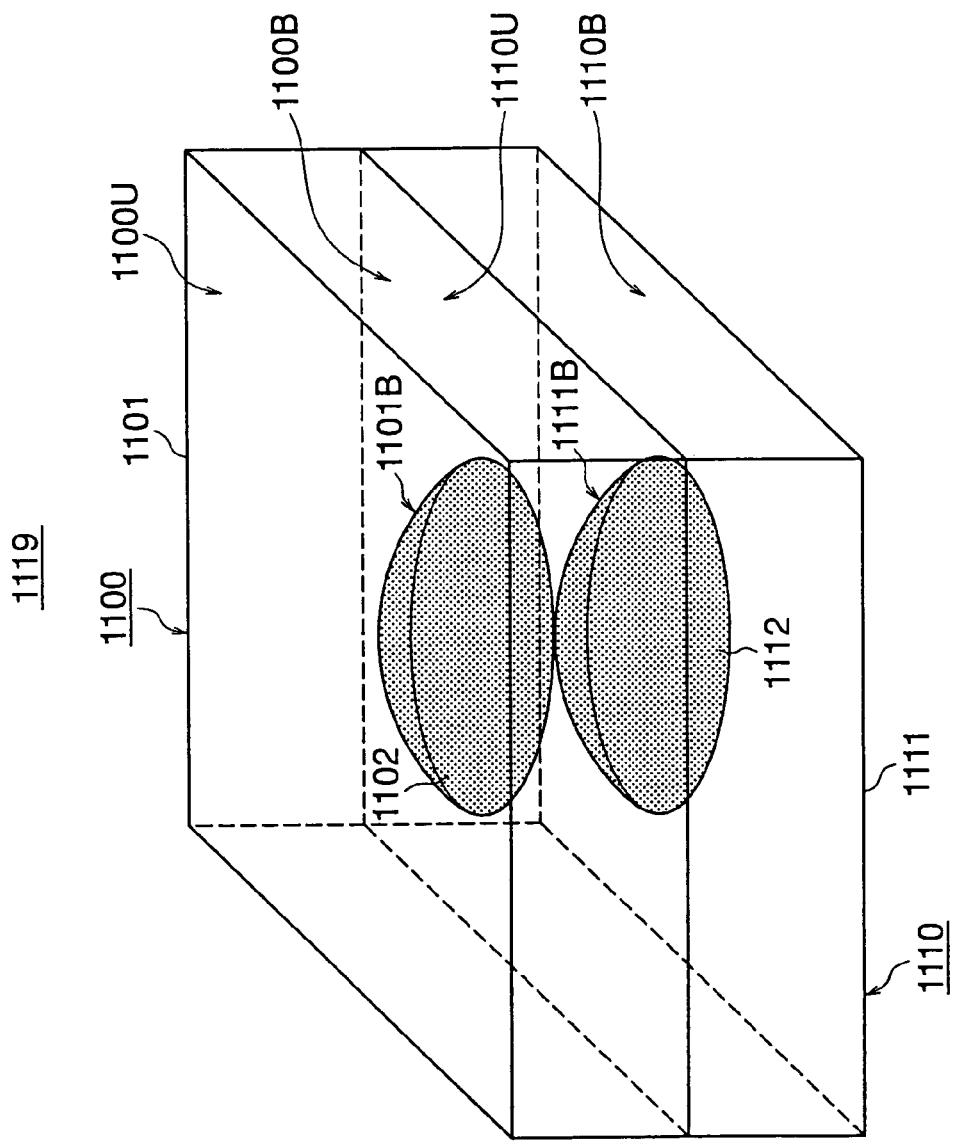

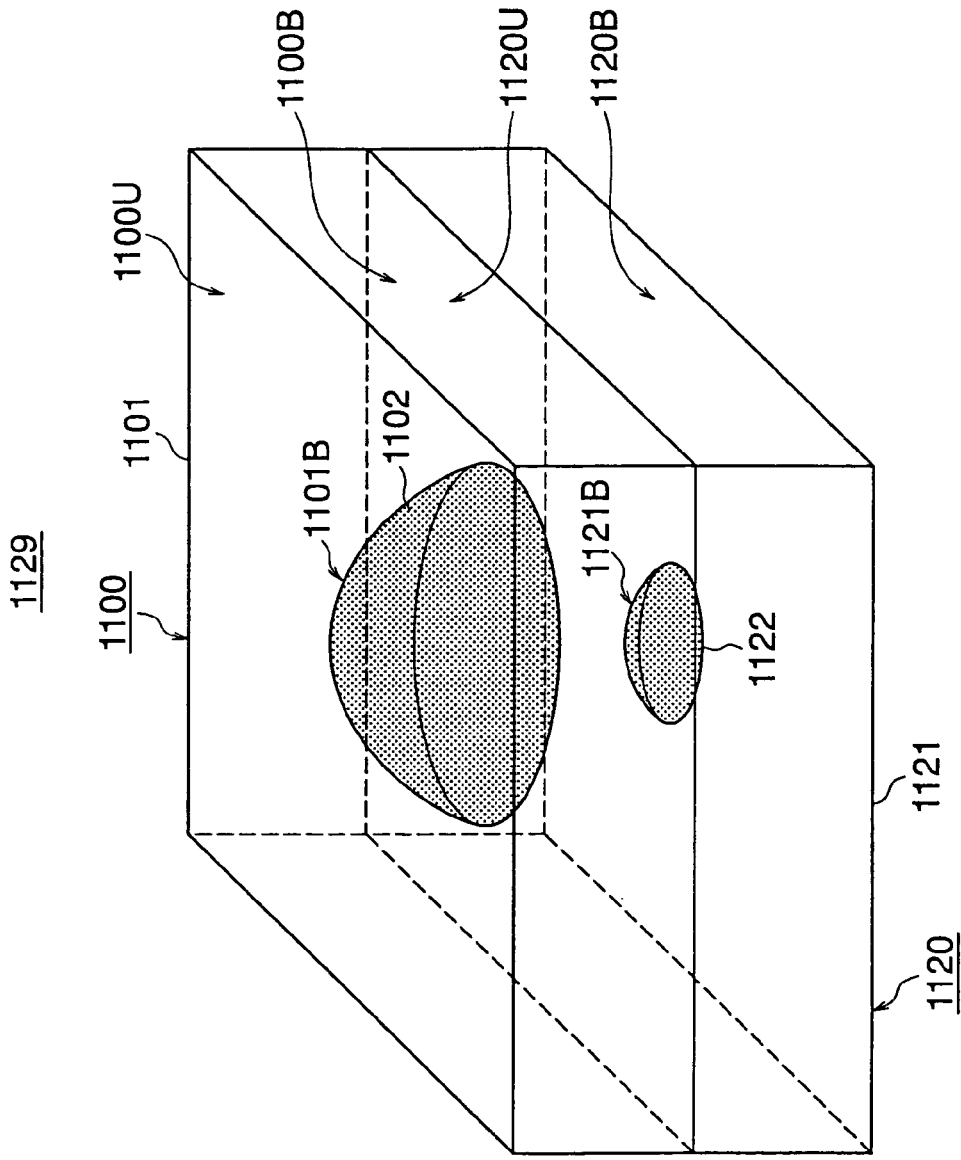

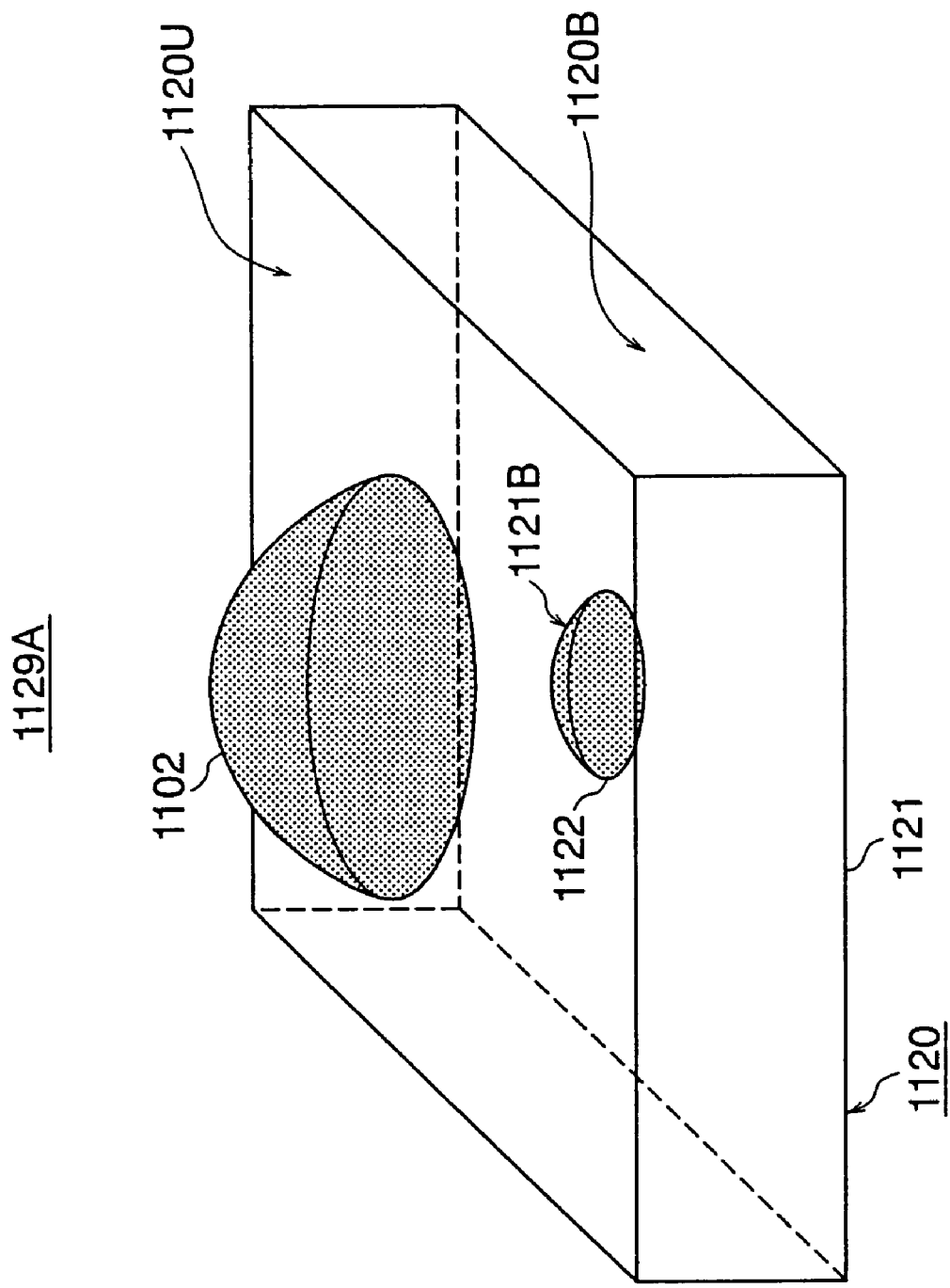

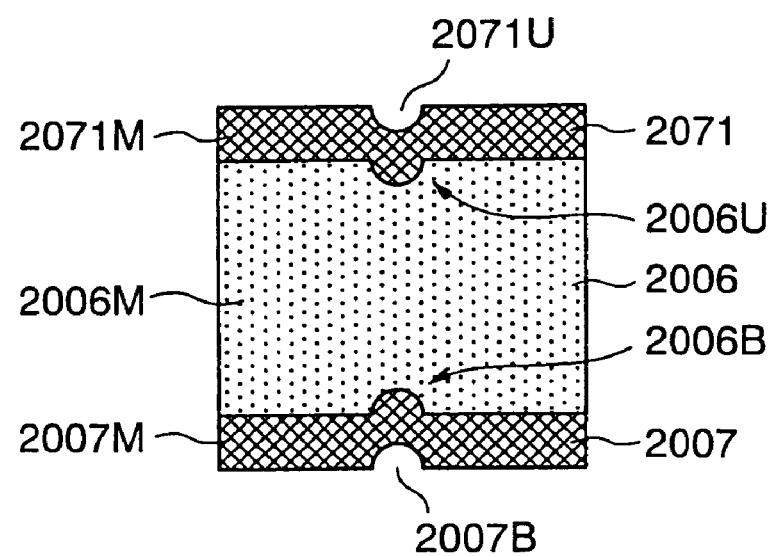
FIG. 27D
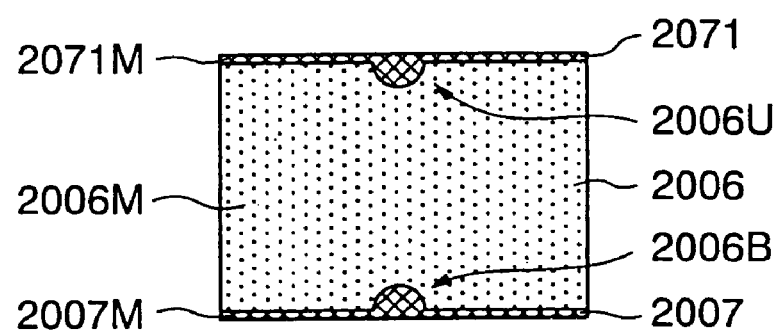
FIG. 27E

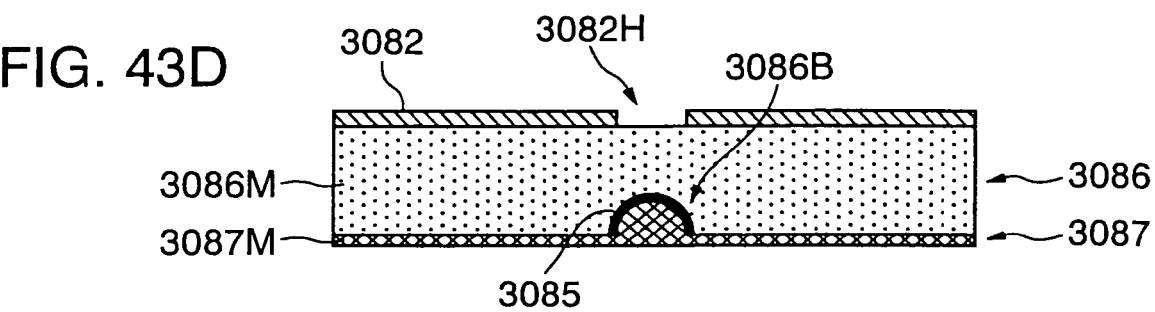
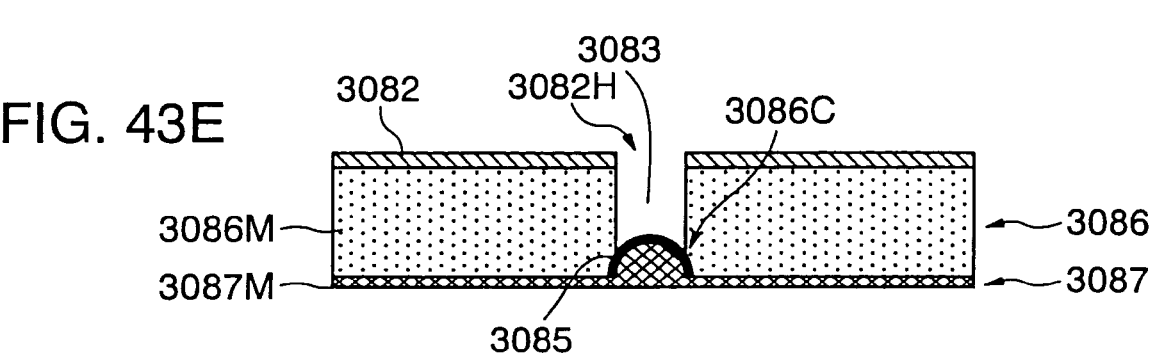
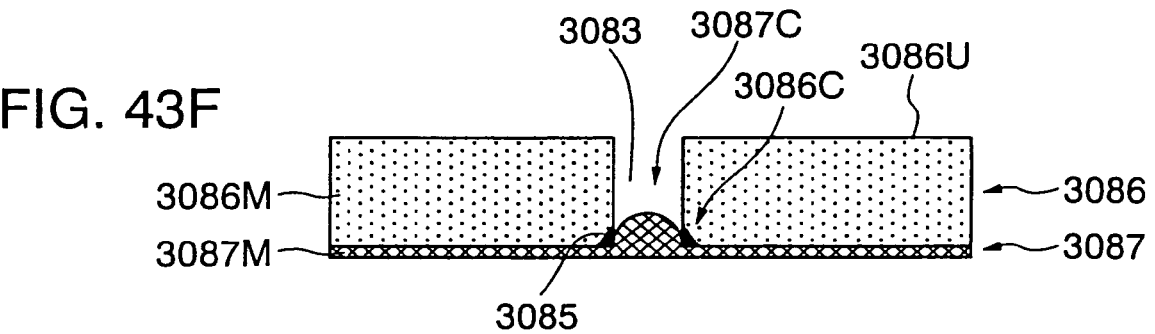

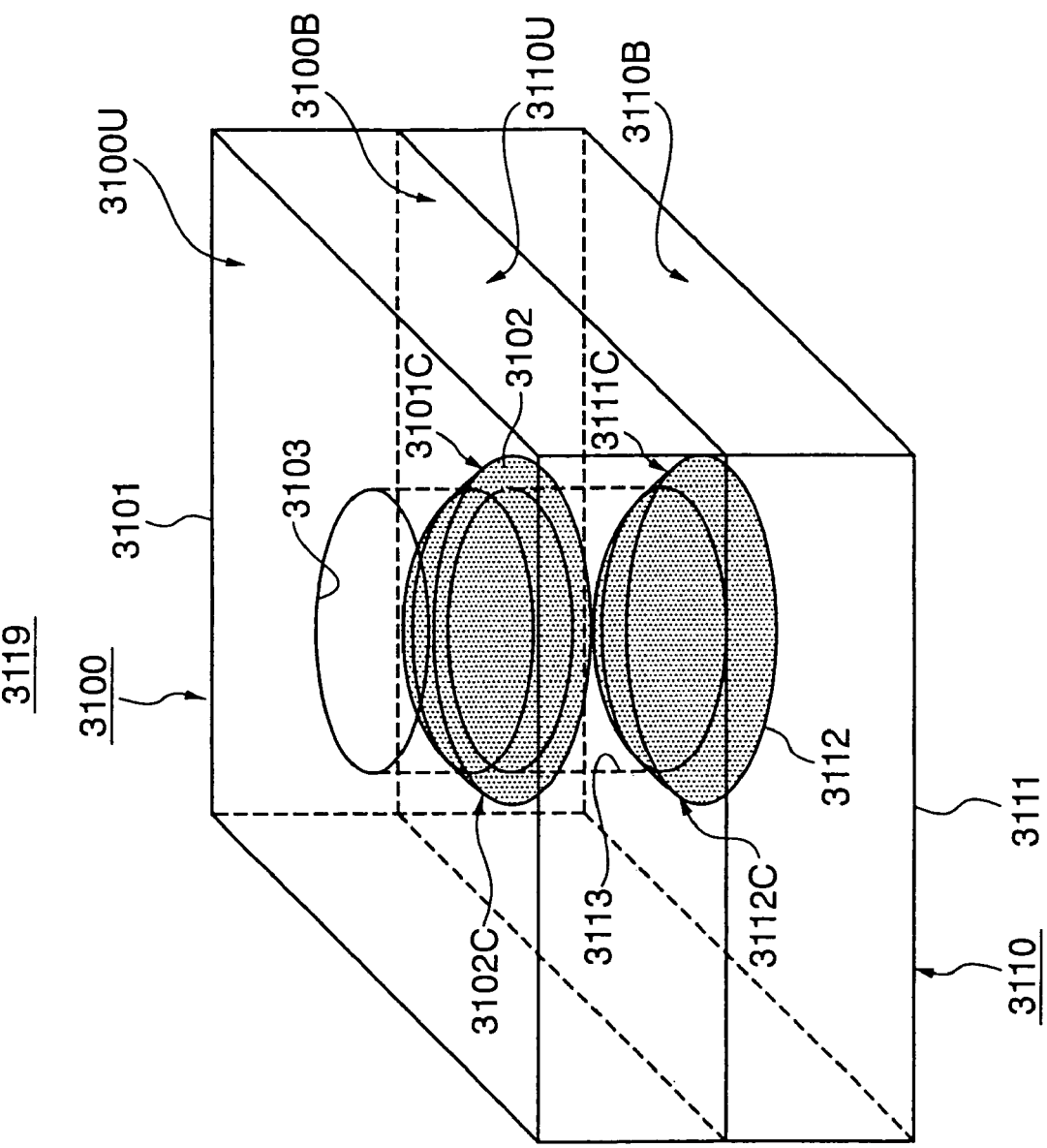

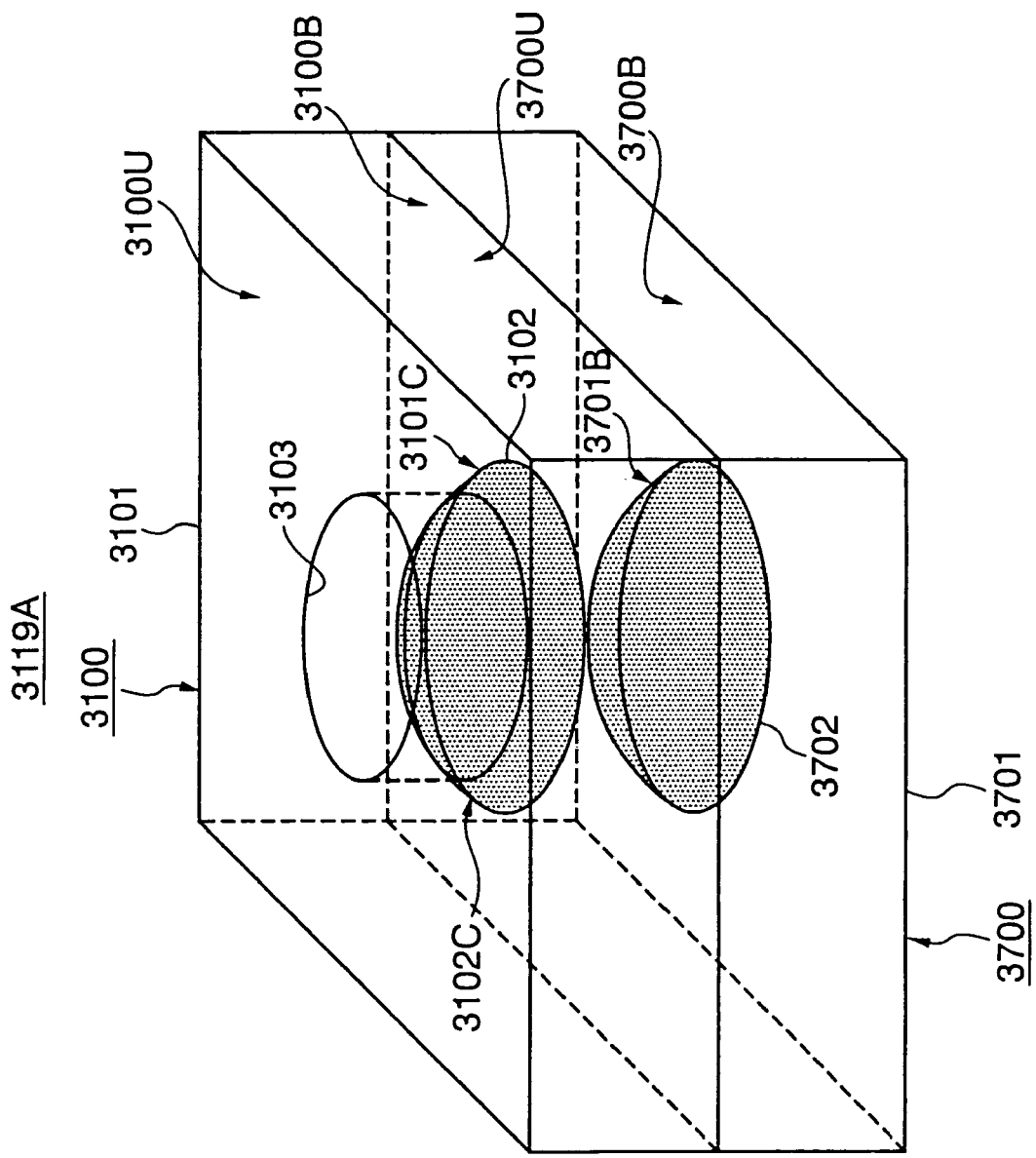

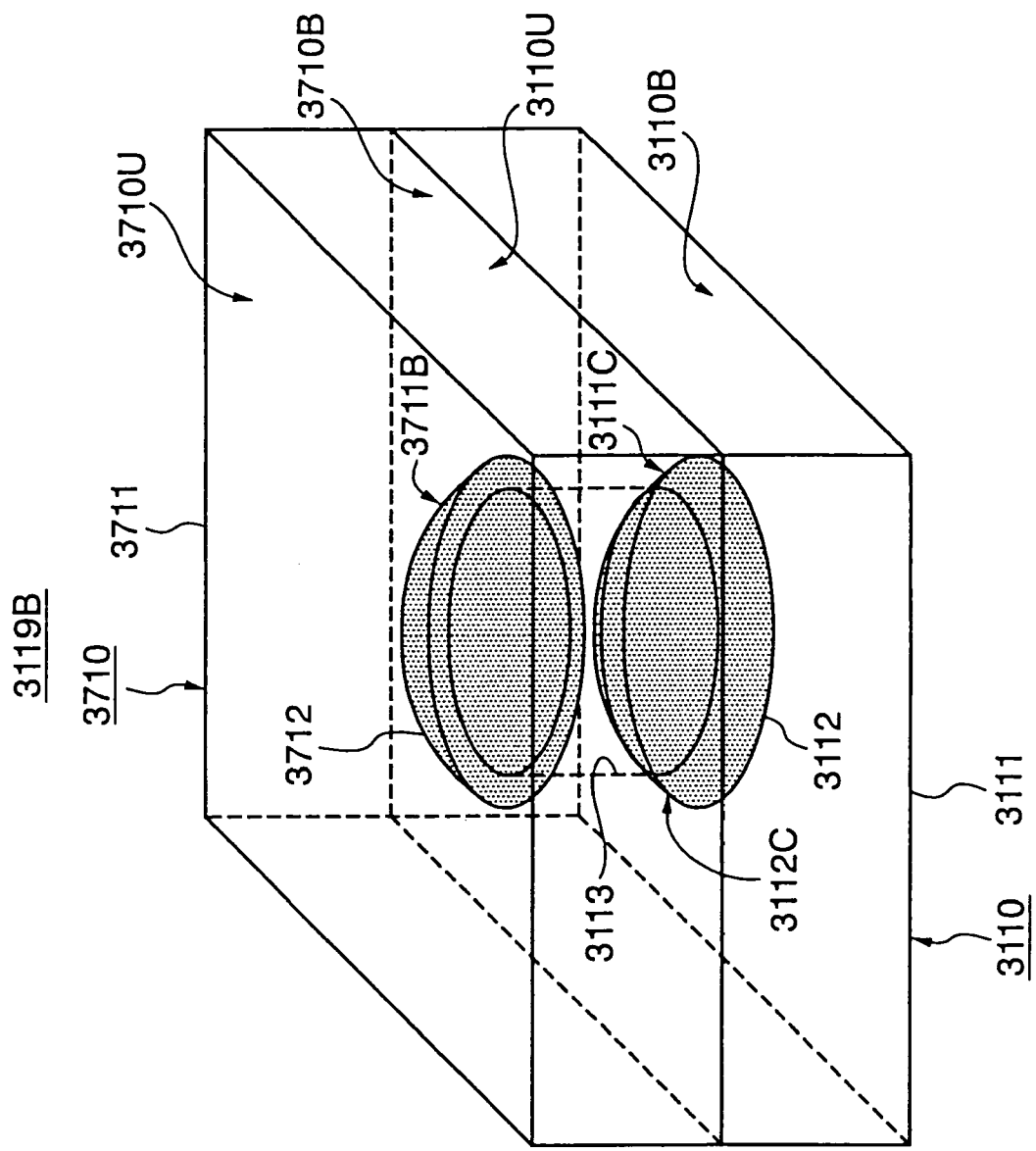

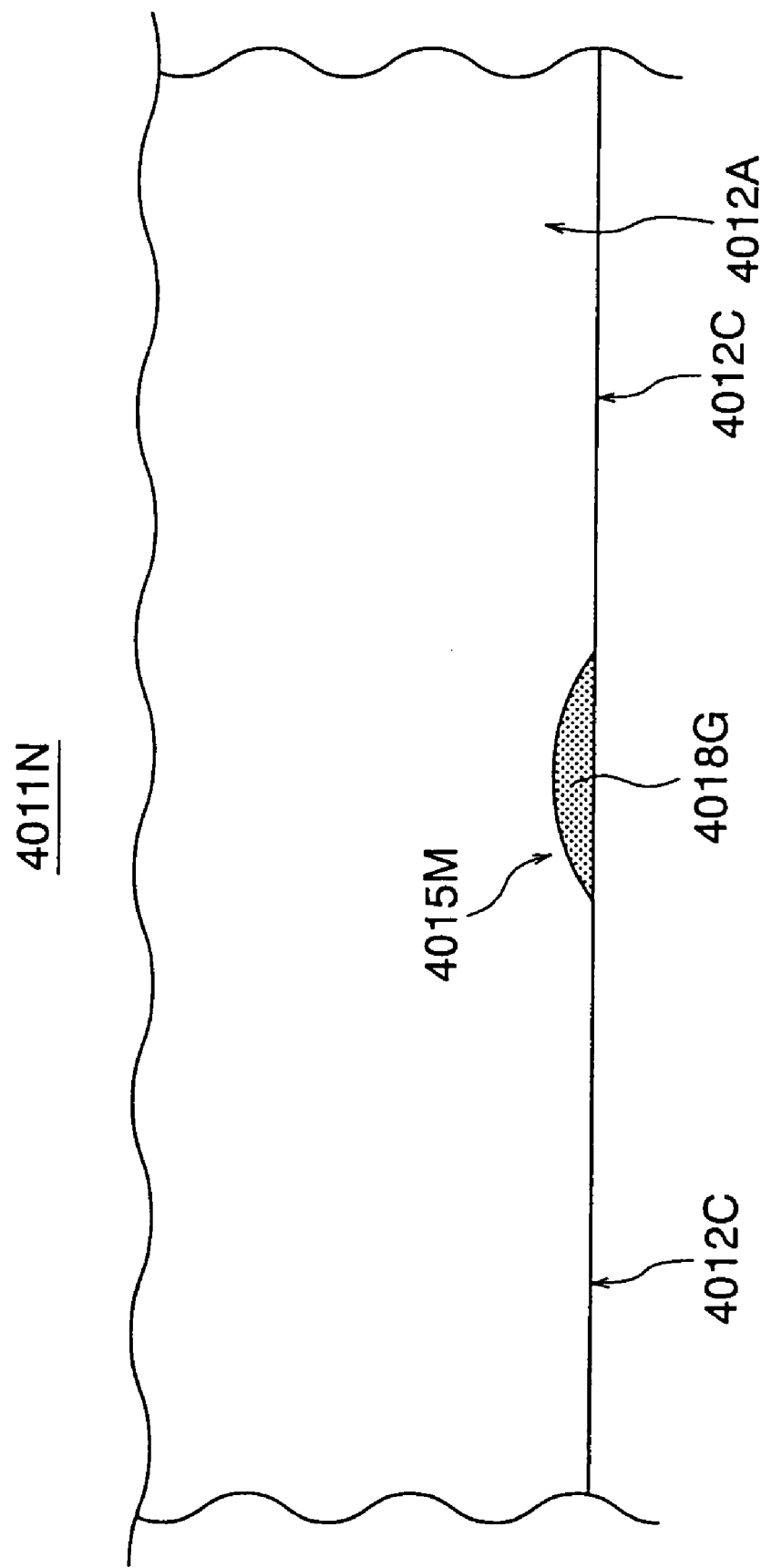

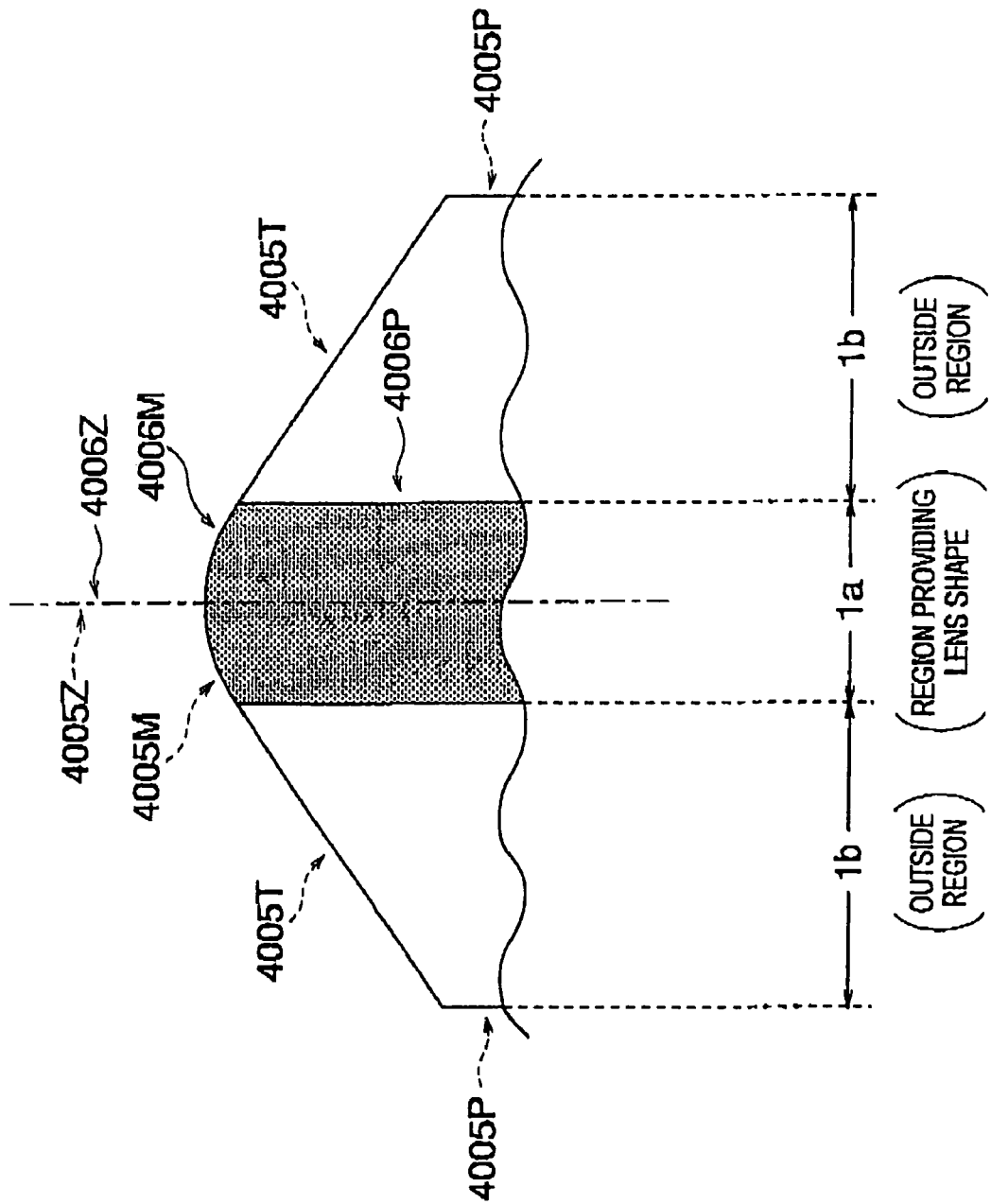

OPTICAL DEVICE, OPTICAL SYSTEM, METHOD OF PRODUCTION OF SAME, AND MOLD FOR PRODUCTION OF SAME

This application is a continuation of prior application Ser. No. 10/758,182, filed Jan. 16, 2004, which is a divisional of application Ser. No. 09/842,021 filed Apr. 26, 2001 and now U.S. Pat. No. 6,825,995 and is hereby incorporated in its entirety by reference.

BACKGROUND OF THE INVENTION

1. Field of the Invention

The present invention relates to an optical device, an optical system a method of production of the optical device, and a mold for production of the optical device.

2. Description of the Related Art

When producing a lens, the following first to third methods of production have been known.

The first method of production is a method of filling an optical material such as molten glass in a metallic mold formed with a cavity of a desired lens shape machined to an intended lens shape to produce a mold lens.

The second method of production is a method of utilizing reactive ion etching (RIE) or other etching and using a photo resist or the like as a mask (etching mask) to etch an optical material to a predetermined shape to thereby produce a lens made of the related optical material.

The third method of production is a method of mechanically polishing a base made of an optical material to the lens shape to produce the lens.

In the conventional first method of production, that is, the method using simple molding, it is difficult to produce a small sized lens having a large numerical aperture (NA), so it is difficult to reduce the lens diameter to 1 mm or less.

In the conventional second method of production, that is, the method using RIE or other etching, there is a problem in that there are restrictions on the optical material and there are a few optical materials of high refractive indexes capable of obtaining lenses having large numerical apertures among the optical materials capable of RIE and other etching, so it is difficult to use a material having a high refractive index and it is difficult to realize a lens having a large numerical aperture NA.

In the conventional third method of production, it is difficult to manufacture a small sized lens.

If increasing the numerical aperture of the lens, it is possible to make the size of a light spot created after passing through the lens small. It is desirable from the viewpoint of increase of the capacity of an optical disc to enlarge the numerical aperture NA of the lens (object lens) of an optical head.

Also, lenses and other optical devices are being used for various optical apparatuses. Reduction of the size of the optical devices is desirable from the viewpoint of the reduction of size of the optical apparatuses such as an optical disc apparatus and an optical pickup.

In order to realize an optical device having a large numerical aperture, a large refractive index of the optical material is effective.

As an optical material having a high refractive index in a region of visible light, there are titanium oxide, tantalum oxide, gallium phosphate (gallium phosphorus), gallium nitride, silicon nitride, etc.

However, it is difficult to machine these materials to small sized lenses having a large numerical aperture in the prior art.

Also, many conventional lenses have irregular shapes. In order to align a plurality of lenses of such irregular shapes, high precision positioning in three-dimensional directions is necessary, so the load of the alignment work is large.

Also, when comprising a flying head (floating head) consisting of an optical head mounted on a swing arm, the optical head can be prepared by separately preparing a slider and the lens and attaching them at a high precision, but in this case, the load of the attachment work and accordingly the load of preparation of the optical head is large.

SUMMARY OF THE INVENTION

An object of the present invention is to provide an optical device having a small size, or a small size and a large numerical aperture.

Another object of the present invention is to provide an optical system comprising the optical device, that is the optical device having a small size, or a small size and a large numerical aperture. Still another object of the present invention is to provide a method of production of an optical device for producing such optical device, that is the optical device having a small size, or a small size and a large numerical aperture.

Further, still another object of the present invention is to provide a mold for production of an optical device for using in such method of the optical device.

According to a first aspect of the present invention, there is provided an optical device comprising a first optical portion made of a first optical material and having a concavity; and a second optical portion comprising a second optical material having a refractive index different from that of the first optical material, and inserted into the concavity.

According to a second aspect of the present invention, there is provided a method of production of an optical device comprising a first optical portion made of a first optical material and having a concavity and a second optical portion comprising a second optical material having a refractive index different from that of the first optical material, and inserted into the concavity, including: a step of injecting the first optical material into a metallic mold formed with a projection projecting out into a cavity to form the first optical portion made of the first optical material with a concavity reproducing the shape of the projection; and a step of filling the second optical portion in the concavity of the molded.

According to a third aspect of the present invention, there is provided a method of production of an optical device comprising a first optical portion made of a first optical material and having a concavity and a second optical portion comprising a second optical material having a refractive index different from that of the first optical material, and inserted into the concavity, including: a step of forming a resist having a hole in the flat surface of the first optical portion made of the first optical material; a step of forming a concavity corresponding to the hole in the first optical portion by etching; a step of removing a resist from the first optical portion with the concavity formed therein; and a step of filling the second optical portion in the concavity of the first optical portion from which the resist is removed.

According to a fourth aspect of the present invention, there is provided a method of production of an optical device comprising a first optical portion made of a first optical material and having a concavity and a second optical portion comprising a second optical material having a refractive index different from that of the first optical material, and inserted into the concavity, including: a step of forming on a third optical portion provided with a projection and having a flat area around the projection the first optical portion made of a layer of the first optical material burying the projection, a step of flattening the surface of the first optical portion to form a flat surface and bonding the related flat surface to a third base material made of a third optical material, a step of removing the third optical portion from the first optical portion bonded to the third base material to expose the concavity reproducing the shape of the projection in the first optical portion, and a step of filling the second optical portion in the concavity of the exposed first optical portion.

According to a fifth aspect of the present invention, there is provided a method for production of an optical device wherein a second optical portion having a refractive index different from a first optical material is filled in a concavity of a first optical portion made of the first optical material, comprising: a step of forming resist films having windows on substantially flat first and second flat surfaces facing each other of a first optical portion made of the first optical material; a step of forming concavities corresponding to the windows in the first and second flat surfaces of the first optical portion by etching; a step of removing the resist films from the first optical portion with the concavities formed therein; and a step of filling the second optical portion in the concavities of the first and second flat surfaces of the first optical portion from which the resist films have been removed.

According to a sixth aspect of the present invention, there is provided a method for production of an optical device wherein a second optical portion having a refractive index different from a first optical material is filled in a concavity of a first optical portion made of the first optical material, comprising: a step of forming on a third optical portion provided with a first projection and having a flat area around the first projection a first optical portion made of a layer of the first optical material burying the first projection; a step of forming on a fourth optical portion provided with a second projection and having a flat area around the second projection a third optical portion made of a layer of the first optical material burying the second projection; a step of flattening the surface of the first optical portion to form a flat surface and bonding the related flat surface to a first flat surface among facing first and second flat surfaces of a fifth optical portion made of a third optical material; a step of flattening the surface of the third optical portion to form a flat surface and bonding the related flat surface to the second flat surface of the fifth optical portion; a step of removing the second and fourth optical portions from the first and third optical portions bonded to the fifth optical portion and exposing concavities with the shapes of the first and second projections transferred thereto in the first and third optical portions; and a step of filling the second optical portion in the concavities of the exposed first and third optical portions.

According to a seventh aspect of the present invention, there is provided an optical device, comprising: a convex lens formed with a convex curved face; and a first optical portion closely contacting the convex curved face of the convex lens, wherein; the first optical portion has first and second faces facing each other, a concave curved face closely contacting the convex curved face being formed in the first face, and a hole communicating with the second face being formed from a deep side of the concave curved face, and part of the convex curved face of the convex lens is exposed in the hole of the first optical portion.

According to a eighth aspect of the present invention, there is provided an optical system comprising first and second optical devices, wherein; the first optical device has a first convex lens formed with a convex curved face and a first optical portion with the convex curved face of the first convex lens bonded thereto; the first optical portion has first and second faces facing each other, a concave curved face closely contacting the convex curved face being formed in the first face, and a hole communicating with the second face being formed from a deep side of the concave curved face; part of the convex curved face of the first convex lens is exposed in the first hole of the first optical portion; the second optical device has a second convex lens with the convex curved face formed thereon and a third optical portion with the convex curved face of the second convex lens bonded thereto; and the third optical portion has third and fourth faces facing each other, a concave curved face closely contacting the convex curved face of the second convex lens being formed in the third face, and the first and second optical devices being bonded so that the optical axes of the first and second convex lenses coincide or substantially coincide.

According to a ninth aspect of the present invention, there is provided a method for production of an optical device having a convex lens and a first optical portion closely contacting the convex curved face of this convex lens, comprising: a step of using a metallic mold formed with a projection projecting out into a cavity to mold a first optical portion formed with a concavity reproducing the shape of the projection; a step of filling an optical material in the concavity of the molded optical portion; a step of flattening the surface of the optical material filled in the concavity to form the convex lens; and a step of forming a hole so that part of the convex curved face closely contacting the concavity in the convex lens is exposed in the first optical portion.

According to a tenth aspect of the present invention, there is provided a method for production of an optical device having a convex lens and a first optical portion closely contacting the convex curved face of this convex lens, comprising: a step of forming a first resist film having a first window in the flat surface of the first optical portion; a step of forming a concavity corresponding to the first window in the first optical portion by etching; a step of removing the first resist film from the first optical portion formed with the concavity; a step of filling an optical material in the concavity of the first optical portion from which the first resist film is removed; a step of flattening the surface of the optical material filled in the concavity to form the convex lens; and a step of forming a hole whereby part of the convex curved face closely contacting the concavity in the convex lens is exposed in the first optical portion.

According to a eleventh aspect of the present invention, there is provided a method for production of an optical device having a convex lens and a first optical portion closely contacting the convex curved face of this convex lens, comprising: a step of forming on a third optical portion provided with a projection and having a flat area around the projection a first optical portion made of a layer burying the projection; a step of flattening the surface of the first optical portion to form a flat surface and bonding the related flat surface to a third optical portion; a step of removing the third optical portion from the first optical portion bonded to the third optical portion to expose the concavity with the shape of the projection transferred thereto in the first optical portion; a step of filling an optical material in the exposed concavity of the first optical portion; a step of flattening the surface of the optical material filled in the concavity to form the convex lens; and a step of forming holes whereby part of the convex curved face closely contacting the concavity in the convex lens is exposed in the first and third optical portions.

According to a twelfth aspect of the present invention, there is provided an optical device obtained by forming a concavity by a pin in optical material in a molten state or softened state, hardening the optical material with the related concavity formed therein, and polishing or grinding a face where the concavity is formed so that a hole of a front end of the concavity remains in a first optical portion obtained thereby.

According to a thirteenth aspect of the present invention, there is provided a metallic mold for production of an optical device made of an optical material, comprising a cavity into which an optical material in a molten state or softened state is filled and a pin for forming a concavity in the optical material in the molten state or softened state in the cavity, wherein the pin projects out into the cavity while penetrating through a wall of the cavity from the outside.

According to a fourteenth aspect of the present invention, there is provided a metallic mold for production of an optical device as set forth in claim 119, wherein the hole of the front end of the concavity has a spherical or substantially spherical shape.

According to a fifteenth aspect of the present invention, there is provided a method for producing an optical device by using a metallic mold having a cavity into which an optical material in a molten state or softened state is to be filled and a pin for forming a concavity in the optical material in the molten state or softened state in the cavity, wherein the pin penetrates through the wall of the cavity from the outside and projects out into the cavity, comprising: a step of filling the optical material in the molten state or softened state in the cavity to create a first optical portion formed with the concavity by a simple molding; and a step of polishing or grinding the face of the first optical portion where the concavity is formed so that a hole of a front end of the concavity remains.

According to a sixteenth aspect of the present invention, there is provided a method for producing an optical device by using a metallic mold having a cavity into which an optical material in a molten state or softened state is to be filled and a pin for forming a concavity in the optical material in the molten state or softened state in the cavity, wherein the pin penetrates through the wall of the cavity from the outside and projects out into the cavity, comprising: a step of filling the optical material in the molten state or softened state in the cavity to create a first optical portion formed with the concavity by simple molding; a step of filling an optical material having a refractive index different from that of the first optical portion in the concavity of the first optical portion; and a step of flattening the surface of the optical material filled in the concavity to form a convex lens made of the related optical material.

According to a seventeenth aspect of the present invention, there is provided A method of production of an optical device, comprising: a step of forming a concavity by a pin in an optical material in a molten state or softened state and a step of polishing or grinding the face where the concavity is formed so that a hole of a front end of the concavity remains in a first optical portion obtained by hardening the optical material formed with the related concavity.

BRIEF DESCRIPTION OF THE DRAWINGS

These and other objects and features of the present invention will become clearer from the following description of the preferred embodiments given with reference to the accompanying drawings, in which:

FIGS. 2A to 2C are schematic explanatory views of a first embodiment of a method of production of the first optical device according to the present invention;

FIGS. 3D and 3E are schematic explanatory views of the first embodiment of the method of production of the first optical device according to the present invention continued from FIG. 2C;

FIGS. 8A and 8B are schematic explanatory views of a fourth embodiment of the method of production of the first optical device according to the present invention;

FIG. 12 is a schematic view of the configuration of a first embodiment of an optical system using the first optical device according to the present invention;

FIG. 13 is a schematic view of the configuration of a second embodiment of an optical system using the first optical device according to the present invention;

FIG. 14 is a schematic view of the configuration of a third embodiment of an optical system using the first optical device according to the present invention;

FIGS. 27D to 27E are schematic explanatory views of the first embodiment of the method of production of the second optical device according to the present invention continued from FIG. 26C;

FIGS. 43D to 43F are schematic explanatory views of the sixth embodiment of the method of production of the third optical device according to the present invention continuing from FIG. 42C;

FIG. 44 is a schematic view of the configuration of a first embodiment of an optical system using the third optical device according to the present invention;

FIG. 45 is a schematic view of the configuration of a second embodiment of an optical system using the third optical devices according to the present invention;

FIG. 46 is a schematic view of the configuration of a third embodiment of an optical system using the third optical device according to the present invention;

FIG. 68 is an enlarged view of the hole of the optical device shown in FIG. 67;

FIG. 70 is an explanatory view comparing shapes of projections of the metallic mold pins shown in FIGS. 69A and 69B.

DESCRIPTION OF THE PREFERRED EMBODIMENTS

Preferred embodiments of the present invention will be explained by referring to the attached drawings.

First Embodiment of Optical Device (First Optical Device)

Figure 1:
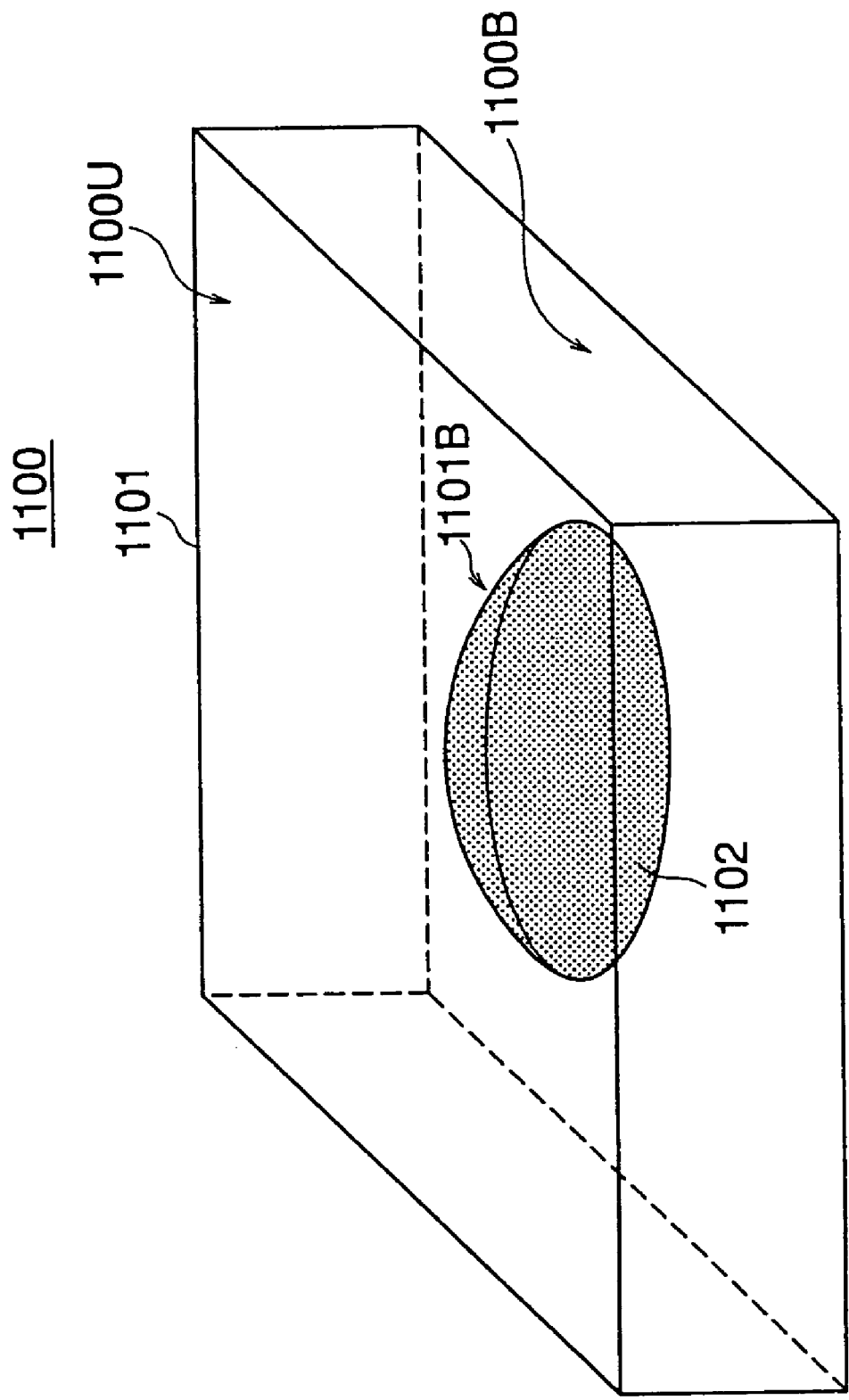
FIG. 1 is a schematic view of the configuration of a first embodiment of an optical device according to the present invention.

FIG. 1 is a schematic view of a first embodiment of an optical device according to the present invention.

This optical device 1100 has a parallelopiped or approximately parallelopiped shape. The optical device 1100 has a base (substrate) 1101 and a lens 1102.

The base 1101 and the lens 1102 of the optical device 1100 have different refractive indexes. Light can be refracted at the boundary of the base 1101 and the lens 1102. For example, when light is made to enter an upper face 1100U of the base 1101, the light emitted from a bottom face 1100B can be converged (collected) or scattered by the lens 1102 or can be changed to a parallel beam.

The base 1101 has a rotationally symmetric or approximately rotationally symmetric concavity 1101B in the bottom face of the base 1101. The shape of the surface of the concavity 1101B when the concavity 1101B is cut along its symmetric axis is preferably made an arc or approximately an arc.

The concavity 1101B is filled with an optical material having a refractive index different from the base 1101. The lens 1102 is comprised by the concavity 1101B filled with that optical material.

The bottom face of the lens 1102 is flat or approximately flat and is parallel or approximately parallel to the upper face 1100U of the optical device 1100 (or the upper face of the base 1101). Also, the flat faces of the bottom face of the lens 1102 and the bottom face of the base 1101 are parallel or approximately parallel and are preferably located in the identical plane. In FIG. 1, the flat faces of the bottom face of the lens 1102 and the bottom face of the base 1101 comprise the bottom face 1100B of the optical device 1100.

When the material of the base 1101 is made for example quartz, and the material of the lens 1102 is made for example silicon nitride, the lens 1102 has a larger refractive index than the base 1101, so the function of a convex lens can be imparted to the lens 1102.

Conversely, when the material of the base 1101 is made for example silicon nitride, and the material of the lens 1102 is made for example quartz, the lens 1102 has a smaller refractive index than the base 1101, so the function of a concave lens can be imparted to the lens 1102.

First Embodiment of Method of Production of First Optical Device

FIGS. 2A to 3E are schematic explanatory views of a first embodiment of a method of production of the first optical device according to the present invention. By this method of production, it is possible to obtain an optical device having an identical structure or approximately identical structure to the optical device 1100 of FIG. 1.

FIGS. 2A to 2C shows a metallic mold 1003. This metallic mold 1003 is formed with a passageway 1004 through which a liquid-like or fluid-like optical material 1006L passes and a cavity 1003C. Also, a bottom portion of the metallic mold 1003 is formed with a projection 1005 projecting out into the cavity 1003C. The area around the projection 1005 is flat.

The projection 1005 has an identical shape to the lens 1102 of the optical device 1100 of FIG. 1 and has a rotationally symmetric or approximately rotationally symmetric shape.

In FIG. 2B, the optical material 1006L is injected into the cavity 1003C from the passageway 1004 of the metallic mold 1003 to fill the optical material 1006 in the cavity 1003C. The optical material 1006L injected is made for example molten quartz, a plastic, a synthetic resin, etc.

In FIG. 2C, the liquid-like optical material 1006L is made to hardened to a solid optical material 1006M, and a base 1006 made of the optical material 1006M is taken out from the metallic mold 1003. The concavity 1006B is formed with the shape of the projection 1005 transferred to the bottom portion of the base 1006 taken out from the metallic mold 1003. The area around the concavity 1006B of the base 1006 is flat.

In FIG. 3D, an optical material 1007M is filled in the concavity 1006B of the bottom portion of the optical material 1006. The optical material 1007M has a refractive index different from the optical material 1006, preferably has a larger refractive index than the optical material 1006, and is made silicon nitride as an example.

For example, the optical material 1007M is filled in the concavity 1006B of the base 1006 by forming a layer 1007 of the optical material 1007M on the bottom portion of the base 1006 by sputtering or vapor deposition. In this case, a concavity 1007B corresponding to the concavity 1006B is formed in the layer 1007.

In FIG. 3E, the bottom face of the layer 1007 is flattened. For example, it is polished so that the concavity 1007B of the bottom face of the layer 1007 disappears. Preferably, the bottom face of the layer 1007 is polished so that a flat face vertical with respect to the symmetry axis of the concavity 1006B of the base 1006 is formed. Alternatively, the layer 1007 is polished so that the flat face of the area around the the concavity 1006B of the base 1006 and the bottom face of the layer 1007 become parallel or approximately parallel.

By polishing the layer 1007 so that the flat face at the area around the concavity 1006B of the base 1006 is exposed and further polishing the upper face of the base 1006 so as to become parallel or approximately parallel with respect to the flat face of the flattened layer 1007, it is possible to obtain an optical device having the same structure as that of the optical device 1100 of FIG. 1.

Since the bottom portion of the metallic mold 1003 has the projection 1005 projecting out into the cavity 1003C, the processing precision can be improved in comparison with a case of forming a concavity sunk into the cavity 1003C and forming a convex lens by simple molding. In this way, by using the metallic mold 1003, it is possible to prepare a small sized convex lens having a higher processing precision than a convex lens obtained by simple molding.

Note that it is also possible to mold the lens by using an upper mold and a lower mold in place of the metallic mold shown in FIGS. 2A and 2B. The projection is formed at the bottom portion of the lower mold, and the area around the this projection is flat. This projection is identical to the projection 1005 of FIGS. 2 and 2B.

First, by injecting an optical material (for example a glass material) into the cavity between the upper mold and the lower mold and simultaneously heating the glass material, the lower mold, and the upper mold to a predetermined temperature, the glass material is softened. Then, the softened glass material is pressed by the upper mold.

Next, the glass material, the lower mold, and the upper mold are cooled to cause the glass material to harden and the base 1006 is taken out from the metallic molds. The concavity 1006B is formed with the shape of the projection at the bottom portion of the lower mold transferred to the bottom portion of this base 1006 taken out from the metallic molds.

In this way, it is also possible to obtain the base 1006 shown in FIG. 2C.

Second Embodiment of Method of Production of First Optical Device

FIGS. 4A to 5H are schematic explanatory views of a second embodiment of the method of production of the first optical device according to the present invention. By this method of production, it is possible to obtain an optical device having the identical configuration or approximately identical configuration to the optical device 1100 of FIG. 1.

Figure 4A:
FIGS. 4A to 4E are schematic explanatory views of a second embodiment of the method of production of the first optical device according to the present invention.

In FIG. 4A, a resist 1009 is formed on the flat face of a silicon substrate 1008—an example of the base. The size of the bottom face of the resist 1009 is made identical or approximately identical to the size of the bottom face of the lens 1102 in FIG. 1.

Figure 4B:
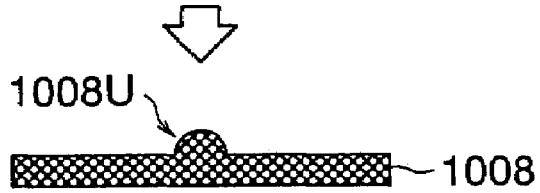

In FIG. 4B, the resist 1009 is used as a mask to etch the surface of the silicon substrate 1008 to form the projection 1008U. The shape of the projection 1008U is identical to the shape of the lens 1102 and is a rotationally symmetric or approximately rotationally symmetric shape. For the etching, use is made of for example ion milling, RIE, or the like. Note that, in FIG. 4B, it is also possible to etch utilizing an undercut.

Figure 4C:
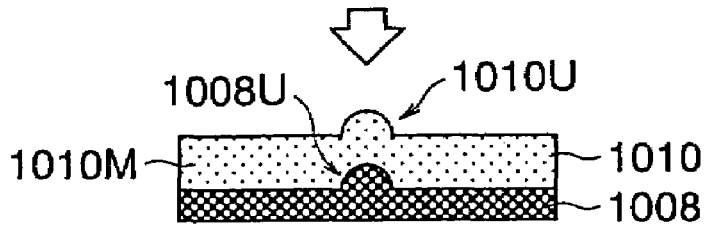

In FIG. 4C, an optical material 1010M is laminated on the surface of the silicon substrate 1008 where the projection 1008U is formed so as to bury the projection 1008U and thereby form a base made of a layer 1010 of the optical material 1010M. It is also possible to form the layer 1010 by for example sputtering or vapor deposition.

When the layer 1010 is formed on the silicon substrate 1008, a projection 1010U corresponding to the projection 1008U is formed on the upper face of the layer 1010.

Figure 4D:
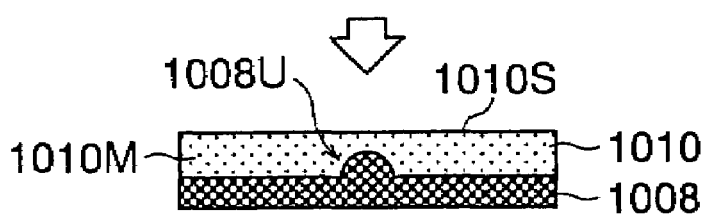

In FIG. 4D, the upper face of the layer 1010 is flattened. For example, it is polished so that the projection 1010U of the upper face of the layer 1010 disappears. Preferably, the upper face of the layer 1010 is polished so that a flat face vertical with respect to the symmetry axis of the projection 1008U of the silicon substrate 1008 is formed. Alternatively, the layer 1010 is polished so that the flat face at the area around the projection 1008U of the silicon substrate 1008 and the upper face of the layer 1010 become parallel or approximately parallel.

Figure 4E:
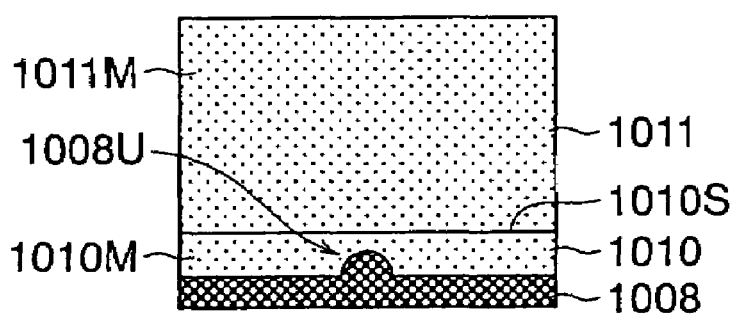

In FIG. 4E, the flat face of a base 1011 made of an optical material 1011M is bonded to a flattened upper face 1101S of the layer 1010. As the bonding method, for example, it is possible to bond by a transparent adhesive or possible to bond by anodic bonding. The optical material 1011M is preferably made the same material as the optical material 1010M.

Figure 5F:
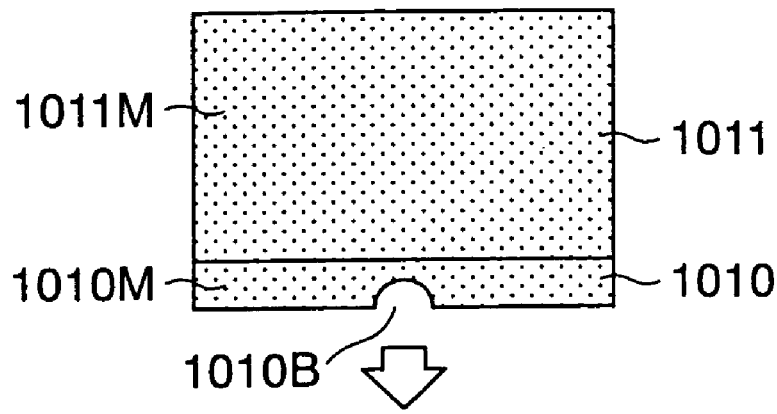
FIGS. 5F to 5H are schematic explanatory views of the second embodiment of the method of production of the first optical device according to the present invention continued from FIG. 4E.

In FIG. 5F, the silicon substrate 1008 bonded to the bottom face of the layer 1010 of FIG. 4E is removed to expose the bottom face of the layer 1010. It is also possible to dissolve the silicon substrate 1008 by, for example, an aqueous solution of potassium hydroxide to remove it.

The shape of the projection 1008U of the silicon substrate 1008 is transferred to the bottom face of the layer 1010, whereby a concavity 1010B corresponding to the projection 1008U is formed.

Figure 5G:
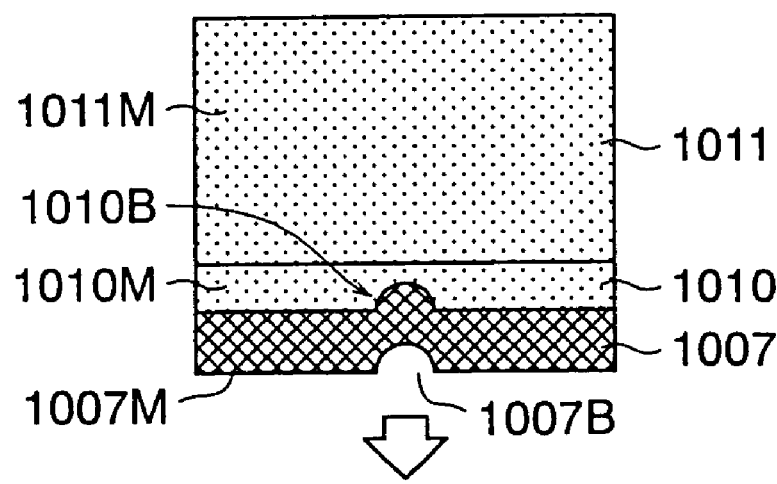

In FIG. 5G, the optical material 1007M is filled in the concavity 1010B of the bottom face of the layer 1010. The optical material 1007M has a refractive index different from the optical material 1010M, preferably has a larger refractive index than the optical material 1010M. Silicon nitride is used as an example.

For example, a layer 1007 of the optical material 1007M is formed on the bottom face of the layer 1010 by sputtering or vapor deposition to fill the optical material 1007M in the concavity 1010B of the layer 1010. In this case, a concavity 1007B corresponding to the concavity 1010B is formed in the layer 1007.

Figure 5H:
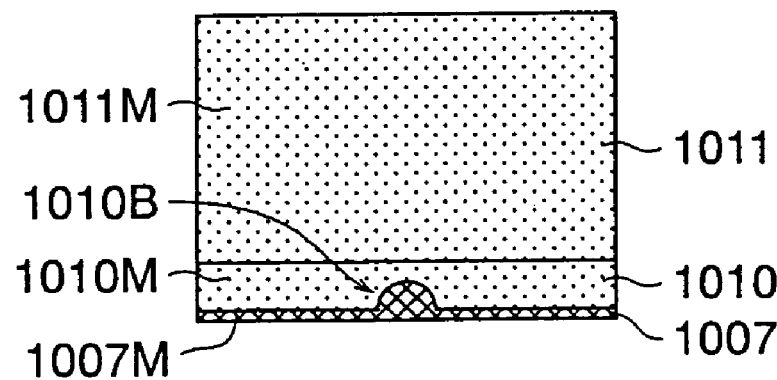

In FIG. 5H, the bottom face of the layer 1007 is flattened. For example, it is polished so that the concavity 1007B of the bottom face of the layer 1007 disappears. Preferably, the bottom face of the layer 1007 is polished so that a flat face vertical with respect to the symmetry axis of the concavity 1010B of the layer 1010 is formed. Alternatively, the layer 1007 is polished so that the flat face at the area around the concavity 1010B of the layer 1010 and the bottom face of the layer 1007 become parallel or approximately parallel.

By polishing the layer 1007 so that the flat face at the area around the concavity 1010B of the layer 1010 is exposed and further polishing the upper face of the base 1011 so as to become parallel or approximately parallel with respect to the polished face of the layer 1007 or by removing the base 11, it is possible to obtain an optical device having an identical configuration or approximately identical configuration to the optical device 1100 of FIG. 1.

Third Embodiment of Method of Production of First Optical Device

FIGS. 6A to 7G are schematic explanatory views of a third embodiment of the method of production of the first optical device according to the present invention. By this method of production, it is possible to obtain an optical device having an identical configuration or approximately identical configuration to the optical device 1100 of FIG. 1.

Figure 6A:
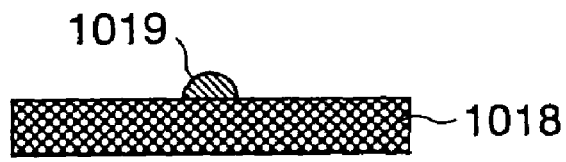
FIGS. 6A to 6D are schematic explanatory views of a third embodiment of the method of production of the first optical device according to the present invention.

In FIG. 6A, a resist 1019 is formed at the flat face of a silicon substrate 1018—an example of the base. The size of the bottom face of the resist 1019 is made identical to the size of the bottom face of the lens 1102 in FIG. 1.

Figure 6B:
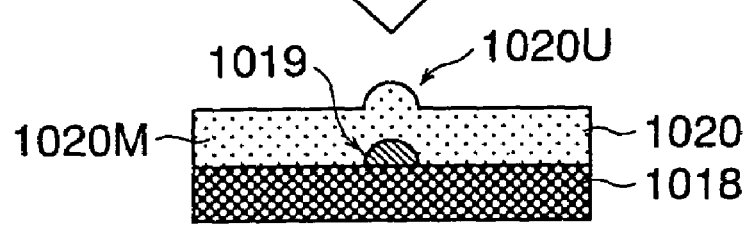

In FIG. 6B, an optical material 1020M is laminated on the surface of the silicon substrate 1018 with the resist 1019 formed thereon to bury the resist 1019 and thereby form a base made of a layer 1020 of the optical material 1020M. It is also possible to form a layer 1020 of the optical material 1020M by for example sputtering or vapor deposition. It is also possible to use for example aluminum oxide as the optical material 1020M.

When the layer 1020 is formed on the silicon substrate 1018, a projection 1020U of a shape in accordance with the resist 1019 is formed on the surface of the layer 1020.

Figure 6C:
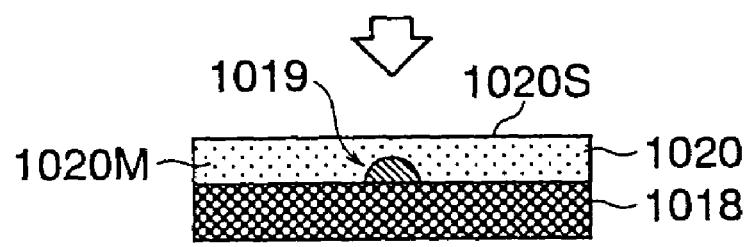

In FIG. 6C, the upper face of the layer 1020 is flattened. For example, it is polished so that the projection 1020U of the upper face of the layer 1020 disappears. Preferably, the upper face of the layer 1020 is polished so that a flat face vertical with respect to the symmetry axis of the resist 1019 on the silicon substrate 1018 is formed. Alternatively, the layer 1020 is polished so that the flat face at the area around the resist 1019 on the silicon substrate 1018 and the upper face of the layer 1020 become parallel or approximately parallel.

Figure 6D:
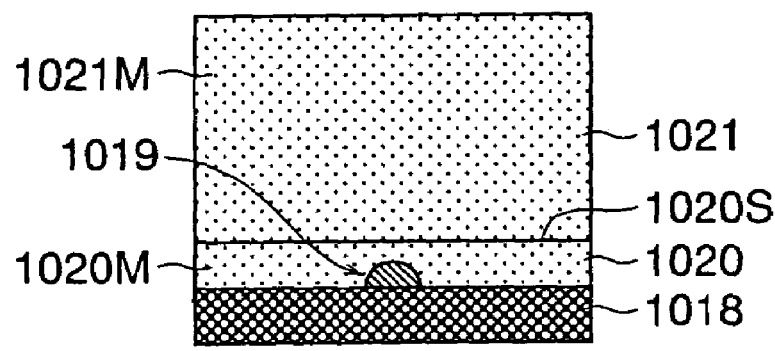

In FIG. 6D, the flat face of a base 1021 made of an optical material 1021M is bonded to an upper face 1020S of the layer 1020. As the bonding method, for example, it is also possible to bond by a transparent adhesive or possible to bond by anodic bonding. The optical material 1021M is preferably made the same material as the optical material 1020M.

Figure 7E:
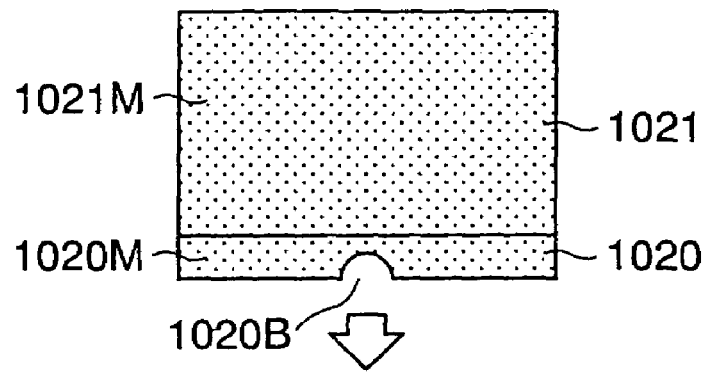
FIGS. 7E to 7G are schematic explanatory views of the third embodiment of the method of production of the first optical device according to the present invention continued from FIG. 6D.

In FIG. 7E, the silicon substrate 1018 and the resist 1019 bonded to the bottom face of the layer 1020 of FIG. 6D are removed to expose the bottom face of the layer 1020. It is also possible to dissolve the silicon substrate 1018 by for example an aqueous solution of potassium hydroxide to remove it. It is also possible to dissolve and remove the resist 1019 by for example a resist use peeling solution or an organic solvent (for example acetone).

The shape of the resist 1019 is transferred to the bottom face of the layer 1020, whereby a concavity 1020B corresponding to the shape of the resist 1019 is formed.

Figure 7F:
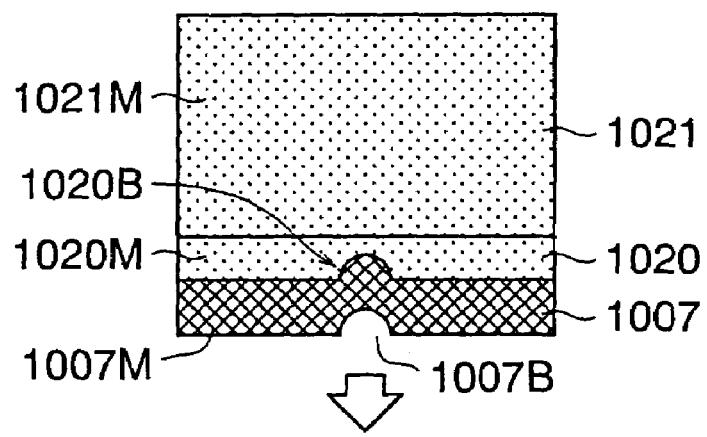

In FIG. 7F, an optical material 1007M is filled in the concavity 1020B of the bottom face of the layer 1020. The optical material 1007M has a refractive index different from the optical material 1020M, preferably has a larger refractive index than the optical material 1010M. Silicon nitride is used as an example.

For example, by forming a layer 1007 of the optical material 1007M on the bottom face of the layer 1020 by sputtering or vapor deposition, the optical material 1007M is filled in the concavity 1020B of the layer 1020. In this case, a concavity 1007B corresponding to the concavity 1020B is formed in the layer 1007.

Figure 7G:
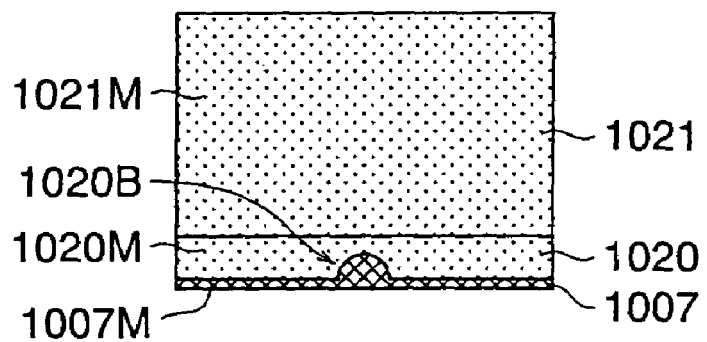

In FIG. 7G, the bottom face of the layer 1007 is flattened. For example, it is polished so that the concavity 1007B of the bottom face of the layer 1007 disappears. Preferably, the bottom face of the layer 1007 is polished so that a flat face vertical with respect to the symmetry axis of the concavity 1020B of the layer 1020 is formed. Alternatively, the layer 1007 is polished so that the flat face at the area around the concavity 1020B of the layer 1020 and the bottom face of the layer 1007 become parallel or approximately parallel.

By polishing the layer 1007 so that the flat face at the area around the concavity 1020B of the layer 1020 is exposed and further polishing the upper face of the base 1021 so as to become parallel or approximately parallel with respect to the polished face of the layer 1007 or by removing the base 1021, it is possible to obtain an optical device having an identical configuration or approximately identical configuration to the optical device 1100 of FIG. 1.

Fourth Embodiment of Method of Production of First Optical Device

FIGS. 8A to 9E are schematic explanatory views of a fourth embodiment of the method of production of the first optical device according to the present invention. By this method of production, it is possible to obtain an optical device having an identical configuration or approximately identical configuration to the optical device 1100 of FIG. 1.

In FIG. 8A, a resist 1029 is formed on the flat face of a base 1031 made of an optical material 1031M. The optical material 1031M is made for example quartz.

A circular or approximately circular hole 1029H is formed in the resist 1029 on the base 1031.

In FIG. 8B, the base 1031 with the resist 1029 formed thereon is immersed in an etching solution 1032 for a predetermined time. The etching solution 1032 is comprised of for example a fluoric acid solution corroding quartz.

By immersing the base 1031 in the etching solution 1032 for a predetermined time, the base 1031 is gradually corroded from the hole 1029H of the resist 1029, and a concavity 1131U is formed on the lower side of the hole 1029. The size of this concavity 1131U is made identical to the size of the lens 1102 in FIG. 1.

Figure 9C:
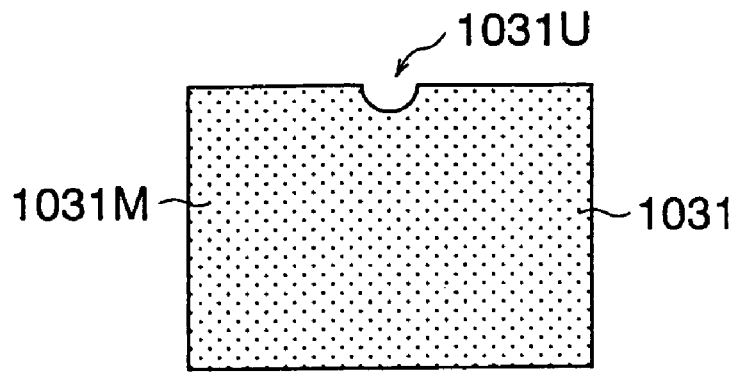
FIGS. 9C to 9E are schematic explanatory views of the fourth embodiment of the method of production of the first optical device according to the present invention continued from FIG. 8B.

In FIG. 9C, the base 1031 is taken out from the etching solution 1032, and the resist 1029 is removed. It is also possible to dissolve and remove the resist 1029 by a resist use peeling solution or organic solvent (for example acetone) etc.

Figure 9D:
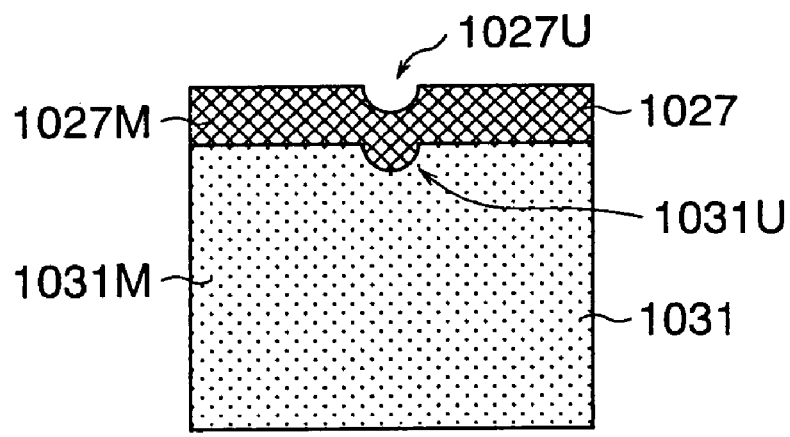

In FIG. 9D, an optical material 1027M is filled in the concavity 1131U of the upper face of the base 1031. The optical material 1027M has a refractive index different from the optical material 1031M, preferably has a larger refractive index than the optical material 1031M. Silicon nitride is used as an example.

For example, by forming a layer 1027 of the optical material 1027M on the upper face of the base 1031 by sputtering or vapor deposition, the optical material 1027M is filled in the concavity 1131U of the base 1031. In this case, a concavity 1127U corresponding to the concavity 1131U is formed in the layer 1027.

Figure 9E:
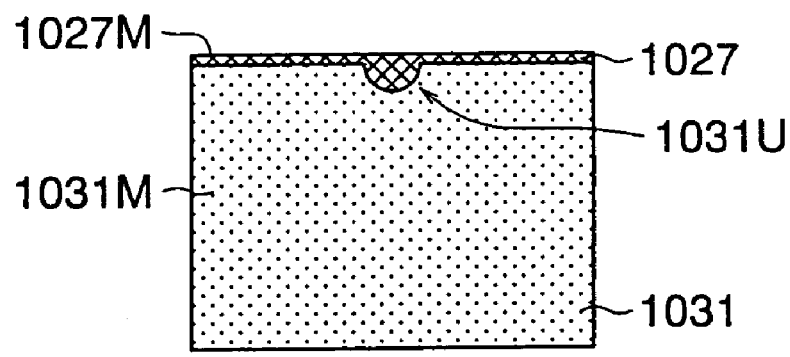

In FIG. 9E, the upper face of the layer 1027 is flattened. For example, it is polished so that the concavity 1127U of the upper face of the layer 1027 disappears. Preferably, the upper face of the layer 1027 is polished so that a flat face vertical with respect to the symmetry axis of the concavity 1131U of the base 1031 is formed. Alternatively, the layer 1027 is polished so that the flat face at the area around the concavity 1131U of the base 1031 and the upper face of the layer 1027 become parallel or approximately parallel.

By polishing the layer 1027 so that the flat face at the area around the concavity 1131U of the base 1031 is exposed and further polishing the bottom face of the base 1031 so as to become parallel or approximately parallel with respect to the polished face of the layer 1027, it is possible to obtain an optical device having an identical configuration or approximately identical configuration to the optical device 1100 of FIG. 1.

Fifth Embodiment of Method of Production of First Optical Device

Figure 10A:
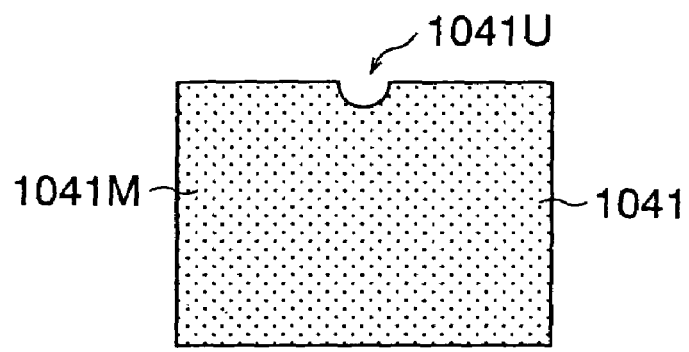
FIGS. 10A to 10C are schematic explanatory views of a fifth embodiment of the method of production of the first optical device according to the present invention.
Figure 10B:
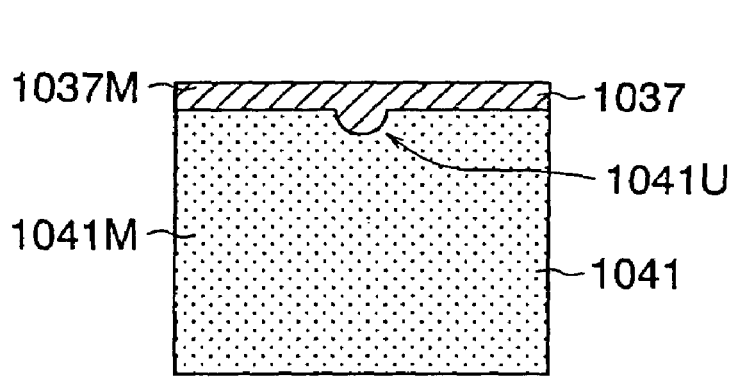
Figure 10C:
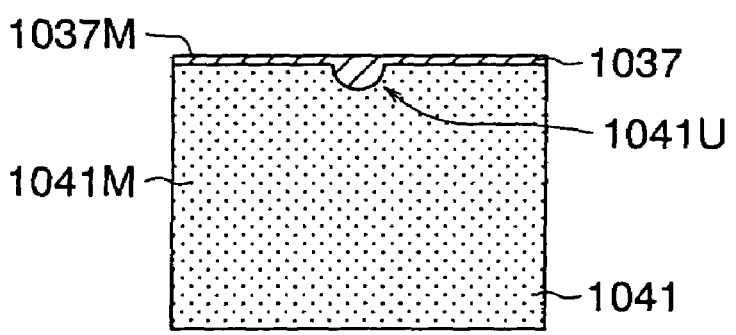

FIGS. 10A to 10C are schematic explanatory views of a fifth embodiment of the method of production of the first optical device according to the present invention. By this method of production, it is possible to obtain an optical device having an identical configuration or approximately identical configuration to the optical device 1100 of FIG. 1.

In FIG. 10A, a base 1041 having a concavity 1141U is shown. The concavity 1141U has a rotationally symmetric or approximately rotationally symmetric shape. The area around the concavity 1141U in the base 1041 is flat. The base 1041 is made of an optical material 1041M.

The size of the concavity 1141U is identical to the size of the lens 1102 in FIG. 1.

As this base 1041, use is made of for example the base 1006 in FIG. 2C, the base 1011 with the layer 1010 bonded thereto in FIG. 5F, the base 1021 with the layer 1020 bonded thereto in FIG. 7E, or the base 1031 in FIGS. 9C to 9E.

In FIG. 10B, an optical material 1037M having a refractive index different from the optical material 1041M is filled in the concavity 1141U of the upper face of the base 1041.

As an example, when the optical material 1041M is not quartz, a gelated quartz is used as the optical material 1037M and coated on the upper face of the base 1041 to form a layer 1037 of the optical material 1037M and fill the optical material 1037M in the concavity 1141U of the base 1041.

Then, the base 1041 with the optical material 1037M filled in the concavity 1141U is heated to cause the optical material 1037M to cure.

In FIG. 10C, the upper face of the hardened layer 1037 is flattened. For example, it is polished so that any surface roughness or undulation of the upper face of the optical material 1037 disappears. Preferably, the upper face of the layer 1037 is polished so that a flat face vertical with respect to the symmetry axis of the concavity 1141U of the base 1041 is formed. Alternatively, the layer 1037 is polished so that the flat face at the area around the concavity 1141U of the base 1041 and the upper face of the layer 1037 become parallel or approximately parallel.

By polishing the layer 1037 so that the flat face at the area around the concavity 1141U of the base 1041 is exposed and further polishing the bottom face of the base 1041 so as to become parallel or approximately parallel with respect to the polished face of the layer 1037, it is possible to obtain an optical device having an identical configuration or approximately identical configuration to the optical device 1100 of FIG. 1.

Sixth Embodiment of Method of Production of First Optical Device

Figure 11A:
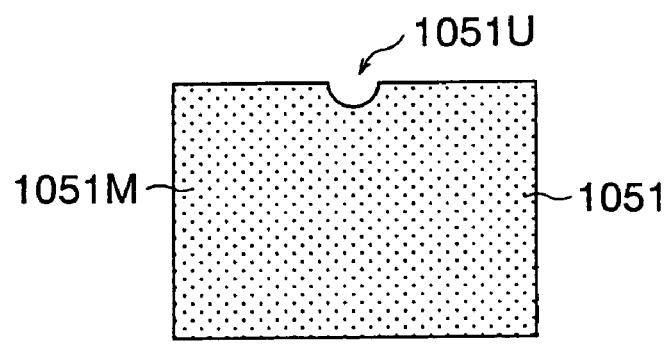
FIGS. 11A and 11B are schematic explanatory views of a sixth embodiment of the method of production of the first optical device according to the present invention.
Figure 11B:
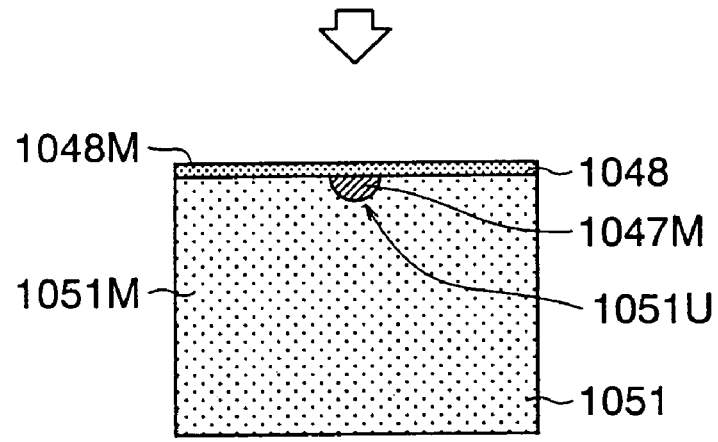

FIGS. 11A and 11B are schematic explanatory views of a sixth embodiment of the method of production of the first optical device according to the present invention. By this method of production, it is possible to obtain an optical device having an identical configuration or approximately identical configuration to the optical device 1100 of FIG. 1.

In FIG. 11A, a base 1051 having a concavity 1151U is shown. The concavity 1051 has a rotationally symmetric or approximately rotationally symmetric shape. The area around the concavity 1151U in the base 1051 is flat. The base 1051 is made of an optical material 1051M.

The size of the concavity 1151U is identical to the size of the lens 1102 in FIG. 1.

As this base 1051, use is made of for example the base 1006 in FIG. 2C, the base 1011 with the layer 1010 bonded thereto in FIG. 5F, the base 1021 with the layer 1020 bonded thereto in FIG. 7E, or the base 1031 in FIG. 9.

In FIG. 11B, a liquid-like optical material 1047M having a refractive index different from the optical material 1051M is filled in the concavity 1151U of the upper face of the base 1051. As the optical material 1047M, use is made of an optical liquid for example an optical oil or liquid crystal.

Then, a layer 1048 made of an optical material 1048M is formed on the upper face of the base 1051 to seal the concavity 1151U filled with the optical material 1047M by the layer 1048. In this way, the liquid-like optical material 1047M can be filled in the concavity 1051U. The layer 1048 can be formed as a film having a constant or approximately constant thickness too. Note that by polishing the bottom face of the base 1051, the base 1051 can be reduced to an intended thickness.

First Embodiment of Optical System Using First Optical Device

FIG. 12 is a schematic view of the configuration of a first embodiment of an optical system using the first optical device according to the present invention.

This optical system 1119 has optical devices 100 and 110 having identical configurations and comprised by stacking the optical devices 100 and 110. Note that the optical device 1100 is identical or approximately identical to the optical device 1100 of FIG. 1, so the explanation thereof is appropriately omitted.

The optical device 1110 has a base 1111 and a lens 1112. The base 1111 is made of an optical material. The base 1111 and the lens 1112 have different refractive indexes.

The base 1111 has a rotationally symmetric or approximately rotationally symmetric concavity 1111B in the bottom face of the base 111. The shape of the surface of the concavity 1111B when the concavity 1111B is cut along its symmetry axis is preferably made an arc or approximately an arc.

The concavity 1111B is filled with an optical material having a refractive index different from the base 111. The lens 1112 is comprised by the concavity 1111B filled with the related optical material.

The bottom face of the lens 1112 is flat and is parallel or approximately parallel to an upper face 1110U of the optical device 1110 (or the upper face of the base 111). Also, the flat faces of the bottom face of the lens 1112 and the bottom face of the base 1111 are located in the identical plane and comprise a bottom face 1110B of the optical device 1110.

The base 111, lens 1112, upper face 1110U, and bottom face 1110B of the optical device 1110 correspond to the base 101, lens 1102, upper face 1100U, and bottom face 1100B of the optical device 1100.

The optical device 1110 has a parallelopiped or approximately parallelopiped shape. When light is made to enter an upper face 1100U, the light emitted from a bottom face 1100B can be converged (collected) or scattered by the lens 1102 or can be changed to a parallel beam.

The bottom face 1100B of the optical device 1100 and the upper face 1110U of the optical device 1110 are bonded so that the optical axes of the lenses 1102 and 1112 are located on the identical straight line or approximately identical straight line.

It is also possible to form the optical devices 100 and 110 in a plate-like or approximately plate-like shape. It is possible to stack the optical devices 100 and 110 while positioning them with a high precision.

For example, by adding positioning marks like the marks for mask alignment used when semiconductor integrated circuits are manufactured on the bases 101 and 111, it is possible to use these marks to stack a plurality of optical devices with a high precision.

Also, by making the shapes of the optical devices 100 and 110 parallelepipeds or approximately parallelepipeds or plate-like or approximately plate-like, it is possible to prevent inclination of (the optical axes of) the lenses from occurring when the optical devices are stacked, the optical devices can be stacked while positioning them in the two-dimensional direction (vertical and lateral directions), and it is possible to easily prepare the optical system 1119.

Second Embodiment of Optical System Using First Optical Device

FIG. 13 is a schematic view of the configuration of a second embodiment of an optical system using the first optical device according to the present invention. Note that the optical device 1100 in FIG. 13 is identical or approximately identical to the optical device 1100 of FIG. 1, so the explanation thereof will be appropriately omitted.

This optical system 1129 has optical devices 100 and 1120 and is comprised by stacking the optical devices 100 and 1120.

The optical device 1120 has a base 1121 and a lens 1122. The base 1121 is made of an optical material. The base 1121 and the lens 1122 have different refractive indexes.

The base 1121 has a rotationally symmetric or approximately rotationally symmetric concavity 1121B in the bottom face of the base 1121. The shape of the surface of the concavity 1121B when the concavity 1121B is cut along its symmetry axis is preferably made an arc or approximately an arc.

The concavity 1121B is filled with an optical material having a refractive index different from the base 1121. The lens 1122 is comprised by the concavity 1121B filled with the related optical material.

The bottom face of the lens 1122 is flat and is parallel or approximately parallel to an upper face 1120U of the optical device 1120 (or the upper face of the base 1121). Also, the flat faces of the bottom face of the lens 1122 and the bottom face of the base 1121 are located in the identical plane and comprise a bottom face 1120B of the optical device 1120.

The optical device 1120 has a parallelopiped or approximately parallelopiped shape. When light is made to enter an upper face 1120U, the light emitted from a bottom face 1120B can be converged (collected) or scattered by the lens 1122 or can be changed to a parallel beam.

The bottom face 1100B of the optical device 1100 and the upper face 1120U of the optical device 1120 are bonded so that the optical axes of the lenses 1102 and 1122 are located on the identical straight line or approximately identical straight line.

It is also possible to form the optical devices 100 and 1120 to be plate-like or approximately plate-like. It is possible to stack the optical devices 100 and 1120 while positioning them with a high precision.

Also, by making the shapes of the optical devices 100 and 1120 parallelopiped or approximately parallelopiped or plate-like or approximately plate-like, it is possible to prevent inclination of (the optical axes of) the lenses from occurring in the case where the optical devices are stacked and it is possible to easily prepare the optical system 1129.

Also, a solid immersion lens (SIL) can be comprised by the optical system 1129, and it is possible to obtain a high numerical aperture.

Third Embodiment of Optical System Using First Optical Device

FIG. 14 is a schematic view of the configuration of a third embodiment of an optical system using the first optical device according to the present invention. Note that, in an optical system 1129A of FIG. 14, identical reference numerals are assigned to identical components as those of the optical system 1129 of FIG. 13. Explanations of the identical components will be appropriately omitted.

This optical system 1129A is configured as the optical system 1129 of FIG. 13 without the base 1101.

This optical system 1129A has a lens 1102 and an optical device 1120 and is comprised by stacking the lens 1102 on the optical device 1120. The bottom face of the lens 1102 contacts the upper face 1120U of the optical device 1120.

By comprising the optical system 1129A by the lens 1102 and the optical device 1120 in this way, the optical system 1129A can be reduced in size in comparison with the optical system 1129 of FIG. 13. Also, a solid immersion lens (SIL) can be comprised by the optical system 1129A.

It is possible to obtain the optical system 1129A of FIG. 14 from the optical system 1129 of FIG. 13.

For example, when the material of the base 1101 of the optical device 1100 is quartz, the material of the lens 1102 is gallium nitride, the material of the base 1121 of the optical device 1120 is aluminum oxide, and the material of the lens 1122 is gallium nitride, it is possible to immerse the optical system 1129 of FIG. 13 in an etching solution such as fluoric acid to dissolve and remove the base 1101 and thus obtain the optical system 1129A of FIG. 14.

Also, it is possible to take out the lens 1102 from the optical device 1100.

For example, when the material of the lens 1102 is gallium nitride and the material of the base 1101 is quartz, it is possible to immerse the optical device 1100 in an etching solution of fluoric acid or the like to dissolve the base 1101 and take out the lens 1102.

Fourth Embodiment of Optical System Using First Optical Device

Figure 15:
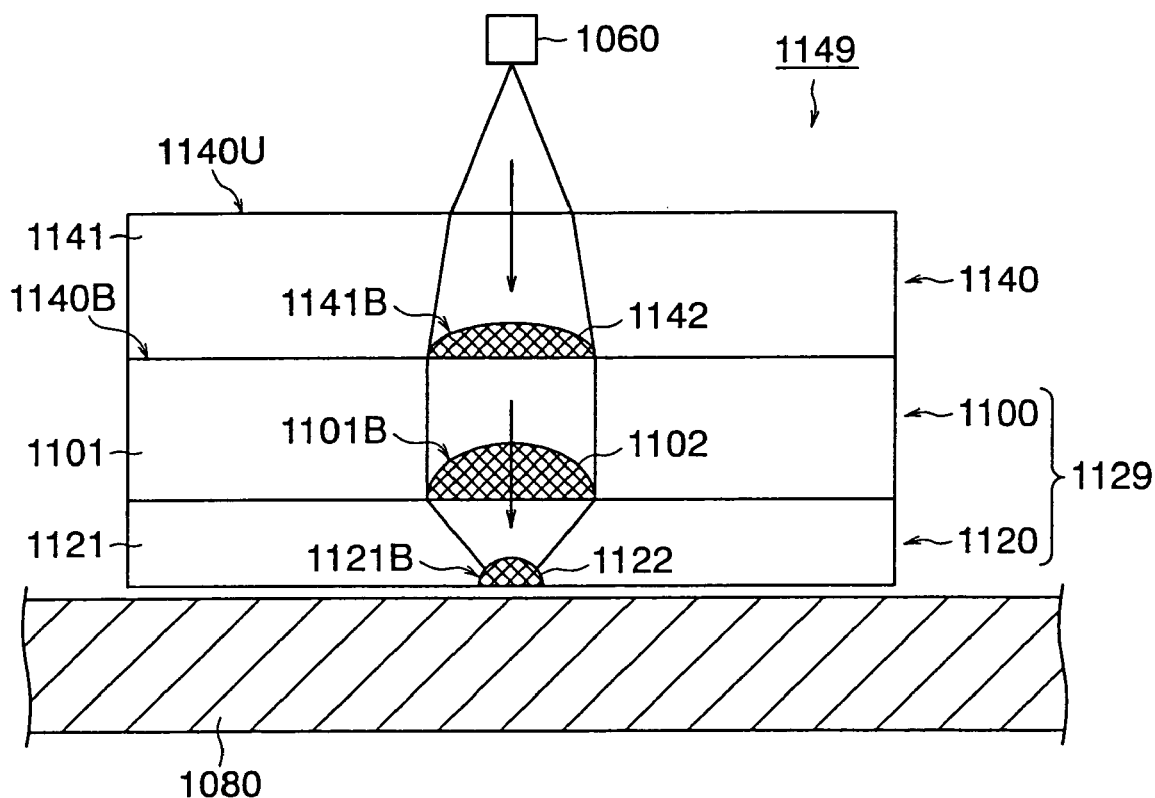
FIG. 15 is a schematic view of the configuration of a fourth embodiment of an optical system using the first optical device according to the present invention.

FIG. 15 is a schematic view of the configuration of a fourth embodiment of an optical system using the first optical device according to the present invention. Note that, in an optical system 1149 of FIG. 15, identical reference numerals are assigned to identical components as those of the optical system 1129 of FIG. 13. Explanations of the identical components will be appropriately omitted.

This optical system 1149 has optical devices 1100, 1120, and 1140. The optical device 1100 is stacked upon the optical device 1120, and the optical device 1140 is stacked upon the optical device 1100.

The upper face of the optical device 1100 of the optical system 1129 and a bottom face 1140B of the optical device 1140 are bonded so that the optical axes of the lenses 1102, 1122, and 1142 of the optical devices 1100, 1120, and 1140 are located on the identical straight line or approximately identical straight line.

The optical device 1140 has a base 1141 and the lens 1142. The base 1141 is made of an optical material. The base 1141 and the lens 1142 have different refractive indexes.

The base 1141 has a rotationally symmetric or approximately rotationally symmetric concavity 1141B in the bottom face of the base 1141. The shape of the surface of the concavity 1141B when the concavity 1141B is cut along its symmetry axis is preferably made an arc or approximately an arc.

The concavity 1141B is filled with an optical material having a refractive index different from the base 1141. The lens 1142 is comprised by the concavity 1141B filled with the related optical material.

The bottom face of the lens 1142 is flat and is parallel or approximately parallel to an upper face 1140U of the optical device 1140 (or the upper face of the base 1141). Also, the flat faces of the bottom face of the lens 1142 and the bottom face of the base 1141 are located in the identical plane and comprise a bottom face 1140B of the optical device 1140.

The optical device 1140 has a parallelopiped or approximately parallelopiped shape. When light is made to enter an upper face 1140U, the light emitted from a bottom face 1140B can be converged (collected) or scattered by the lens 1142 or can be changed to a parallel beam.

This optical device 1140 has the function of the collimator lens and changes the laser beam from a semiconductor laser 1060 to a parallel beam and supplies the same to the optical device 1100.

The optical system 1129 has the optical devices 1100 and 1120. By the combination of the optical devices 1100 and 1120, a high numerical aperture NA can be obtained, and a solid immersion lens (SIL) can be comprised. By enlarging the refractive index of the lens 1122, the numerical aperture NA of the optical system 1129 can be made higher.

In the optical devices 1100, 1120, and 1140, the lenses 1102, 1122, and 1142 are formed by utilizing the concavities of the bases 1101, 1121, and 1141, so the range of selection of the materials of the lenses 1102, 1122 and 1142 can be enlarged, and optical materials having large refractive indexes can be used as the materials of the lenses 1102, 1122, and 1142.

The parallel beam from the optical device 1140 passes through the lenses 1102 and 1122 and is emitted from the bottom face of the lens 1122. The emitted beam is focused on a recording surface of an optical disc 1080 to irradiate the recording surface.

Note that, by rounding the edges of the bottom face of the optical device 1120 (face facing the optical disc 1080), it is possible to reduce collisions with and/or shock to the surface of the optical disc 1080.

Fifth Embodiment of Optical System Using First Optical Device

Figure 16:
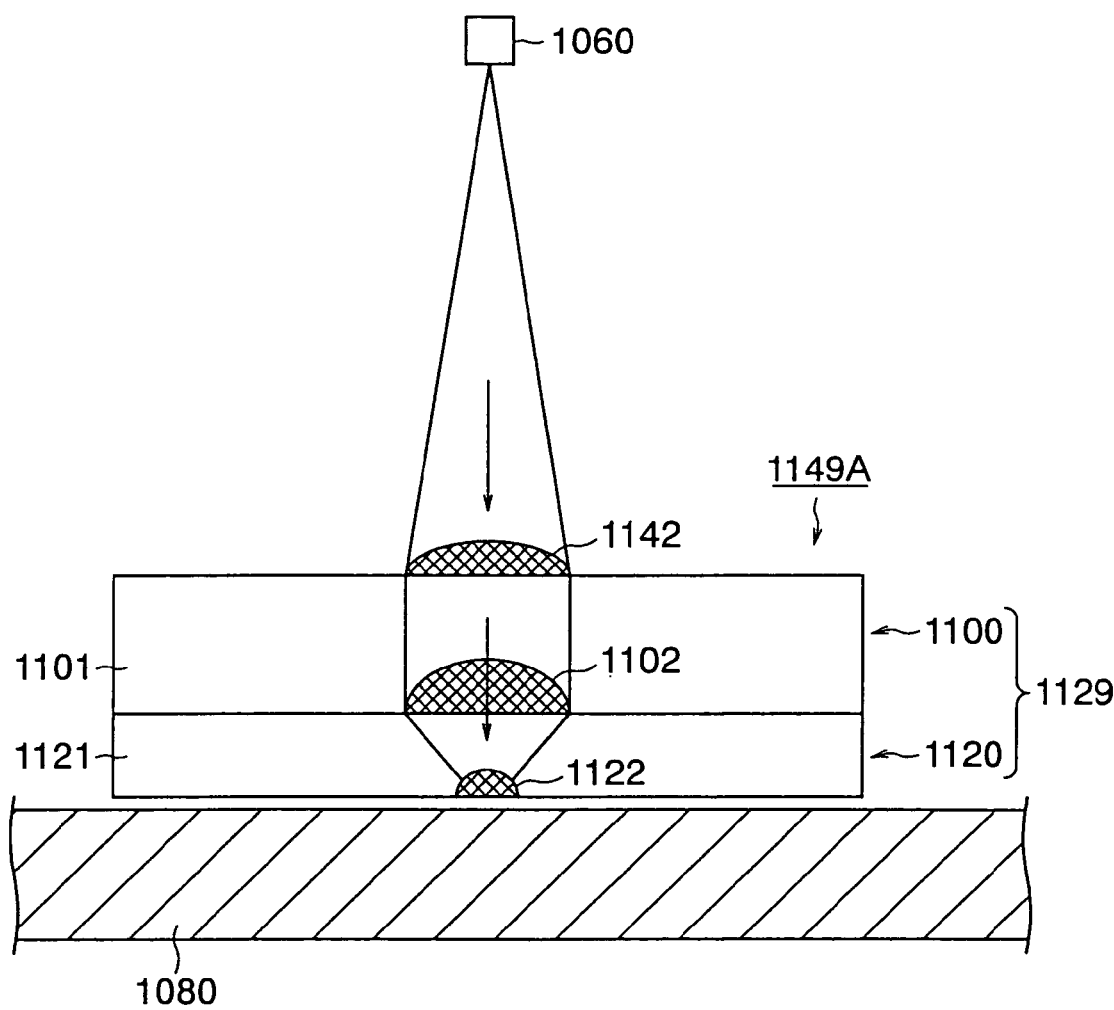
FIG. 16 is a schematic view of the configuration of a fifth embodiment of an optical system using the first optical devices according to the present invention.

FIG. 16 is a schematic view of the configuration of a fifth embodiment of an optical system using the first optical devices according to the present invention. Note that, in an optical system 1149A of FIG. 16, identical reference numerals are assigned to identical components as those of the optical system 1149 of FIG. 15. Explanations of the identical components will be appropriately omitted.

This optical system 1149A is configured as the optical system 1149 of FIG. 15 without the base 1141.

The optical system 1149A has the optical devices 100 and 1120 and the lens 1142. The optical device 1100 is stacked upon the optical device 1120, and the lens 1142 is stacked upon the optical device 1100. The optical devices 100 and 1120 and the lens 1142 are bonded so that the optical axes of the lenses 1102 and 1122 of the optical devices 100 and 1120 and the lens 1142 are located on the identical straight line or approximately identical straight line.

The lens 1142 comprises a collimator lens and changes the laser beam from a semiconductor laser 1060 to a parallel beam and supplies the same to the optical device 1100.

The parallel beam from the lens 1142 passes through the lenses 1102 and 1122 and is emitted from the bottom face of the lens 1122. The emitted beam is focused on the recording surface of an optical disc 1080 to irradiate the related recording surface.

By comprising the optical system 1149A by the optical devices 100 and 1120 and the lens 1142 in this way, the optical system 1149A can be reduced in size in comparison with the optical system 1149 of FIG. 15. Note that a distance between the lens 1142 and the semiconductor laser 1060 can be adjusted by the shape and thickness of the lens 1142.

Sixth Embodiment of Optical System Using First Optical Device

Figure 17:
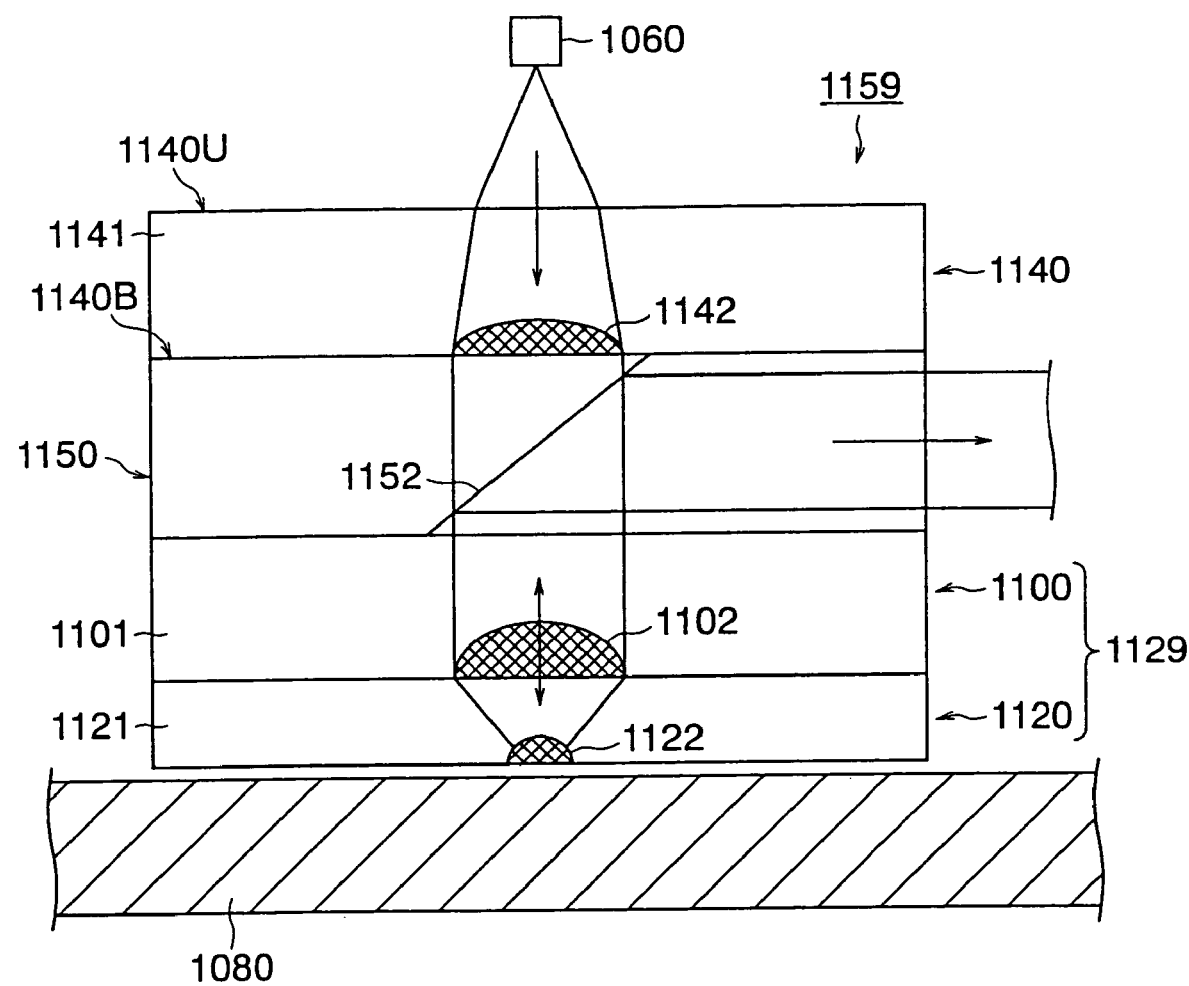
FIG. 17 is a schematic view of the configuration of a sixth embodiment of an optical system using the first optical devices according to the present invention.

FIG. 17 is a schematic view of the configuration of a sixth embodiment of an optical system using the first optical device according to the present invention. Note that, in an optical system 1159 of FIG. 17, identical reference numerals are assigned to identical components as those of the optical system 1149 of FIG. 15. Explanations of the identical components will be appropriately omitted.

This optical system 1159 is configured as the optical system 1149 of FIG. 15 with an optical device 1150 inserted as a beam splitter between the optical devices 100 and 1140.

The optical system 1159 has optical devices 1100, 1120, 1140, and 150. The optical device 1100 is stacked upon the optical device 1120, the optical device 1150 is stacked upon the optical device 1100, and the optical device 1140 is stacked upon the optical device 1150. The optical devices 1100, 1120, 1140, and 150 are bonded so that the optical axes of the lenses 1102, 1122, and 1142 of the optical devices 1100, 1120 and 1140 are located on the identical straight line or approximately identical straight line.

The optical device 1150 located between the optical devices 100 and 1140 has the function of a beam splitter. A film which is semi-transparent (semi-transparent film) 152 is located between the lenses 1102 and 1142.

This semi-transparent film 152 passes the parallel beam from (the lens 1142 of) the optical device 1140 therethrough and reflects a returned beam from (the lens 1102 of) the optical system 1129.

The optical device 1140 has the function of a collimator lens. It changes the laser beam from a semiconductor laser 1060 to a parallel beam and supplies this parallel beam via the optical device 1150 to the optical device 1100 in the optical system 1129.

The optical system 1129 emits the parallel beam from the optical device 1150 through the lenses 1102 and 1122 from the bottom face of the lens 1122 and focuses the emitted beam on the recording surface of the optical disc 1080 to irradiate the related recording surface. Also, the optical system 1129 supplies the reflected laser beam (returned laser beam) reflected at (the recording surface of) the optical disc 1080 to the optical device 1150.

By interposing the optical device 1150 as a beam splitter between the optical device 1140 and the optical system 1129, it is possible to take out the reflected laser beam reflected at the optical disc 1080 from the side face of the optical device 1150.

Seventh Embodiment of Optical System Using First Optical Device

Figure 18:
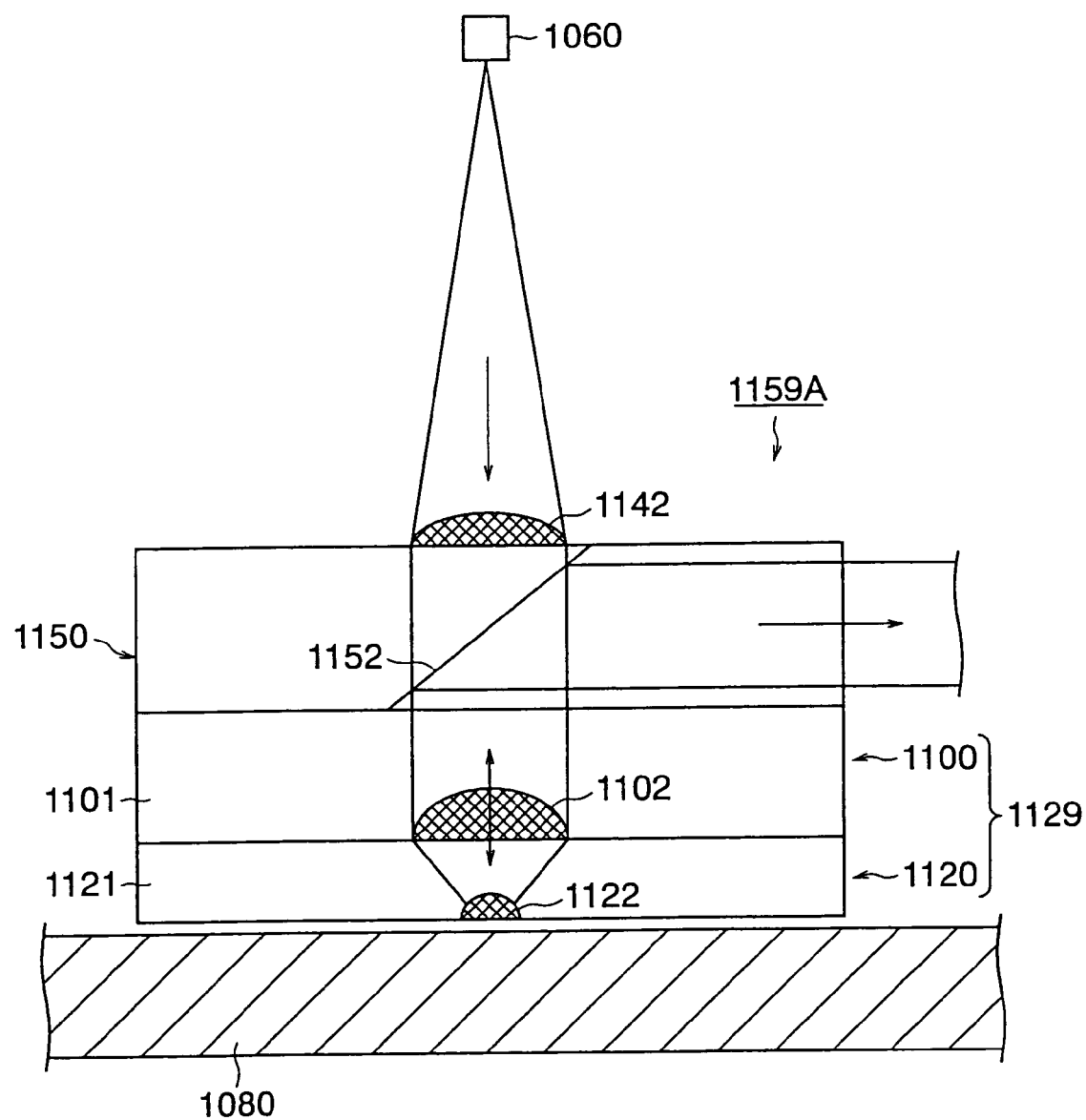
FIG. 18 is a schematic view of the configuration of a seventh embodiment of an optical system using the first optical devices according to the present invention.

FIG. 18 is a schematic view of the configuration of a seventh embodiment of an optical system using the first optical devices according to the present invention. Note that, in an optical system 1159A of FIG. 18, identical reference numerals are assigned to identical components as those of the optical system 1159 of FIG. 17. Explanations of the identical components will be appropriately omitted.

This optical system 1159A is configured as the optical system 1159 of FIG. 17 without the base 1141.

The optical system 1159A has the optical devices 1100, 1120, and 150 and the lens 1142. The optical device 1100 is stacked upon the optical device 1120, the optical device 1150 is stacked upon the optical device 1100, and the lens 1142 is stacked upon the optical device 1150.

The optical devices 1100, 1120, and 150 and the lens 1142 are bonded so that the optical axes of the lenses 1102 and 1122 of the optical devices 100 and 1120 and the lens 1142 are located on the identical straight line or approximately identical straight line.

The lens 1142 comprises a collimator lens. It changes the laser beam from a semiconductor laser 1060 to a parallel beam and supplies this parallel beam via the optical device 1150 to the optical device 1100.

The parallel beam from the lens 1142 passes through the lenses 1102 and 1122 and is emitted from the bottom face of the lens 1122. The emitted beam is focused on the recording surface of the optical disc 1080 to irradiate the related recording surface. Also, the optical system 1129 supplies the reflected laser beam (returned laser beam) reflected at (the recording surface of) the optical disc 1080 to the optical device 1150.

By comprising the optical system 1159A by the optical devices 1100, 1120, and 150 and the lens 1142 in this way, the optical system 1159A can be reduced in size in comparison with the optical system 1159 of FIG. 17.

First Embodiment of Optical Head Using First Optical Device

Figure 19:
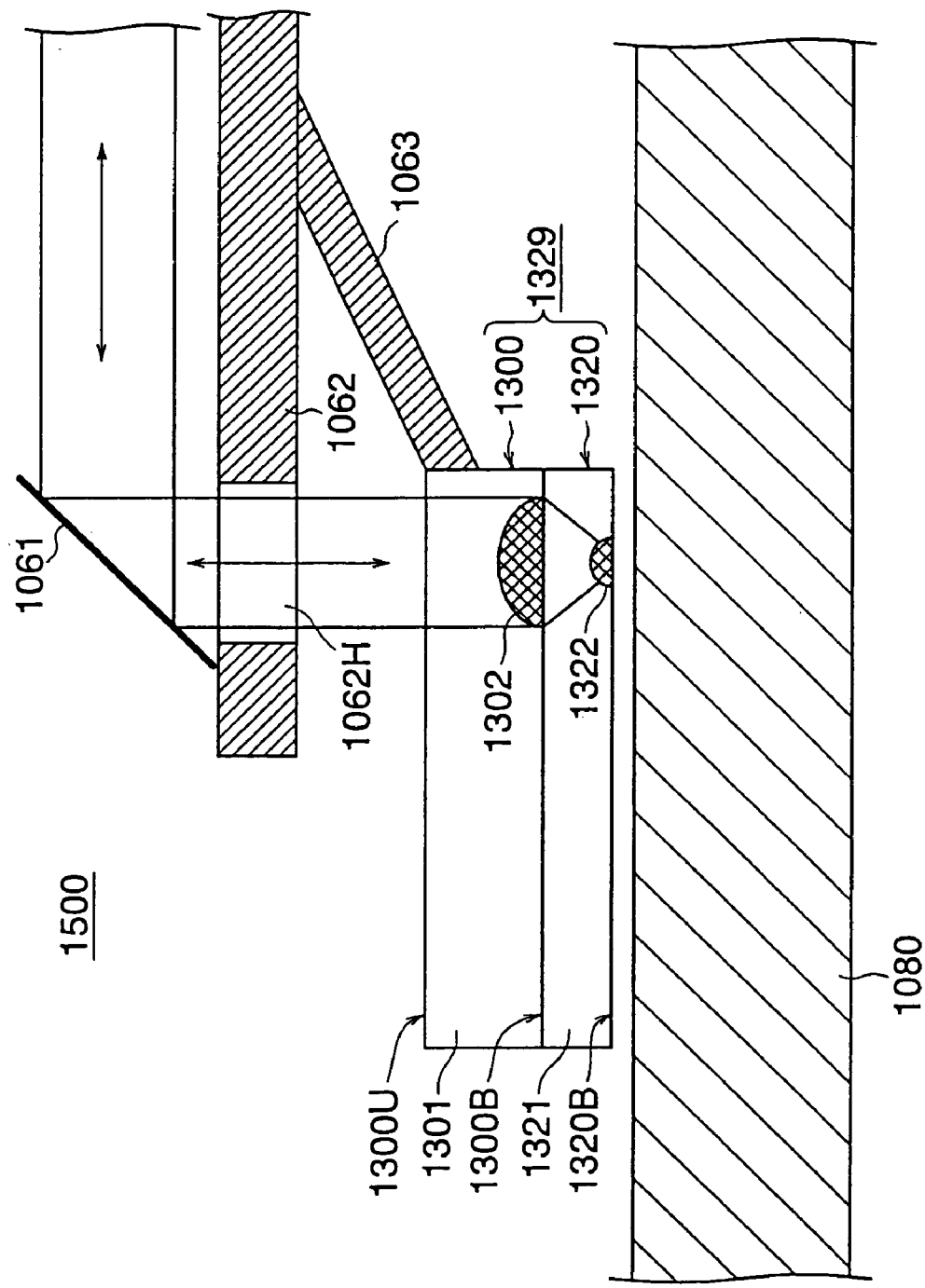
FIG. 19 is a schematic view of the configuration of a first embodiment of an optical head using the first optical device according to the present invention.

FIG. 19 is a schematic view of the configuration of a first embodiment of an optical head using the first optical device according to the present invention.

This optical head 1500 has an optical system 1329 and a mirror 1061. A flying head is comprised by a swing arm 1062 and a suspension 1063.

The optical system 1329 has optical devices 1300 and 1320. The optical device 1300 is stacked upon the optical device 1320. This optical system 1329 comprises a slider. The bottom face 1320B of the optical device 1320 of the optical system 1329 and the surface of the optical disc 1080 face each other. The bottom face 1320B of the optical device 1320 comprises a slider face.

In this way, there is an advantage that the optical system 1329 can be used for the slider of the optical head 1500 as it is.

A mirror 1061 is attached to the upper face of the swing arm 1062. The suspension 1063 is attached to the bottom face of the swing arm 1063, or the suspension 1063 is formed.

Also, a through hole 1062H for allowing the reflected beam of the mirror 1061 to pass therethrough is formed in the swing arm 1062.

The optical system 1329 is attached to the front end of the suspension 1063.

The mirror 1061 is supplied with the laser beam of the parallel beam from the base side of the swing arm 1062, reflects the supplied laser beam, and supplies the same via the through hole 1062H to the optical system 1329.

The optical system 1329 collects the laser beam from the mirror 1061 by using lenses 1302 and 1322 and focuses it on the recording surface of the optical disc 1080. Also, the optical system 1329 returns the laser beam reflected at the recording surface of the optical disc 1080 (returned laser beam) via the through hole 1062H to the mirror 1061.

The mirror 1061 reflects the returned laser beam from the optical system 1329 and returns it to the base side of the swing arm 1062.

Figure 20:
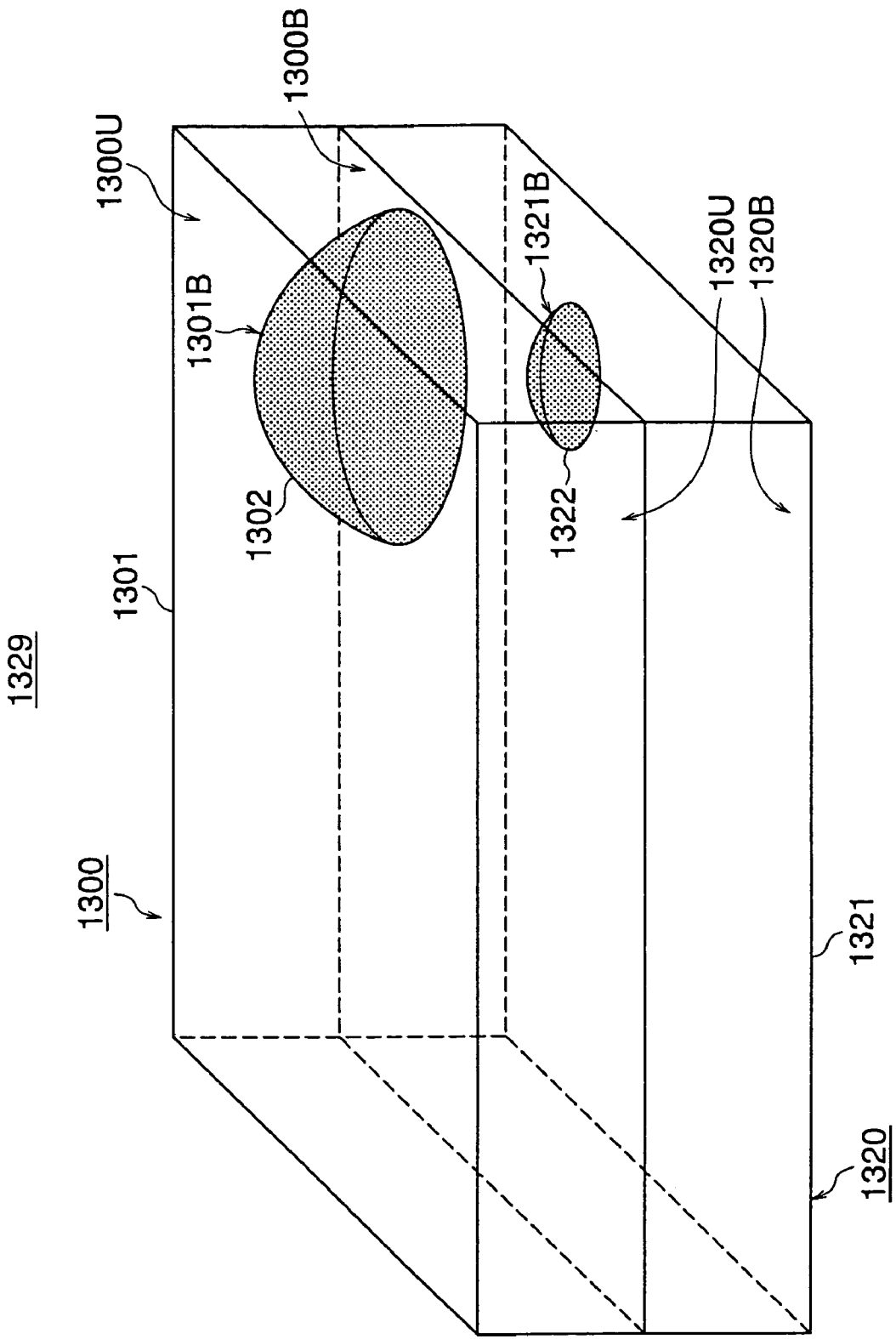
FIG. 20 is a schematic view of the configuration of an optical system shown in FIG. 19.

FIG. 20 is a schematic view of the configuration of the optical system 1329 in FIG. 19.

The optical device 1300 has a base 1301 and the lens 1302. The base 1301 is made of an optical material. The base 1301 and the lens 1302 are different in refractive index.

The base 1301 has a rotationally symmetric or approximately rotationally symmetric concavity 1301B in the bottom face of the base 1301. The shape of the surface of the concavity 1301B when the concavity 1301B is cut along its symmetry axis is preferably made an arc or approximately an arc.

The concavity 1301B is filled with an optical material having a refractive index different from the base 1301. The lens 1302 is comprised by the concavity 1301B filled with the related optical material.

The bottom face of the lens 1302 is flat and is parallel or approximately parallel to an upper face 1300U of the optical device 1300 (or the upper face of the base 1301). Also, the flat faces of the bottom face of the lens 1302 and the bottom face of the base 1301 are located in the identical plane and comprise a bottom face 1300B of the optical device 1300.

The optical device 1300 exhibits a parallelopiped or approximately parallelopiped shape. When light enters the upper face 1300U, the beam emitted from the bottom face 1300B can be converged (collected) by the lens 1302.

The optical device 1320 has a base 1321 and the lens 1322. The base 1321 is made of an optical material. The base 1321 and the lens 1322 are different in refractive index.

The base 1321 has a rotationally symmetric or approximately rotationally symmetric concavity 1321B in the bottom face of the base 1321. The shape of the surface of the concavity 1321B when the concavity 1321B is cut along its symmetry axis is preferably made an arc or approximately an arc.

The concavity 1321B is filled with an optical material having a refractive index different from the base 1321. The lens 1322 is comprised of the concavity 1321B filled with the related optical material.

The bottom face of the lens 1322 is flat and is parallel or approximately parallel to an upper face 1320U of the optical device 1320 (or the upper face of the base 1321). Also, the flat faces of the bottom face of the lens 1322 and the bottom face of the base 1321 are located in the identical plane and comprise the bottom face 1320B of the optical device 1320.

The optical device 1320 exhibits a parallelopiped or approximately parallelopiped shape. When light enters the upper face 1320U, the beam emitted from the bottom face 1320B can be converged (collected) by the lens 1322.

The bottom face 1300B of the optical device 1300 and the upper face 1320U of the optical device 1320 are bonded so that the optical axes of the lenses 1302 and 1322 are located on the identical straight line or approximately identical straight line.

Note that, by rounding the edges of the bottom face (face facing the optical disc 1080) 1320B of the optical device 1320, it is possible to reduce collisions with and/or impact to the surface of the optical disc 1080.

The optical system 1329 of the optical head 1500 desirably has a large rigidity and/or hardness. By forming the base 1321 of the optical device 1320 by aluminum oxide, the rigidity and/or hardness can be increased.

A high numerical aperture can be obtained by the optical system 1329. By comprising a solid immersion lens (SIL) by the optical system 1329 and using the related optical system 1329 in the near field region, it is possible to perform near field optical recording and/or reproduction and it is possible to improve a recording density of the optical disc.

It is also possible to form rails for floating the optical system 1329 as the slider on the bottom face 1320B of the optical device 1320.

It is also possible to form a coil generating a magnetic field (or a magnetic flux) at the time of opto-magnetic recording when the optical disc 1080 is an opto-magnetic disc.

It is also possible to easily prepare the rails and/or coil of the bottom face 1320B of the optical device 1320 by forming the optical device 1320 in a parallelopiped or approximately parallelopiped or plate-like or approximately plate-like shape by utilizing a semiconductor manufacturing process.

As an example, the size of the optical system 1329 in a lateral direction is made about 1 mm, the size in a vertical direction is made about 0.5 mm, and the size in a height direction is made about 0.4 mm.

As an example, the size of the optical device 1300 in the height direction is made about 0.3 mm, and the size of the optical device 1320 in the height direction is made about 0.13 mm.

As an example, a diameter of the bottom face (or the flat face) of the lens 1302 is made about 0.2 mm, and the diameter of the bottom face (or the flat face) of the lens 1322 is made about 0.1 mm.

Second Embodiment of Optical Head Using First optical Device

Figure 21:
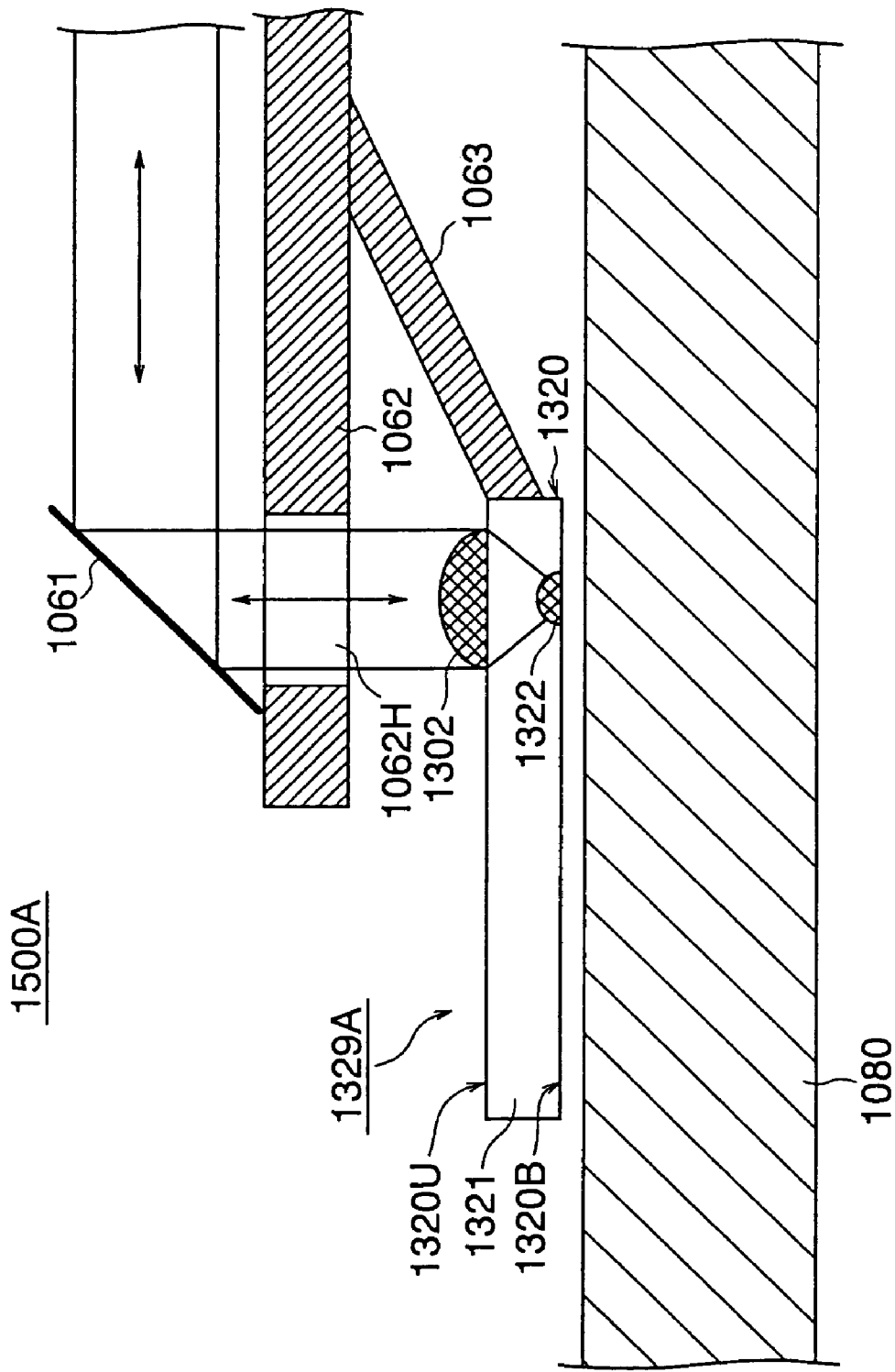
FIG. 21 is a schematic view of the configuration of a second embodiment of an optical head using the first optical device according to the present invention.

FIG. 21 is a schematic view of the configuration of a second embodiment of an optical head using the first optical device according to the present invention. Note that, identical reference numerals are assigned to identical components as those of the optical head 1500 of FIG. 19 and the optical system 1329 of FIG. 20. Explanations of the identical components will be appropriately omitted.

This optical head 1500A is configured as the optical head 1500 of FIG. 19 without the base 1301 and with an optical system 1329A attached to the suspension 1063.

The optical head 1500A has an optical system 1329A and a mirror 1061. A flying head is comprised by the swing arm 1062 and the suspension 1063.

The optical system 1329A is configured as the optical system 1329 of FIG. 19 and FIG. 20 with the base 1301 is removed.

This optical system 1329A has an optical device 1320 and a lens 1302. The lens 1302 is stacked upon the optical device 1320. Also, the optical system 1329A comprises a slider, the bottom face 1320B of the optical device 1320 of the optical system 1329A and the surface of the optical disc 1080 face each other, and the bottom face 1320B of the optical device 1320 comprises a slider face.

The mirror 1061 is attached to the upper face of the swing arm 1062. The suspension 1063 is attached to the bottom face of the swing arm, or the suspension 1063 is formed.

Also, a through hole 1062H through which the reflected beam of the mirror 1061 may pass is formed in the swing arm 1062.

The optical device 1320 of the optical system 1329A is attached to the front end of the suspension 1063.

The mirror 1061 is supplied with the laser beam of the parallel beam from the base side of the swing arm 1062, reflects the supplied laser beam, and supplies the same via the through hole 1062H to the optical system 1329A.

The optical system 1329A collects the laser beam from the mirror 1061 by using the lenses 1302 and 1322 and focuses it on the recording surface of the optical disc 1080. Also, the optical system 1329A returns the laser beam reflected at the recording surface of the optical disc 1080 (returned laser beam) via the through hole 1062H to the mirror 1061.

The mirror 1061 reflects the returned laser beam from the optical system 1329A and returns it to the base side of the swing arm 1062.

Figure 22:
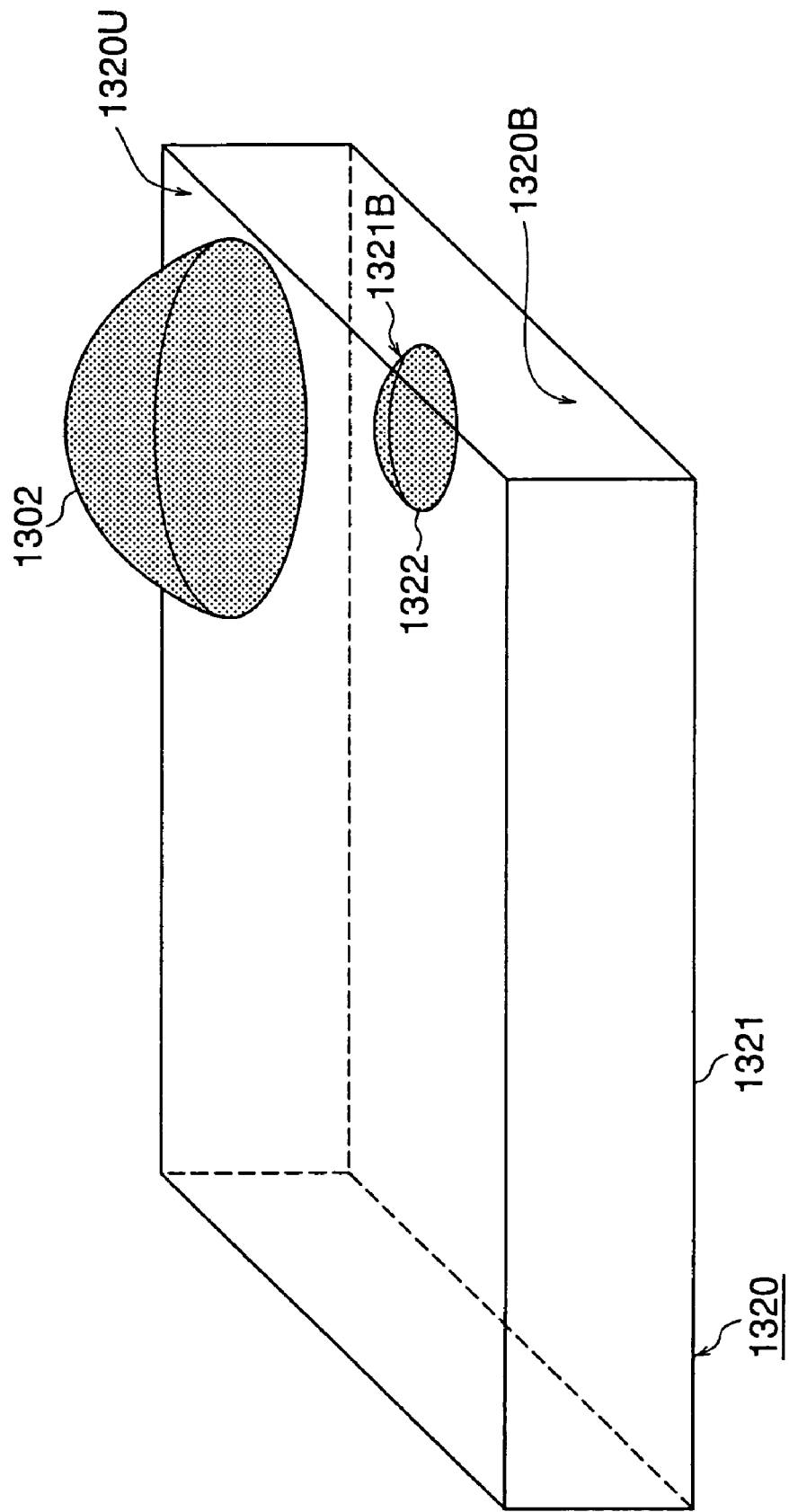
FIG. 22 is a schematic view of the configuration of an optical system shown in FIG. 21.

FIG. 22 is a schematic view of the configuration of the optical system 1329A in FIG. 21.

The upper face of the lens 1302 exhibits a rotationally symmetric or approximately rotationally symmetric curved shape.

The bottom face of the lens 1302 is flat and is bonded to the upper face 1320U of the optical device 1320 (or the upper face of the base 1321).

The lens 1302 and the optical device 1320 are bonded so that the optical axes of the lenses 1302 and 1322 are located on the identical straight line or approximately identical straight line. Note that, by rounding the edges of the bottom face (face facing the optical disc 1080) 1320B of the optical device 1320, it is possible to reduce collision with and/or impact to the surface of the optical disc 1080.

Third Embodiment of Optical Head Using First Optical Device

Figure 23:
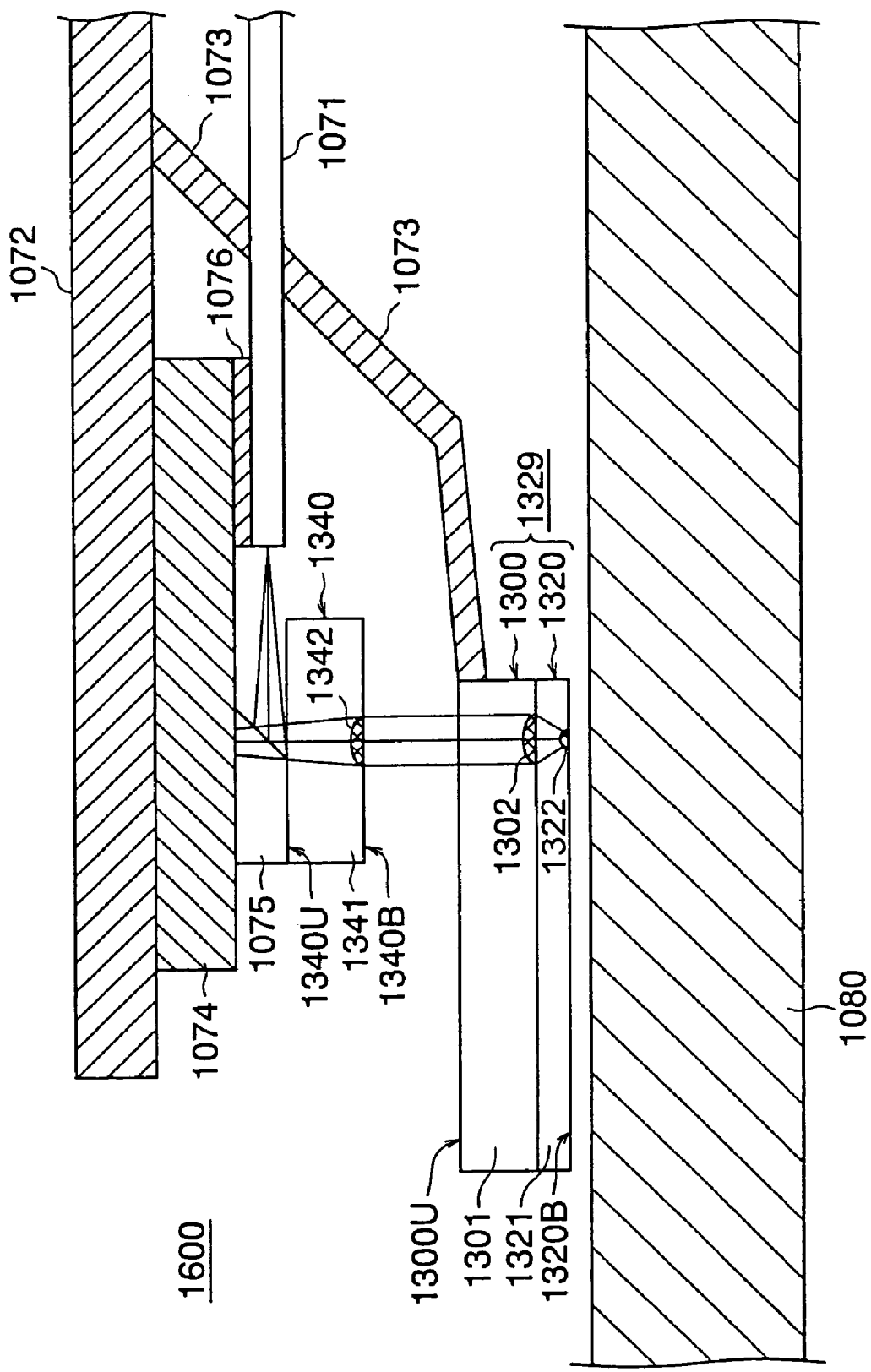
FIG. 23 is a schematic view of the configuration of a third embodiment of an optical head using the first optical device according to the present invention.

FIG. 23 is a schematic view of the configuration of a third embodiment of an optical head using the first optical device according to the present invention.

This optical head 1600 has an optical system 1329, an IC chip 1074, a prism 1075 and an optical device 1340. A flying head is comprised by a swing arm 1072 and a suspension 1073.

The optical system 1329 has the optical devices 1300 and 1320. The optical device 1300 is stacked upon the optical device 1320. This optical system 1329 comprises a slider, the bottom face 1320B of the optical device 1320 of the optical system 1329 and the surface of the optical disc 1080 face each other, and the bottom face 1320B of the optical device 1320 comprises the slider face.

The optical system 1320 has an identical configuration to the optical system 1329 shown in FIG. 19 and FIG. 20. Explanations thereof will be appropriately omitted.

The suspension 1073 is attached to the bottom face of the swing arm 1072, or the suspension 1073 is formed.

Also, the upper face of the IC chip 1074 is bonded to the front end of the bottom face of the swing arm 1072, and a not illustrated signal line and power supply line are disposed along the swing arm 1072. Electric power can be supplied to the IC chip 1074 by the power supply line, while an output signal of the IC chip 1074 can be taken out and a signal can be supplied to the IC chip 1074 by the signal line.

The upper face of the prism 1075 and the upper face of a seat 1076 are bonded to the bottom face of the IC chip 1074.

The upper face of the optical device 1340 is bonded to the bottom face of the prism 1075.

An optical fiber 1071 is bonded to the bottom face of the seat 1076. For example, a V-shaped groove is formed in the bottom face of the seat 1076, and the optical fiber 1071 is bonded by the adhesive so that the optical fiber is inserted in the V-shaped groove. Note that, the seat 1076 is desirably made of an identical material to that for the IC chip 1074.

The optical system 1329 is attached to the front end of the suspension 1073.

The optical device 1340 has a base 1341 and a lens 1342. The base 1341 is made of an optical material. The base 1341 and the lens 1342 are different in refractive index.

The base 1341 has a rotationally symmetric or approximately rotationally symmetric concavity in the bottom face of the base 1341. The shape of the surface of the concavity when the concavity is cut along its symmetry axis is preferably made an arc or approximately an arc. The concavity is filled with an optical material having a refractive index different from the base 1341. The lens 1342 is comprised by the concavity filled with the related optical material.

The bottom face of the lens 1342 is flat and is parallel or approximately parallel to an upper face 1340U of the optical device 1340 (or the upper face of the base 1341). Also, the flat faces of the bottom face of the lens 1342 and the bottom face of the base 1341 are located in the identical plane and comprise a bottom face 1340B of the optical device 1340.

The optical device 1340 exhibits a parallelopiped or approximately parallelopiped shape. When light enters the upper face 1340U, the beam emitted from the bottom face 1340B of the optical device 1340 can be changed to a parallel beam by the lens 1342.

The inclined face of the prism 1075 reflects the laser beam output from the optical fiber 1071 and supplies the same to the optical device 1340.

The optical device 1340 changes the laser beam from the prism 1075 to a parallel beam and supplies the same to the optical system 1329.

The optical system 1329 collects the laser beam from the optical device 1340 by using the lenses 1302 and 1322 and focuses it to the recording surface of the optical disc 1080. Also, the optical system 1329 returns the laser beam reflected at the recording surface of the optical disc 1080 (returned laser beam) via the optical device 1340 to the prism 1075.

The prism 1075 passes the returned laser beam from the optical system 1329 therethrough and supplies the same to the IC chip 1074.

The IC chip 1074 is an optical semiconductor composite device. A photo-detector and a processing circuit are formed on the bottom face of the IC chip 1074, or the photo-detector and the processing circuit are attached.

The photo-detector receives the returned laser beam and supplies a reception light signal in accordance with the returned laser beam to the processing circuit.

The processing circuit performs the predetermined processing based on the reception light signal from the photo-detector and creates a signal indicating the result of the processing. This signal can be taken out from the signal line connected to the IC chip 1074.

Fourth Embodiment of Optical Head Using First Optical Device

Figure 24:
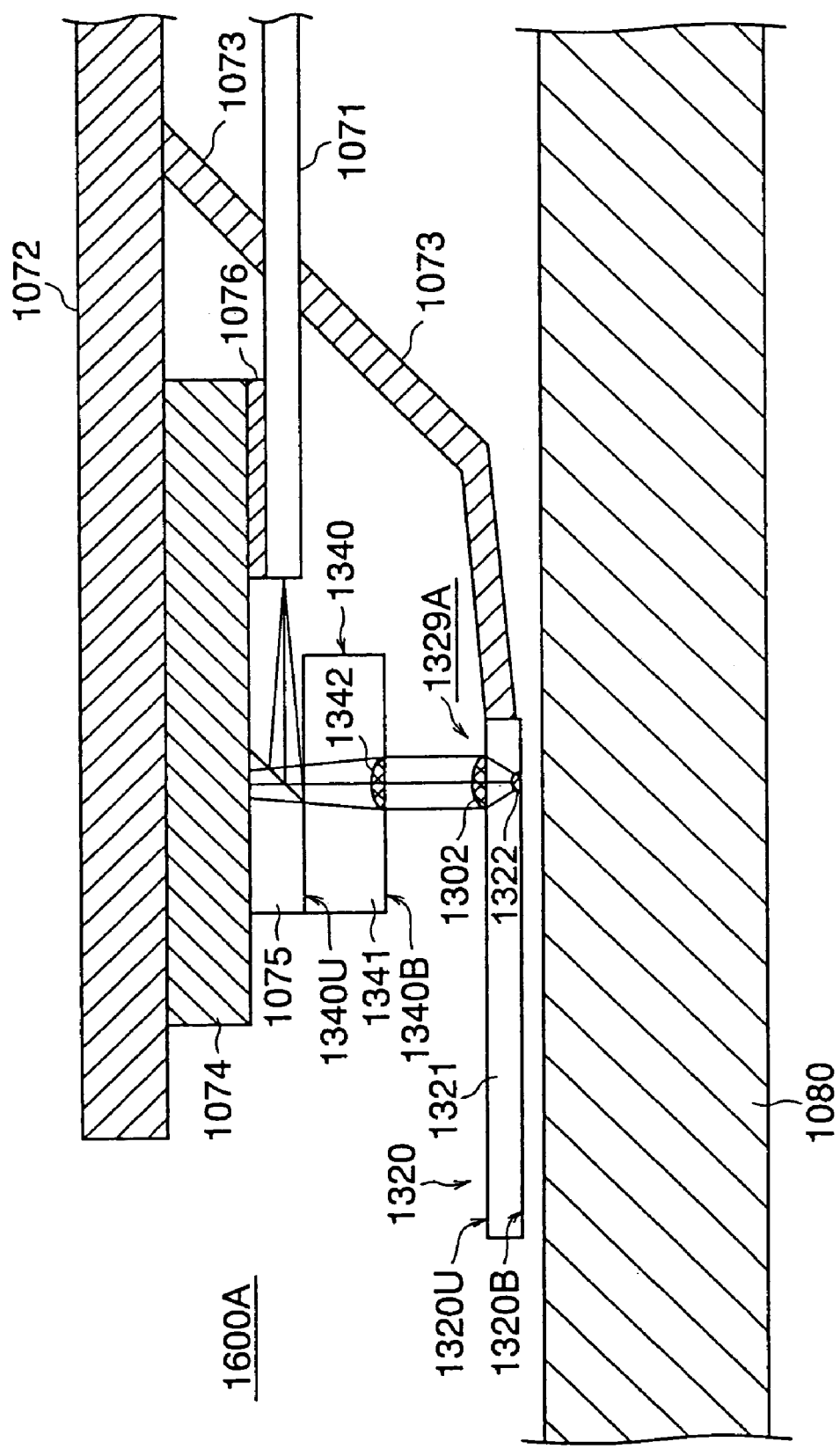
FIG. 24 is A schematic view of the configuration of a fourth embodiment of an optical head using the first optical device according to the present invention.

FIG. 24 is a schematic view of the configuration of a fourth embodiment of an optical head using the first optical device according to the present invention. Note that, identical reference numerals are assigned to identical components as those of the optical head 1600 of FIG. 23 and the optical system 1329A of FIG. 21 and FIG. 22. Explanations of the identical components will be appropriately omitted.

This optical head 1600A is configured as the optical head 1600 of FIG. 23 without the base 1301 and with the optical system 1329A attached to the suspension 1073.

The optical head 1600A has the optical system 1329A, IC chip 1074, prism 1075, and the optical device 1340. A flying head is comprised by the swing arm 1072 and the suspension 1073.

The optical system 1329A has an identical configuration to the optical system 1329A of FIG. 21 and FIG. 22. The optical device 1320 of the optical system 1329A is attached to the front end of the suspension 1073.

The inclined face of the prism 1075 reflects the laser beam output from the optical fiber 1071 and supplies the same to the optical device 1340.

The optical device 1340 changes the laser beam from the prism 1075 to a parallel beam and supplies the same to the optical system 1329A.

The optical system 1329A collects the laser beam from the optical device 1340 by using the lenses 1302 and 1322 and focuses it on the recording surface of the optical disc 1080. Also, the optical system 1329A returns the laser beam reflected at the recording surface of the optical disc 1080 (returned laser beam) via the optical device 1340 to the prism 1075.

The prism 1075 passes the returned laser beam from the optical system 1329A therethrough and supplies the same to the IC chip 1074.

Second Embodiment of Optical Device (Second Optical Device)

Figure 25:
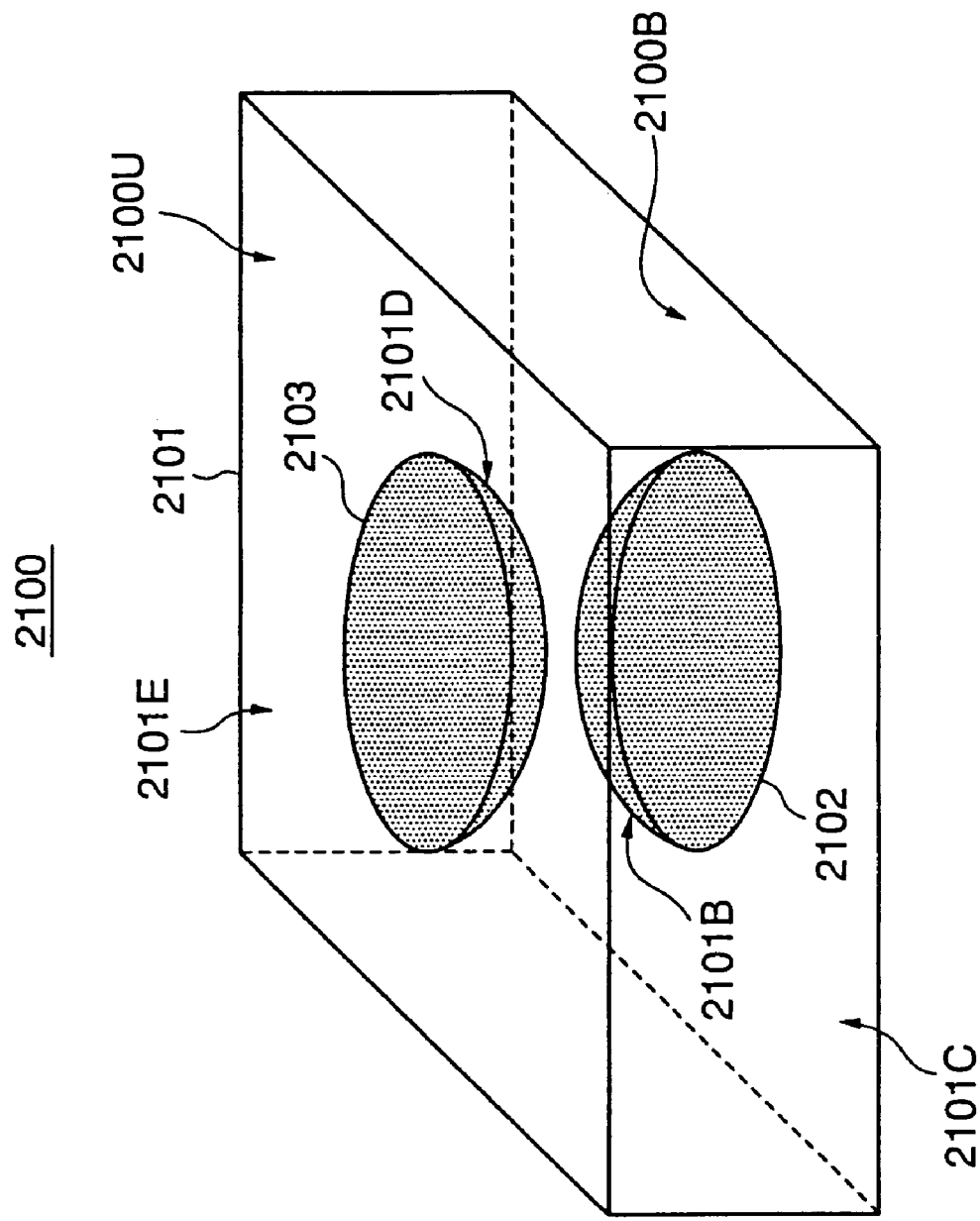
FIG. 25 is a schematic view of the configuration of a second embodiment of an optical device according to the present invention.

FIG. 25 is a schematic view of the configuration of an embodiment of a second optical device according to the present invention.

This optical device 2100 has a parallelopiped or approximately parallelopiped shape. The optical device 2100 has a base (substrate) 2101 and lenses 2102 and 2103.

The base 2101 and the lenses 2102 and 2103 of the optical device 2100 have different refractive indexes. Light can be refracted at boundaries of the base 2101 and the lenses 2102 and 2103. For example, when light enters the flat face of the lens 2103, a beam emitted from the flat face of the lens 2102 can be converged (collected) or scattered or can be changed to a parallel beam.

The base 2101 has a rotationally symmetric or approximately rotationally symmetric concavity 2101B in a lower face 2100B of the base 2101. The shape of the surface of the concavity 2101B when the concavity 2101B is cut along its symmetry axis is preferably made an arc or approximately an arc.

The concavity 2101B is filled with an optical material having a refractive index different from the base 2101. The lens 2102 is comprised by the concavity 2101B filled with the related optical material.

Also, a convex curved face of the lens 2102 tightly contacts the surface of the concavity 2101B of the base 2101.

The lower face of the lens 2102 is flat or approximately flat and is parallel or approximately parallel to an upper face of the optical device 2100 (or an upper face 2100U of the base 2101). Also, the lower face of the lens 2102 and the flat portion 2101C of the lower face 2100B of the base 2101 are parallel or approximately parallel and located in an identical plane in FIG. 1.

The base 2101 has a rotationally symmetric or approximately rotationally symmetric concavity 2101D in an upper face 2100U of the base 2101. The shape of the surface of the concavity 2101D when the concavity 2101D is cut along its symmetry axis is preferably made an arc or approximately an arc.

The concavity 2101D is filled with an optical material having a refractive index different from the base 2101. The lens 2103 is comprised by the concavity 2101D filled with the related optical material.

Also, the convex curved face of the lens 2103 tightly contacts the surface of the concavity 2101D of the base 2101.

The upper face of the lens 2103 is flat or approximately flat and is parallel or approximately parallel to the lower face of the optical device 2100 (or the lower face 2100B of the base 2101). Also, the upper face of the lens 2103 and a flat portion 2101E of the upper face 2100U of the base 2101 are parallel or approximately parallel, and located in an identical plane in FIG. 1.

The symmetry axes of the concavities 2101B and 2101D of the base 2101 are located on the identical straight line or approximately identical straight line. Contrary to this, the optical axes of the lenses 2102 and 2103 are located on the identical straight line or approximately identical straight line. The lenses 2102 and 2103 are preferably given identical or approximately the same sizes.

When the material of the base 2101 is made for example quartz and the material of the lenses 2102 and 2103 is made for example silicon nitride, the lenses 2102 and 2103 have larger refractive indexes than the base 2101, so a function of a convex lens can be imparted to the lenses 2102 and 2103.

Conversely, when the material of the base 2101 is made for example silicon nitride and the material of the lenses 2102 and 2103 is made for example quartz, the lenses 2102 and 2103 have smaller refractive indexes than the base 2101, so the function of a concave lens can be imparted to the lenses 2102 and 2103.

First Embodiment of Method of Production of Second Optical Device

FIGS. 26A to 27E are schematic explanatory views of a first embodiment of the method of production of the second optical device according to the present invention. By this method of production, it is possible to obtain an optical device having an identical structure or approximately identical structure to the optical device 2100 of FIG. 1.

Figure 26A:
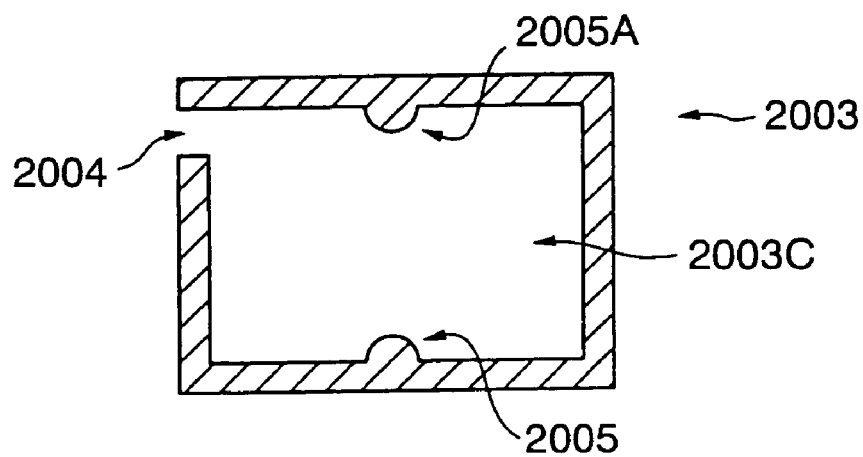
FIGS. 26A to 26C are schematic explanatory views of a first embodiment of a method of production of the second optical device according to the present invention.

FIG. 26A shows a metallic mold 2003. In this metallic mold 2003, a passageway 2004 for passing a liquid-like or fluid-like optical material 2006L and a cavity 2003C are formed. Also, in the cavity 2003C of the metallic mold 2003, a lower inner wall and an upper inner wall face each other, a projection 2005 projecting out into the cavity 2003C is formed on the lower inner wall, a projection 2005A projecting out into the cavity 2003C is formed on the upper inner wall, and the areas around the projections 2005 and 2005A are flat.

The projection 2005 has an identical or approximately identical shape to the lens 2102 of the optical device 2100 of FIG. 25 and has a rotationally symmetric or approximately rotationally symmetric shape.

Also, the projection 2005A has an identical or approximately identical shape to the lens 2103 of the optical device 2100 of FIG. 25 and has a rotationally symmetric or approximately rotationally symmetric shape.

The symmetry axes of the projections 2005 and 2005A are located on the identical straight line or approximately identical straight line.

Figure 26B:
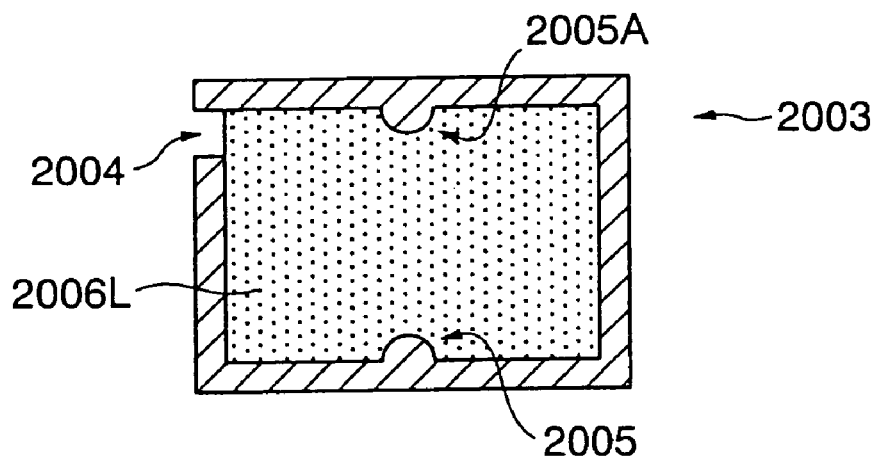

In FIG. 26B, the optical material 2006L is injected into the cavity 2003C from the passageway 2004 of the metallic mold 2003, and the optical material 2006 is filled in the cavity 2003C. The optical material 2006L injected is made for example molten quartz, a plastic, or a synthetic resin.

Figure 26C:
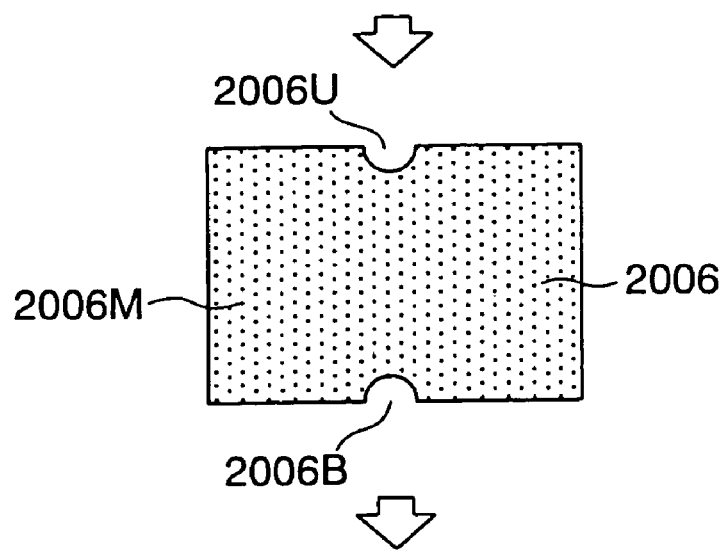

In FIG. 26C, the liquid-like optical material 2006L is hardened to a solid-state optical material 2006M, and a base 2006 made of the optical material 2006M is taken out from the metallic mold 2003.

The shape of the projection 2005 is transferred to the lower face of the base 2006 taken out from the metallic mold 2003 to form a concavity 2006B. The concavity 2006B has a symmetric or approximately symmetric shape. The area around the concavity 2006B of the base 2006 is flat.

Also, the shape of the projection 2005A is transferred to the upper face of the base 2006 to form a concavity 2006U. The concavity 2006U has a symmetric or approximately symmetric shape. The area around the concavity 2006U of the base 2006 is flat.

The symmetry axes of the concavities 2006B and 2006U of the base 2006 are located on the identical straight line or approximately identical straight line.

In FIG. 27D, an optical material 2007M is filled in the concavity 2006B of the lower face of the base 2006. The optical material 2007M has a refractive index different from the optical material 2006M, preferably has a larger refractive index than the optical material 2006M, and is made silicon nitride as an example.

For example, by forming a layer 2007 of the optical material 2007M on the lower face of the base 2006 by sputtering, vapor deposition, or ion implantation, the optical material 2007M is filled in the concavity 2006B of the base 2006. In this case, a concavity 2007B corresponding to the concavity 2006B is formed in the layer 2007.

Also, an optical material 2071M is filled in the concavity 2006U of the upper face of the base 2006. This optical material 2071M is preferably made an identical material to the optical material 2007M.

For example, by forming a layer 2071 of the optical material 2071M on the upper face of the base 2006 by sputtering, vapor deposition, or ion implantation, the optical material 2071M is filled in the concavity 2006U of the base 2006. In this case, a concavity 2071U corresponding to the concavity 2006U is formed in the layer 2071.

Note that, it is also possible to fill the optical material 2007M in the concavities 2006B and 2006U of the base 2006 by making the optical materials 2007M and 2071M identical material and forming the layers 2007 and 2071 of the optical material 2007M on the upper and lower faces of the base 2006 by vapor deposition.

In FIG. 27E, the lower face (bottom face) of the layer 2007 is flattened. For example, it is polished so that the concavity 2007B of the lower face of the layer 2007 disappears. Preferably, the lower face of the layer 2007 is polished so that a flat face vertical with respect to the symmetry axis of the concavity 2006B of the base 2006 is formed. Alternatively, the layer 2007 is polished so that the flat portion (or flat face) at the area around the concavity 2006B of the base 2006 and the lower face of the layer 2007 become parallel or approximately parallel.

Also, the upper face of the layer 2071 is flattened. For example, it is polished so that the concavity 2071U of the upper face of the layer 2071 disappears. Preferably, the upper face of the layer 2071 is polished so that a flat face vertical with respect to the symmetry axis of the concavity 2006U of the base 2006 is formed. Alternatively, the layer 2071 is polished so that the flat portion (or flat face) at the area around the concavity 2006U of the base 2006 and the upper face of the layer 2071 become parallel or approximately parallel.

By polishing the layers 2007 and 2071 so that the flat portions at the areas around the concavities 2006B and 2006U of the base 2006 are exposed, it is possible to obtain an optical device having an same structure as that of the optical device 2100 of FIG. 1.

Note that, the base 2006 and the concavities 2006B and 2006U of FIG. 27E correspond to the base 2101 and the concavities 2101B and 2101D of the optical device 2100 of FIG. 1.

The upper and lower inner walls of the metallic mold 2003 have projections 2005 and 2005A projecting out into the cavity 2003C, so the processing precision can be improved in comparison with the case where a concavity having a sunken shape is formed in the cavity 2003C and a convex lens is formed by simple molding. In this way, by using the metallic mold 2003, it is possible to prepare a small sized convex lens having a higher processing precision than a convex lens obtained by simple molding.

Note that it is also possible to perform the molding by using an upper mold and a lower mold in place of the mold shown in FIGS. 26A and 26B. A projection is formed at the inner wall on the lower side of the lower mold, and the area around this projection is made flat. This projection is identical to the projection 2005 of FIGS. 26A and 26B. A projection is also formed at the inner wall on the lower side of the upper mold, and the area around this projection is flat. This projection is identical to the projection 2005A of FIGS. 26A and 26B.

First, by injecting an optical material (for example a glass material) into the cavity between the upper mold and the lower mold and simultaneously heating the glass material, lower mold, and upper mold to a predetermined temperature, the glass material is softened. Then, the softened glass material is pressed by the upper mold. In this case, the symmetry axes of the concavities on the inner walls of the upper mold and the lower mold are located on the identical straight line or approximately identical straight line.

Next, the glass material, lower mold, and upper mold are cooled to harden the glass material and the base 2006 is taken out from the metallic molds. The shape of the projection 2005 is transferred to the lower face of this base 2006 taken out from the metallic molds to form the concavity 2006B, while the shape of the projection 2005A is transferred to the upper face of the base 2006 to form the concavity 2006U.

In this way, it is also possible to obtain the base 2006 shown in FIG. 26C.

Second Embodiment of Method of Production of Second Optical Device

FIGS. 28A to 29H are schematic explanatory views of a second embodiment of the method of production of the second optical device according to the present invention. By this method of production, it is possible to obtain an optical device having an identical configuration or approximately identical configuration to the optical device 2100 of FIG. 1.

Figure 28A:
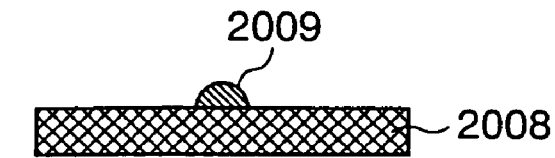
FIGS. 28A to 28E are schematic explanatory views of a second embodiment of the method of production of the second optical device according to the present invention.

In FIG. 28A, a resist 2009 is formed on the flat face of a silicon substrate 2008—an example of the base. The size of the bottom face of the resist 2009 is made identical or approximately identical to the size of the flat faces of the lenses 2102 and 2103 in FIG. 1.

Figure 28B:
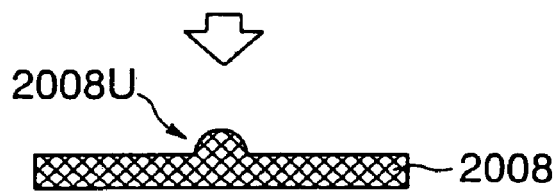

In FIG. 28B, a projection 2008U is formed at the surface of the silicon substrate 2008 by etching using the resist 2009 as the mask. The shape of the projection 2008U is identical to the shapes of the lenses 2102 and 2103 and is rotationally symmetric or approximately rotationally symmetric. As the etching, use is made of for example ion milling or RIE.

Figure 28C:
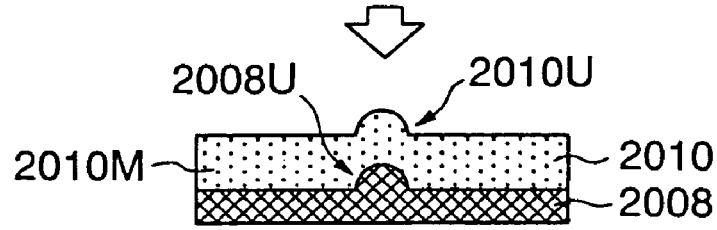

In FIG. 28C, an optical material 2010M is laminated on the surface of the silicon substrate 2008 formed with the projection 2008U so as to bury the projection 2008U and thereby form a base made of a layer 2010 of the optical material 2010M. It is also possible to form the layer 2010 by using for example sputtering, vapor deposition, or ion implantation.

When the layer 2010 is formed on the silicon substrate 2008, a projection 2010U corresponding to the projection 2008U is formed on the upper face of the layer 2010.

Figure 28D:
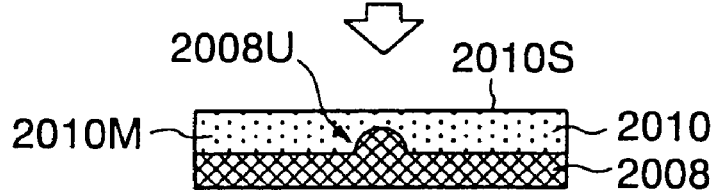

In FIG. 28D, the upper face of the layer 2010 is flattened. For example, it is polished so that the projection 2010U of the upper face of the layer 2010 disappears and thereby to form a flat face 2010S. Preferably, the upper face of the layer 2010 is polished so that a flat face vertical with respect to the symmetry axis of the projection 2008U of the silicon-substrate 2008 is formed. Alternatively, the layer 2010 is polished so that the flat portion at the area around the projection 2008U of the silicon substrate 2008 and the upper face of the layer 2010 become parallel or approximately parallel.

In this way, a plurality of silicon substrates 2008 and layers 2010 shown in FIG. 28D are created.

Figure 28E:
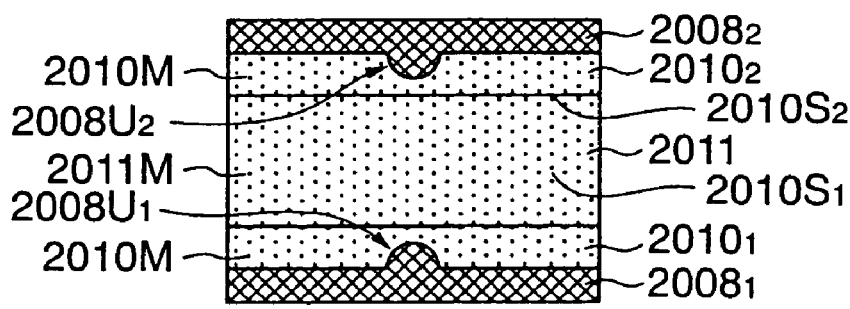

In FIG. 28E, a flat face 2010S$_1$ of a layer 2010$_2$ is bonded to the flat face on a lower side of the base 2011 with the facing flat faces formed thereon. Also, a flat face 2010S$_2$ of a layer 2010$_2$ is bonded to an upper side flat face of the base 2011. Projections 2008U$_1$ and 2008U$_1$ are located on the identical straight line or approximately identical straight line.

Note that silicon substrates 2008$_1$ and 2008$_2$, projections 2008U$_1$ and 2008U$_2$, layers 2010$_1$ and 2010$_2$, and the flat faces 2010S$_1$ and 2010S$_2$ have the same configurations as those of the corresponding silicon substrate 2008, projection 2008U, layer 2010, and surface 2010S of FIG. 28D.

Also, as the bonding method of the upper and lower flat faces of the base 2011 and the flat face 2010S$_1$ and 2010S$_2$ of the layers 2010$_1$ and 2010$_2$, it is possible to bond by for example a transparent adhesive or possible to bond by anodic bonding. The optical material 2011M of the base 2011 is preferably made the same material as the optical material 2010M.

Figure 29F:
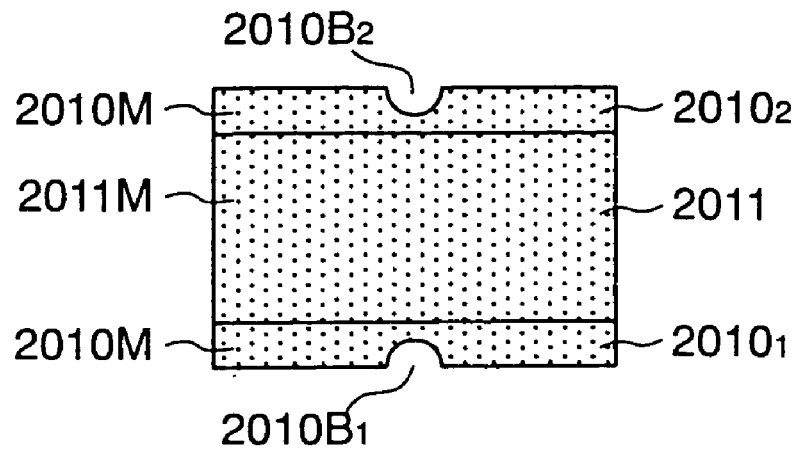
FIGS. 29F to 29H are schematic explanatory views of the second embodiment of the method of production of the second optical device according to the present invention continued from FIG. 28E.

In FIG. 29F, the silicon substrate 2008$_1$ bonded to the lower face of the layer 2010$_1$ of FIG. 28E is removed to expose the lower face of the layer 2010$_1$. Also, the silicon substrate 2008$_2$ bonded to the lower face of the layer 2010$_2$ of FIG. 28E is removed to expose the upper face of the layer 2010$_2$.

Note that, it is also possible to dissolve and remove the silicon substrates 2008$_1$ and 2008$_2$ by for example an aqueous solution of potassium hydroxide.

The shape of the projection 2008U$_1$ of the silicon substrate 2008$_1$ is transferred to the lower face of the layer 2010$_1$ to form the concavity 2010B$_1$ corresponding to the projection 2008U$_1$. The concavity 2010B$_1$ has a rotationally symmetric or approximately rotationally symmetric shape.

The shape of the projection 2008U$_2$ of the silicon substrate 2008$_2$ is transferred to the upper face of the layer 2010$_2$ to form the concavity 2010B$_2$ corresponding to the projection 2008U$_2$. The concavity 2010B$_2$ has a rotationally symmetric or approximately rotationally symmetric shape.

The symmetry axes of the concavities 2010B$_1$ and 2010B$_2$ are located on the identical straight line or approximately identical straight line.

Figure 29G:
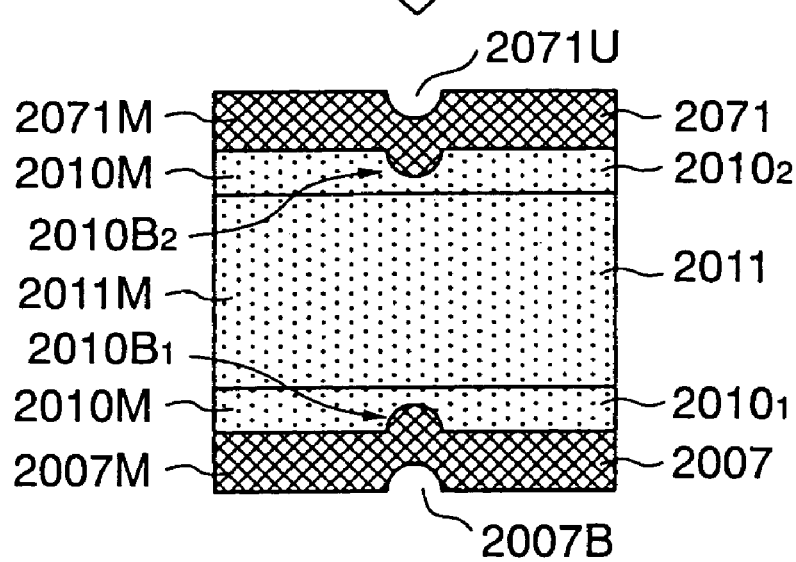

In FIG. 29G, the optical material 2007M is filled in the concavity 2010B$_1$ of the lower face of the layer 2010$_1$. The optical material 2007M has a refractive index different from the optical material 2010M, preferably has a larger refractive index than the optical material 2010M. Silicon nitride is used as an example.

For example, by forming the layer 2007 of the optical material 2007M on the lower face of the layer 2010$_1$ by sputtering, vapor deposition, or ion implantation, the optical material 2007M is filled in the concavity 2010B$_1$ of the layer 2010$_1$. In this case, a concavity 2007B corresponding to the concavity 2010B$_1$ is formed in the layer 2007.

Also, the optical material 2071M is filled in the concavity 2010B$_2$ of the upper face of the layer 2010$_2$. The optical material 2071M is preferably made the same material as the optical material 2007M.

For example, by forming the layer 2071 of the optical material 2071M on the upper face of the layer 2010$_2$ by sputtering, vapor deposition, or ion implantation, the optical material 2071M is filled in the concavity 2010B$_2$ of the layer 2010$_2$. In this case, a concavity 2071U corresponding to the concavity 2010B$_2$ is formed in the layer 2071.

Note that, it is also possible to fill the optical material 2007M in the concavities 2010B$_1$ and 2010B$_2$ of the bases 2010$_1$ and 2010$_2$ by making the optical materials 2007M and 2071M the identical material and forming the layers 2007 and 2071 of the optical material 2007M on the lower face of the base 2010$_1$ and the upper face of the base 2010$_2$ by vapor deposition.

Figure 29H:
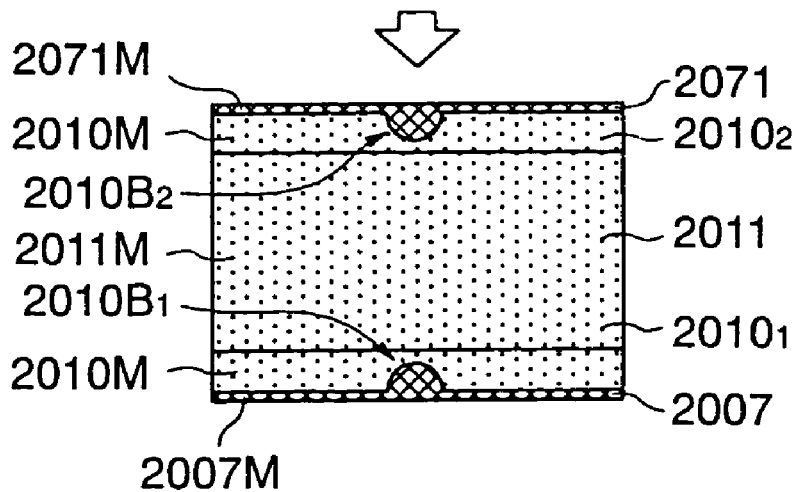

In FIG. 29H, the lower face (bottom face) of the layer 2007 is flattened. For example, it is polished so that the concavity 2007B in the lower face of the layer 2007 disappears. Preferably, the lower face of the layer 2007 is polished so that a flat face vertical with respect to the symmetry axis of the concavity 2010B$_1$ of the layer 2010$_1$ is formed. Alternatively, the layer 2007 is polished so that the flat portion (or flat face) at the area around the concavity 2010B$_1$ of the layer 2010$_1$ and the lower face of the layer 2007 become parallel or approximately parallel.

Also, the upper face of the layer 2071 is flattened. For example, it is polished so that the concavity 2071U of the upper face of the layer 2071 disappears. Preferably, the upper face of the layer 2071 is polished so that a flat face vertical with respect to the symmetry axis of the concavity 2010B$_2$ of the layer 2010$_2$ is formed. Alternatively, the layer 2071 is polished so that the flat portion (or flat face) at the area around the concavity $2010B_2$ of the layer $2010_2$ and the upper face of the layer 2071 become parallel or approximately parallel.

By polishing the layers 2007 and 2071 so that the flat portions at the area around the concavities $2010B_1$ and $2010B_2$ of the layers $2010_1$ and $2010_2$ are exposed, it is possible to obtain an optical device having an identical structure or approximately identical structure to the optical device 2100 of FIG. 1.

Note that, the base 2011 with the layers $2010_1$ and $2010_2$ of FIG. 29H bonded thereto and the concavities $2010B_1$ and $2010B_2$ correspond to the base 2101 and the concavities 2101B and 2101D of the optical device 2100 of FIG. 1.

Third Embodiment of Method of Production of Second Optical Device

FIGS. 30A to 31G are schematic explanatory views of a third embodiment of the method of production of the second optical device according to the present invention. By this method of production, it is possible to obtain an optical device having an identical configuration or approximately identical configuration to the optical device 2100 of FIG. 1.

Figure 30A:
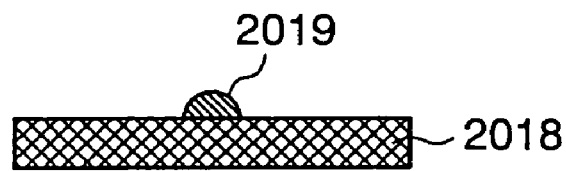
FIGS. 30A to 30D are schematic explanatory views of a third embodiment of the method of production of the second optical device according to the present invention.

In FIG. 30A, a resist 2019 is formed at the flat face of a silicon substrate 2018—an example of the base. The size of the bottom face of the resist 2019 is made identical or approximately identical to the sizes of the flat faces of the lenses 2102 and 2103 in FIG. 1.

Figure 30B:
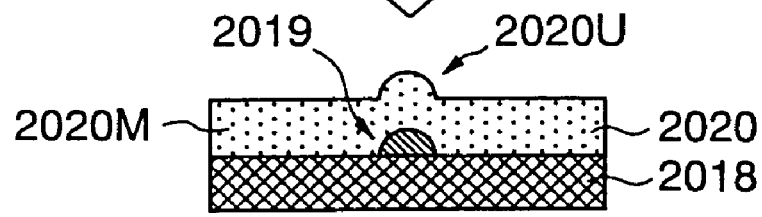

In FIG. 30B, an optical material 2020M is laminated on the surface of the silicon substrate 2018 formed with the resist 2019 to bury the resist 2019 and thereby to form a base made of a layer 2020 of the optical material 2020M. It is also possible to form the layer 2020 of the optical material 2020M by using for example sputtering, vapor deposition, or ion implantation. It is also possible to use for example aluminum oxide as the optical material 2020M.

When the layer 2020 is formed on the silicon substrate 2018, a projection 2020U in accordance with the resist 2019 is formed on the surface of the layer 2020.

Figure 30C:
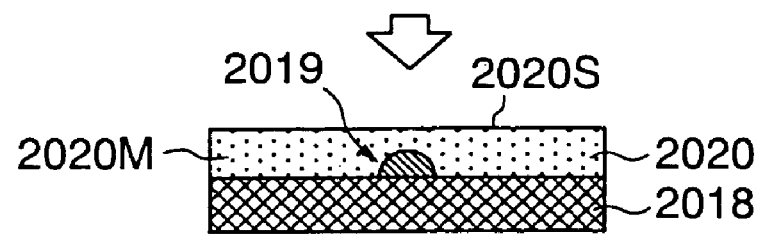

In FIG. 30C, the upper face of the layer 2020 is flattened. For example, it is polished so that a projection 2020U of the upper face of the layer 2020 disappears to form a flat face 2020S. Preferably, the upper face of the layer 2020 is polished so that a flat face vertical with respect to the symmetry axis of the resist 2019 on the silicon substrate 2018 is formed. Alternatively, the layer 2020 is polished so that the flat portion (or flat face) at the area around the resist 2019 on the silicon substrate 2018 and the upper face of the layer 2020 become parallel or approximately parallel.

In this way, a plurality of silicon substrates 2018 and layers 2020 shown in FIG. 30C are created.

Figure 30D:
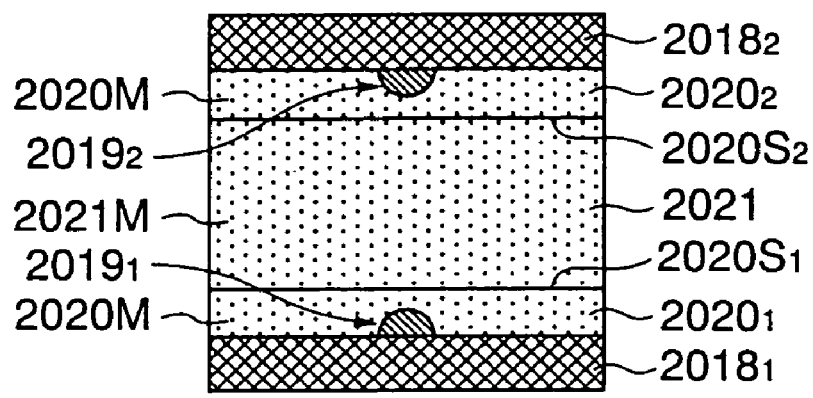

In FIG. 30D, a flat face $2020S_1$ of a layer $2020_1$ is bonded to the flat face on the lower side of the base 2021 having the facing flat faces. Also, a flat face $20S_2$ of a layer $2020_2$ is bonded to the flat face on the upper side of a base 2021. The symmetry axes of resists $2019_2$ and $2019_2$ are located on the identical straight line or approximately identical straight line.

Note that, the silicon substrates $2018_1$ and $2018_2$, resists $2019_1$ and $2019_2$, layers $2020_1$ and $2020_2$, and flat faces $2020S_1$ and $2020S_2$ have same configurations as those of the corresponding silicon substrate 2018, resist 2019, layer 2020, and flat face 2020S of FIG. 30C.

Also, as the bonding method of the upper and lower flat faces of the base 2021 and the flat faces $2020S_1$ and $2020S_2$ of the layers $2020_1$ and $2020_2$, for example, it is possible to bond by a transparent adhesive or possible to bond by anodic bonding. An optical material 2021M of the base 2021 is preferably made the same material as the optical material 2020M.

Figure 31E:
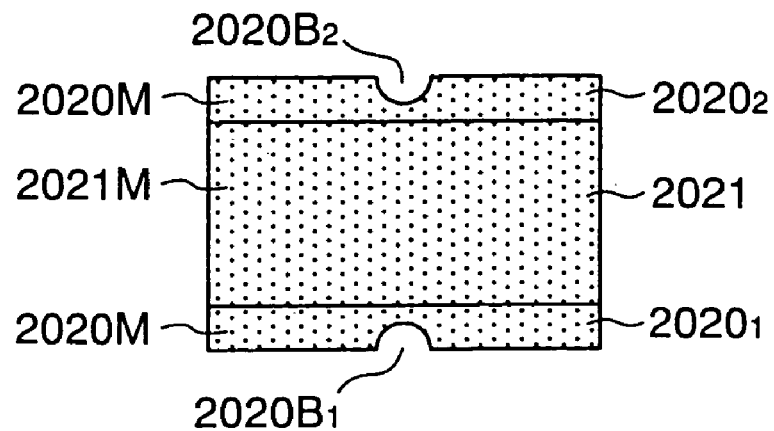
FIGS. 31E to 31G are schematic explanatory views of the third embodiment of the method of production of the second optical device according to the present invention continued from FIG. 30D.

In FIG. 31E, the silicon substrate $2018_1$ and the resist $2019_1$ bonded to the lower face of the layer $2020_1$ of FIG. 30D are removed to expose the lower face of the layer $2020_1$. Also, the silicon substrate $2018_2$ and the resist $2019_2$ bonded to the lower face of the layer $2020_2$ of FIG. 30D are removed to expose the lower face of the layer $2020_2$.

Note that it is also possible to dissolve and remove the silicon substrates $2018_1$ and $2018_2$ by for example an aqueous solution of potassium hydroxide. It is also possible to dissolve and remove the resists $2019_1$ and $2019_2$ by for example a resist use peeling solution or an organic solvent (for example acetone).

The shape of the resist $2019_1$ is transferred to the lower face of the layer $2020_1$ to form a concavity $2020B_1$ corresponding to the shape of the resist $2019_1$. The concavity $2020B_1$ has a symmetric or approximately symmetric shape.

Also, the shape of the resist $2019_2$ is transferred to the upper face of the layer $2020_2$ to form a concavity $2020B_2$ corresponding to the shape of the resist $2019_2$. The concavity $2020B_2$ has a symmetric or approximately symmetric shape.

The symmetry axes of the concavities $2020B_1$ and $2020B_2$ are located on the identical straight line or approximately identical straight line.

Figure 31F:
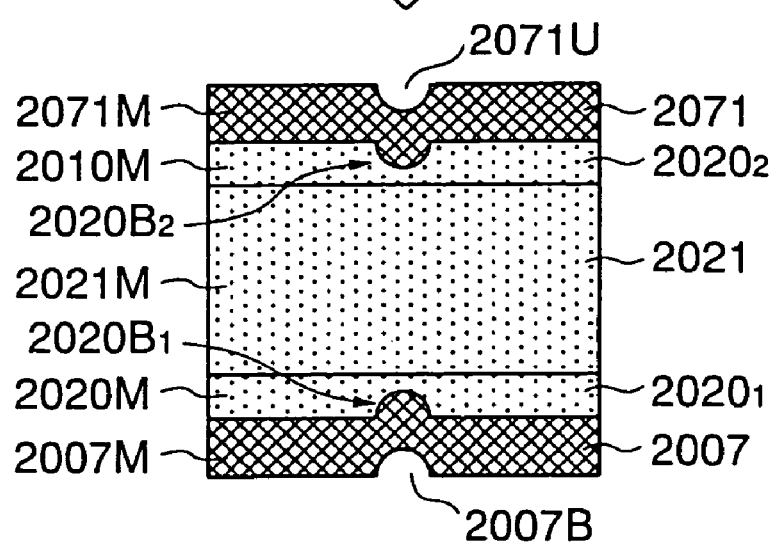

In FIG. 31F, the optical material 2007M is filled in the concavity $2020B_1$ of the lower face of the layer $2020_1$. The optical material 2007M has a refractive index different from the optical material 2020M, preferably has a larger refractive index than the optical material 2020M. Silicon nitride is used as an example.

For example, by forming the layer 2007 of the optical material 2007M on the lower face of the layer $2020_1$ by sputtering, vapor deposition, or ion implantation, the optical material 2007M is filled in the concavity $2020B_1$ of the layer $2020_1$. In this case, a concavity 2007B corresponding to the concavity $2020B_1$ is formed in the layer 2007.

Also, the optical material 2071M is filled in the concavity $2020B_2$ of the layer $2020_2$. The optical material 2071M is preferably made the same material as the optical material 2007M.

For example, by forming the layer 2071 of the optical material 2071M on the upper face of the layer $2020_2$ by sputtering, vapor deposition, or ion implantation, the optical material 2071M is filled in the concavity $2020B_2$ of the layer $2020_2$. In this case, a concavity 2071U corresponding to the concavity $2020B_2$ is formed in the layer 2007.

Note that, it is also possible to fill the optical material 2007M in the concavities $2020B_1$ and $2020B_2$ of the bases $2020_1$ and $2020_2$ by making the optical materials 2007M and 2071M identical materials and forming the layers 2007 and 2071 of the optical material 2007M on the lower face of the base $2020_1$ and the upper face of the base $2020_2$ by vapor deposition.

Figure 31G:
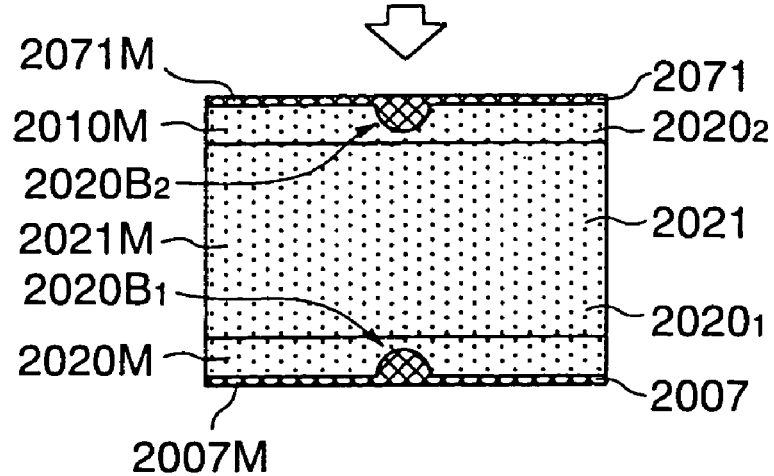

In FIG. 31G, the lower face (bottom face) of the layer 2007 is flattened. For example, it is polished so that the concavity 2007B of the lower face of the layer 2007 disappears. Preferably, the upper face of the layer 2007 is polished so that a flat face vertical with respect to the symmetry axis of the concavity $2020B_1$ of the layer $2020_1$ is formed. Alternatively, the layer 2007 is polished so that the flat portion (or flat face) at the area around the concavity $2020B_1$ of the layer $2020_1$ and the upper face of the layer 2007 become parallel or approximately parallel.

Also, the upper face of the layer 2071 is flattened. For example, it is polished so that the concavity 2071U of the upper face of the layer 2071 disappears. Preferably, the upper face of the layer 2071 is polished so that a flat face vertical with respect to the symmetry axis of the concavity 2020B$_2$ of the layer 2020$_2$ is formed. Alternatively, the layer 2071 is polished so that the flat portion (or flat face) at the area around the concavity 2020B$_2$ of the layer 2020$_2$ and the bottom face of the layer 2071 become parallel or approximately parallel.

By polishing the layer 2007 so that the flat portions at the area around the concavities 2020B$_1$ and 2020B$_2$ of the layers 2020$_1$ and 2020$_2$ are exposed, it is possible to obtain an optical device having an identical structure or approximately identical structure to the optical device 2100 of FIG. 1.

Note that the base 2021 with the layers 2020$_1$ and 2020$_2$ of FIG. 31G bonded thereto and the concavities 2020B$_1$ and 2020B$_2$ correspond to the base 2101 and the concavities 2101B and 2101D of the optical device 2100 of FIG. 1.

Fourth Embodiment of Method of Production of Second Optical Device

FIGS. 32A to 33E are schematic explanatory views of a fourth embodiment of the method of production of the second optical device according to the present invention. By this method of production, it is possible to obtain an optical device having an identical configuration or approximately identical configuration to the optical device 2100 of FIG. 1.

Figure 32A:
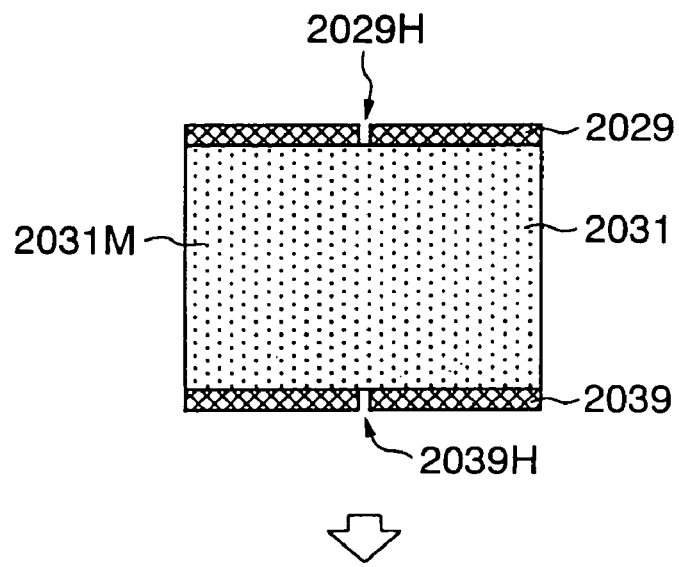
FIGS. 32A and 32B are schematic explanatory views of a fourth embodiment of the method of production of the second optical device according to the present invention.

In FIG. 32A, a resist 2029 is formed on the flat face between facing flat faces of a base 2031 made of an optical material 2031M. Also, a resist film 2039 is formed on the other flat face of the base 2031. The optical material 2031M is made for example quartz.

A circular or approximately circular window 2029H is formed in the resist film 2029 on one flat face of the base 2031, and a circular or approximately circular window 2039H is formed in the resist film 2039 on the other flat face of the base 2031. The windows 2029H and 2039H have identical or approximately identical sizes, and the center axes of the windows 2029H and 2039H are located on the identical straight line or approximately identical straight line. As illustrated, the windows 2029H and 2039H comprise holes and/or opening portions of the resist films 2029 and 2039.

Figure 32B:
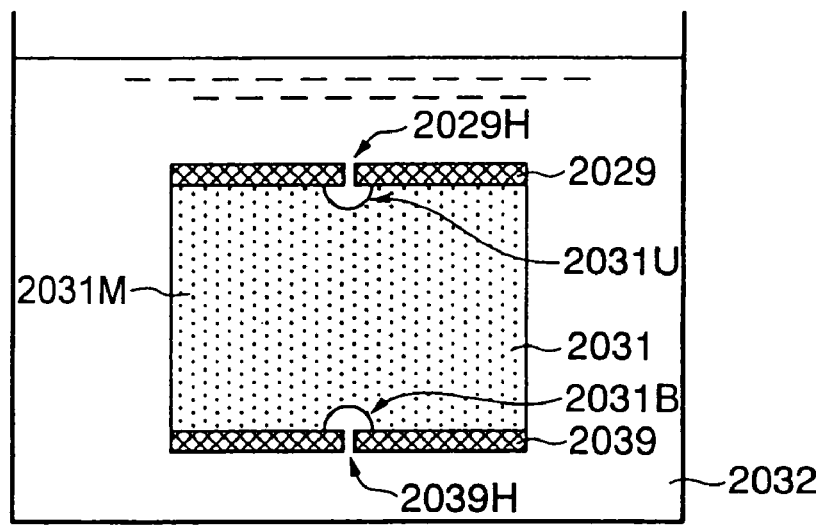

In FIG. 32B, the base 2031 with the resist films 2029 and 2039 formed thereon is immersed in an etching solution 2032 for a predetermined time. The etching solution 2032 is composed of for example a fluoric acid solution corroding quartz.

By immersing the base 2031 in the etching solution 2032 for a predetermined time, the base 2031 is gradually corroded from the windows 2029H and 2039H of the resist films 2029 and 2039, and a concavity 2031U corresponding to the window 2029H and a concavity 2031B corresponding to the window 2039H are formed in the upper and lower faces of the base 2031. The sizes of the concavities 2031B and 2031U are made identical or approximately identical to the sizes of the lenses 2102 and 2103 in FIG. 1. The concavities 2031B and 2031U have symmetric or approximately symmetric shapes, and the symmetry axes of the concavities 2031B and 2031U are located on the identical straight line or approximately identical straight line.

Figure 33C:
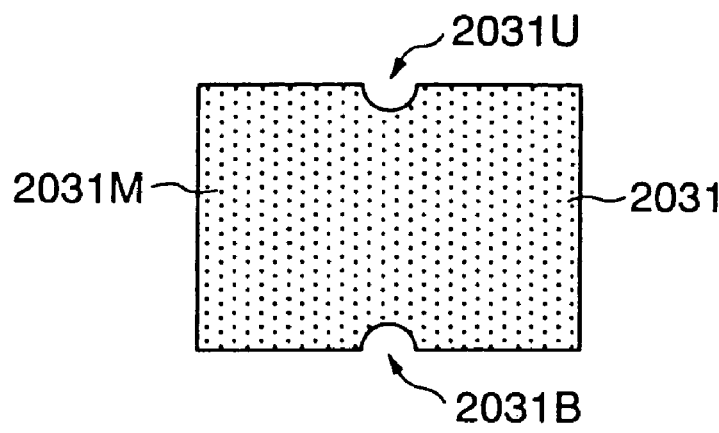
FIGS. 33C to 33E are schematic explanatory views of the fourth embodiment of the method of production of the second optical device according to the present invention continued from FIG. 32B.

In FIG. 33C, the base 2031 is taken out from the etching solution 2032, and the resist films 2029 and 2039 are removed. It is also possible to dissolve and remove the resist films 2029 and 2039 by a resist use peeling solution or an organic solvent (for example acetone), etc.

Figure 33D:
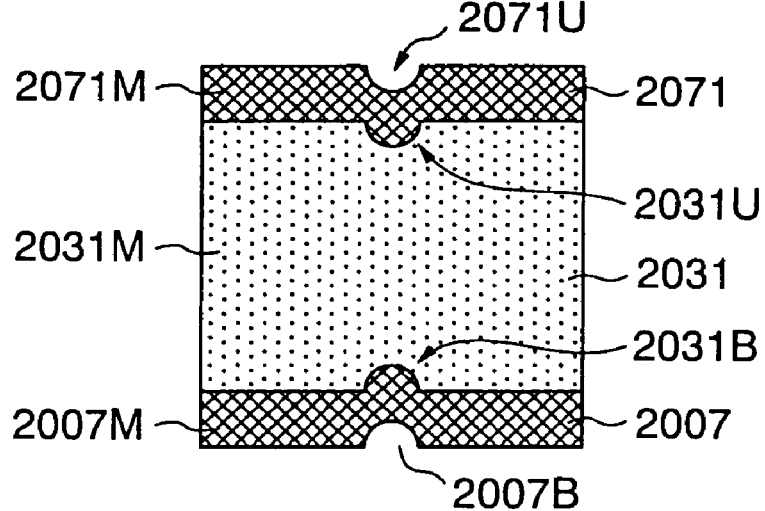

In FIG. 33D, the optical material 2007M is filled in the concavity 2031B of the lower face of the base 2031. The optical material 2007M has a refractive index different from the optical material 2031M, preferably has a larger refractive index than the optical material 2031M. Silicon nitride is used as an example.

For example, by forming the layer 2007 of the optical material 2007M on the lower face of the base 2031 by sputtering, vapor deposition, or ion implantation, the optical material 2007M is filled in the concavity 2031B of the lower face of the base 2031. In this case, a concavity 2007B corresponding to the concavity 2031B is formed in the layer 2007.

Also, the optical material 2071M is filled in the concavity 2031U of the upper face of the base 2031. The optical material 2071M is preferably made the same material as the optical material 2007M.

For example, by forming the layer 2071 of the optical material 2071M on the upper face of the base 2031 by sputtering, vapor deposition, or ion implantation, the optical material 2071M is filled in the concavity 2031U of the upper face of the base 2031. In this case, a concavity 2071U corresponding to the concavity 2031U is formed in the layer 2071.

Note that it is also possible to fill the optical material 2007M in the concavities 2031B and 2031U of the base 2031 by making the optical materials 2007M and 2071M the identical material and forming the layers 2007 and 2071 of the optical material 2007M on the upper and lower faces of the base 2031 by vapor deposition.

Figure 33E:
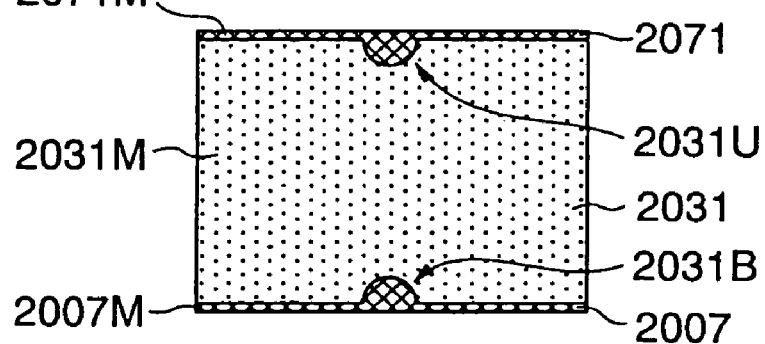

In FIG. 33E, the lower face of the layer 2007 is flattened. For example, it is polished so that the concavity 2007B of the lower face of the layer 2007 disappears. Preferably, the lower face of the layer 2007 is polished so that a flat face vertical with respect to the symmetry axis of the concavity 2031B of the base 2031 is formed. Alternatively, the layer 2007 is polished so that the flat portion (or flat face) at the area around the concavity 2031B of the base 2031 and the lower face of the layer 2007 become parallel or approximately parallel.

Also, the upper face of the layer 2071 is flattened. For example, it is polished so that the concavity 2071U of the upper face of the layer 2071 disappears. Preferably, the upper face of the layer 2071 is polished so that a flat face vertical with respect to the symmetry axis of the concavity 2031U of the base 2031 is formed. Alternatively, the layer 2071 is polished so that the flat portion (or flat face) at the area around the concavity 2031U of the base 2031 and the upper face of the layer 2071 become parallel or approximately parallel.

By polishing the layers 2007 and 2017 so that the flat portions at the area around the concavities 2031B and 2031U of the base 2031 are exposed, it is possible to obtain an optical device having an identical structure or approximately identical structure to the optical device 2100 of FIG. 1.

Note that, the base 2031 and the concavities 2031B and 2031U of FIG. 33E correspond to the base 2101 and the concavities 2101B and 2101D of the optical device 2100 of FIG. 1.

Fifth Embodiment of Method of Production of Second Optical Device

Figure 34A:
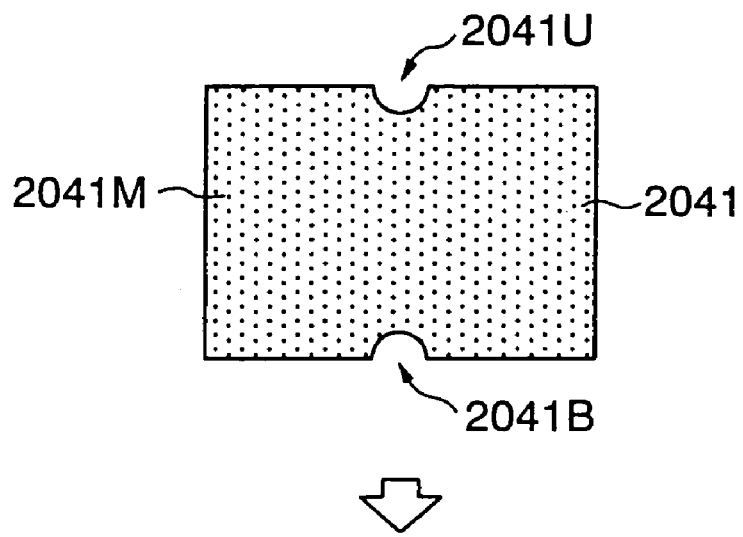
FIGS. 34A to 34C are schematic explanatory views of a fifth embodiment of the method of production of the second optical device according to the present invention.
Figure 34B:
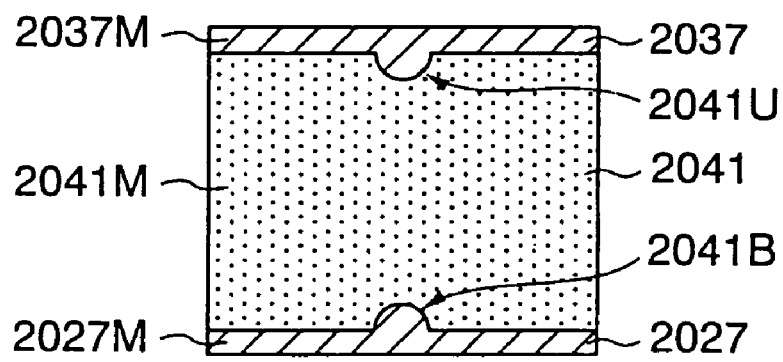
Figure 34C:
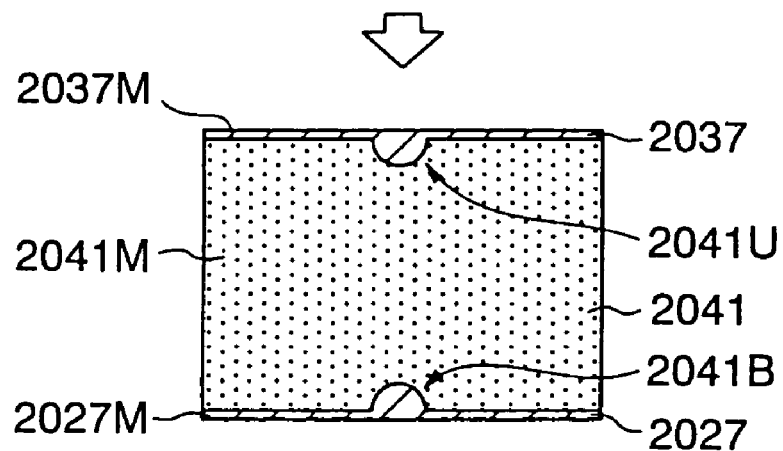

FIGS. 34A to 34C are schematic explanatory views of a fifth embodiment of the method of production of the second optical device according to the present invention. By this method of production, it is possible to obtain an optical device having an identical structure or approximately identical structure to the optical device 2100 of FIG. 1.

A base 2041 of FIG. 34A has a concavity 2041B in one face between the facing faces and has a concavity 2041U in the other face. The concavities 2041B and 2041U have rotationally symmetric or approximately rotationally symmetric shapes, and the symmetry axes of the concavities 2041B and 2041U are located on the identical straight line or approximately identical straight line. The areas around the concavities 2041B and 2041U in the base 2041 are flat. The base 2041 is made of an optical material 2041M.

The sizes of the concavities 2041B and 2041U are identical or approximately identical to the sizes of the lenses 2102 and 2103 in FIG. 1.

As this base 2041, use is made of for example the base 2006 in FIG. 26C, the base 2011 with the layers $2010_1$ and $2010_2$ bonded thereto in FIG. 29F, or the base 2031 in FIG. 33C.

In FIG. 34B, an optical material 2027M having a refractive index different from the optical material 2041M is filled in the concavity 2041B of the lower face of the base 2041.

As an example, when the optical material 2041M is not quartz, by using gelated quartz as the optical material 2027M and coating the same on the lower face of the base 2041, a layer 2027 of the optical material 2027M is formed, and the optical material 2027M is filled in the concavity 2041B of the lower face of the base 2041.

An optical material 2037M is filled in the concavity 2041U of the upper face of the base 2041. By coating the optical material 2037M on the upper face of the base 2041, a layer 2037 of the optical material 2037M is formed, and the optical material 2037M is filled in the concavity 2041U of the upper face of the base 2041. The optical material 2037M is made an identical material as the optical material 2027M.

Then, the base 2041 with the optical materials 2027M and 2037M filled in the concavities 2041B and 2041U is heated to harden the optical materials 2027M and 2037M.

In FIG. 34C, the surface of the hardened layer 2027 is flattened. For example, it is polished so that surface roughness or undulation of the lower face of the optical material 2027M disappears. Preferably, the lower face of the layer 2027 is polished so that a flat face vertical with respect to the symmetry axis of the concavity 2041B of the base 2041 is formed. Alternatively, the layer 2027 is polished so that the flat portion (or flat face) at the area around the concavity 2041B of the base 2041 and the upper face of the layer 2027 become parallel or approximately parallel.

Also, the surface of the hardened layer 2037 is flattened. For example, it is polished so that surface roughness or undulation of the upper face of the optical material 2037M disappears. Preferably, the upper face of the layer 2037 is polished so that a flat face vertical with respect to the symmetry axis of the concavity 2041U of the base 2041 is formed. Alternatively, the layer 2037 is polished so that the flat portion (or flat face) at the area around the concavity 2041U of the base 2041 and the upper face of the layer 2037 become parallel or approximately parallel.

By polishing the layers 2027 and 2037 so that the flat portions at the area around the concavities 2041B and 2041U of the base 2041 are exposed, it is possible to obtain an optical device having an identical structure or approximately identical structure to the optical device 2100 of FIG. 1.

Note that the base 2041 and the concavities 2041B and 2041U of FIG. 34C correspond to the base 2101 and the concavities 2101B and 2101D of the optical device 2100 of FIG. 1.

Sixth Embodiment of Method of Production of Second Optical Device

Figure 35A:
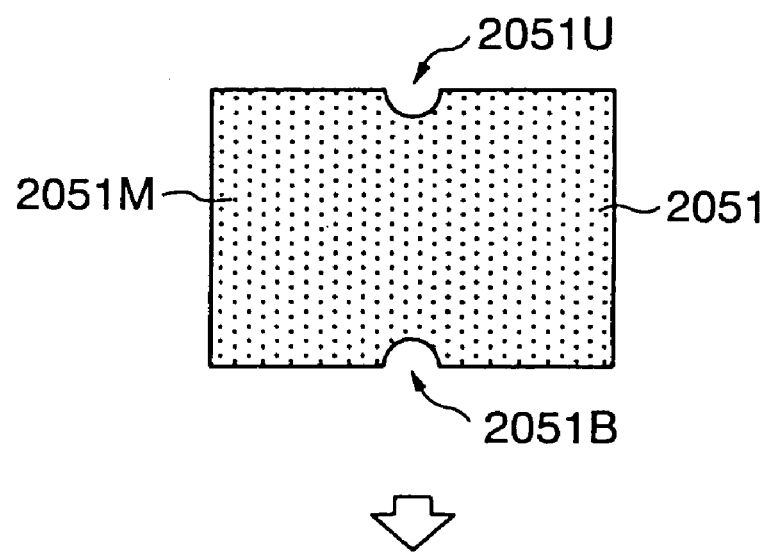
FIGS. 35A to 35B are schematic explanatory views of a sixth embodiment of the method of production of the second optical device according to the present invention.
Figure 35B:
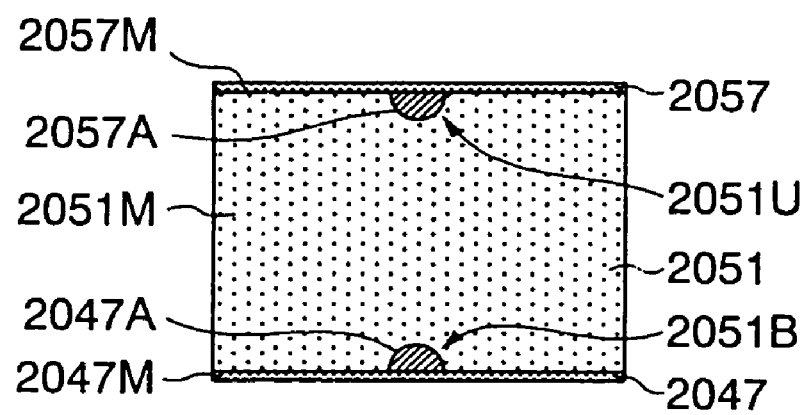

FIGS. 35A and 35B are schematic explanatory views of a sixth embodiment of the method of production of the second optical device according to the present invention. By this method of production, it is possible to obtain an optical device having an identical structure or approximately identical structure to the optical device 2100 of FIG. 1.

A base 2051 of FIG. 35A has a concavity 2051B in one face among the facing faces and has a concavity 2051U in the other face. The concavities 2051B and 2051U have rotationally symmetric or approximately rotationally symmetric shapes, and the symmetry axes of the concavities 2051B and 2051U are located on the identical straight line or approximately identical straight line. The areas around the concavities 2051U and 2051B in the base 2051 are flat. The base 2051 is made of an optical material 2051M.

The sizes of the concavities 2051U and 2051B are identical to the sizes of the lenses 2102 and 2103 in FIG. 1.

As this base 2051, use is made of for example the base 2006 in FIG. 26C, the base 2011 with the layers $2010_1$ and $2010_2$ bonded thereto in FIG. 29F, or the base 2031 in FIG. 33C.

In FIG. 35B, a liquid-like optical material 2047A having a refractive index different from the optical material 2051M is filled in the concavity 2051B of one face of the base 2051. As the optical material 2047A, use is made of an optical liquid for example an optical oil or liquid crystal.

Then, a layer 2047 made of the optical material 2047M is formed on one face of the base 2051, and the concavity 2051B filled with the optical material 2047A is sealed by the layer 2047. In this way, the liquid-like optical material 2047A can be filled in the concavity 2051B.

Next, a liquid-like optical material 2057A is filled in the concavity 2051U of the other face of the base 2051. This optical material 2057A is made the same material as the optical material 2047A.

Then, a layer 2057 made of the optical material 2057M is formed on the upper face of the base 2051, and the concavity 2051U filled with the optical material 2057A is sealed by the layer 2057. In this way, the liquid-like optical material 2057A can be filled in the concavity 2051U.

The layers 2047 and 2057 are preferably made films having constant or approximately constant thicknesses. Also, preferably the optical materials 2047M and 2057M of the layers 2047 and 2057 are made the same materials, and the thickness of the layer 2047 is made identical or approximately identical to the thickness of the layer 2057.

Note that the base 2051 and the concavities 2051B and 2051U of FIG. 35B correspond to the base 2101 and the concavities 2101B and 2101D of the optical device 2100 of FIG. 1.

Third Embodiment of optical Device (Third Optical Device)

FIG. #36 is a schematic view of the configuration of an embodiment of a third optical device according to the present invention.

This optical device 3100 is shaped as a parallelopiped or a substantial parallelopiped provided with a hole 3103. The optical device 3100 has a base (substrate) 3101 and a convex lens 3102.

Note that, this production method is the method of the process continued to the first production method of the first optical device described above with reference to FIGS. 2A to 3E, so that, here, only the process continued to the first production method will be explained.

Namely, at first, a convex lens is formed at the bottom of the base 3006 according to the first production method of the first optical device.

Next, the optical device 3100 can converge (condense) or scatter a beam emitted from the flat face of the convex lens 3102 by the convex lens 3102 or can change it to a parallel beam when light enters the convex lens 3102 through the hole 3103 from an upper face 3100U of the base 3101. In the base 3101, a first face, that is, a lower face 3100B, and a second face, that is, the upper face 3100U, face each other.

In the base 3101, a concave curved face 3101C closely contacting a convex curved face 3102C of the convex lens 3102 is formed in the lower face 3100B. At the same time, the hole 3103 communicating with the upper face 3100U is formed from a deep side of the concave curved face 3101C.

Part (concretely a center portion) of the convex curved face of the convex lens 3102 is exposed at the hole 3103 of the base 3101. The concave curved face 3101C forms an annular inclined face.

The convex lens 3102 has a rotationally symmetric or substantially rotationally symmetric shape surrounded by the flat face and the convex curved face 3102C facing this flat face. The optical axis of the convex lens 3102 or the extension thereof passes through the hole 3103. The shape of the convex curved face 3102C when the convex lens 3102 is cut along its symmetry axis is preferably made an arc or substantially arc.

The hole 3103 has a rotationally symmetric or substantially rotationally symmetric shape. The symmetry axis of the hole 3103 and the optical axis of the convex lens 3102 coincide or substantially coincide.

The flat face of the convex lens 3102 is parallel or substantially parallel to the upper face 3100U of the optical device 3100 (or the upper face of the base 3101). Also, the flat portion (or flat face) at the area around the concave curved face 3101C in the lower face 3100B of the base 3101 and the flat face of the convex lens 3102 are parallel or substantially parallel and are located in an identical plane in FIG. 36.

It is also possible to make the material of the base 3101 for example quartz and make the material of the convex lens 3102 for example silicon nitride. Also, it is also possible to make the material of the base 3101 for example silicon nitride and make the material of the convex lens 3102 for example quartz.

By making the material of the convex lens 3102 an optical material having a large refractive index, the numerical aperture of the convex lens 3102 can be enlarged.

Also, in the optical device 3100, since the hole 3103 is provided, part of the convex curved face 3102C of the convex lens 3102 contacts the air, so the difference of the refractive indexes at the curved face 3102C can be made larger. For this reason, the numerical aperture of the convex lens 3102 can be enlarged, and aberration can be kept small in comparison with a case where the hole 3103 is not provided, that is, the whole area of the convex curved face 3102C of the convex lens 3102 is covered by the base of the optical material.

First Embodiment of Method of Production of Third Optical Device

FIGS. 37F to 37I are schematic explanatory views of a first embodiment of the method of production of the third optical device according to the present invention. By this method of production, it is possible to obtain an optical device having an identical structure or substantially identical structure to the optical device 3100 of FIG. 36.

Figure 37F:
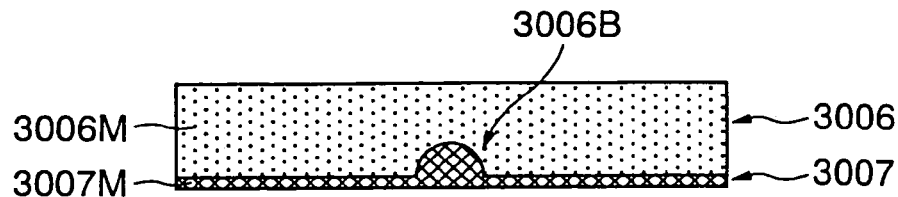
FIGS. 37F to 37I are schematic explanatory views of the first embodiment of the method of production of the third optical device according to the present invention.

In FIG. 37F, the upper face of the base 3006 is polished so as to become parallel or substantially parallel with respect to the flat face of the flattened layer 3007. Also, by this polishing, the base 3006 can be reduced to an intended thickness.

Figure 37G:
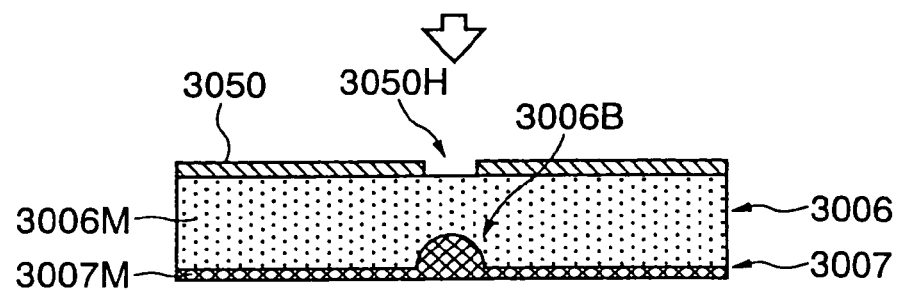

In FIG. 37G, a resist film 3050 having a window 3050H is formed on the upper face, that is, flat face, of the base 3006. The shape of the window 3050H is preferably made circular or substantially circular. The concavity 3006B of the base 3006 is located at the lower side of the window 3050H. As illustrated, the window 3050H has a hole and/or opening portion of the resist film 3050.

Figure 37H:
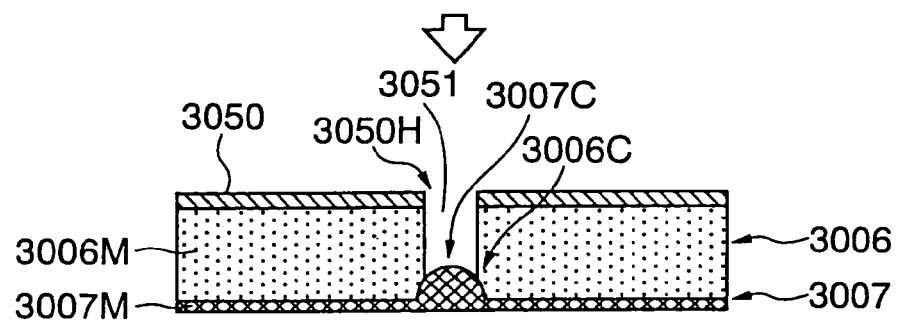

In FIG. 37H, a hole 3051 reaching a convex curved face 3007C of the convex lens from the window 3050H is formed by etching. Part of the convex curved face 3007C (preferably the center portion of the curved face 3007C) of the convex lens is exposed in the hole 3051. By the hole 3051, the surface of the concavity 3006B of the base 3006 is partially removed and becomes a concave curved face (specifically an annular inclined face) 3006C closely contacting the convex curved face 3007C.

For example, the hole 3051 is formed by dry etching part of the base 3006 in a reactive ion etching apparatus (RIE apparatus) using $CF_4$ as the etching gas.

Figure 36:
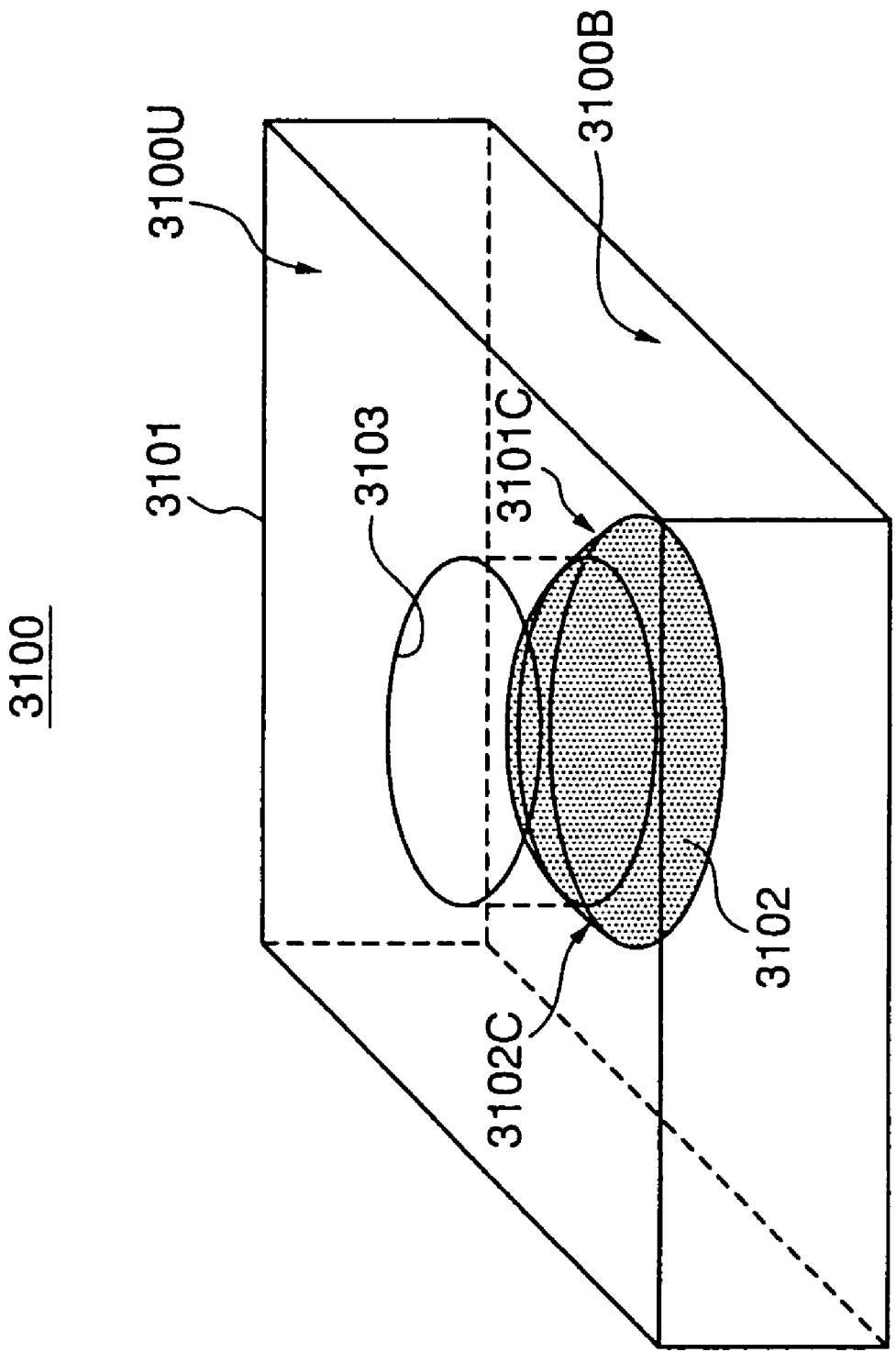
FIG. 36 is a schematic view of the configuration of a third embodiment of an optical device according to the present invention.
Figure 37I:
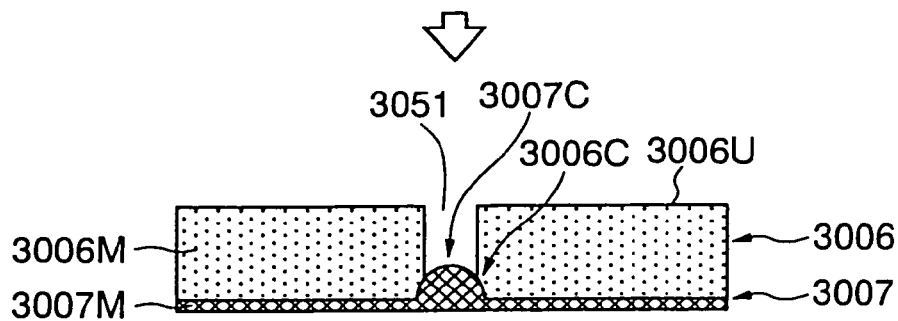

In FIG. 37I, the resist film 3050 is removed from the base 3006 formed with the hole 3051. In this way, it is possible to obtain an optical device having an identical structure or substantially identical structure to the optical device 3100 of FIG. 36.

Note that the base 3006, hole 3051, convex curve 3007C, concave curve 3006C, and upper face 3006U of FIG. 37H and the base 3101, hole 3103, convex curve 3102C, concave curve 3101C, and upper face 3100U of the optical device 3100 of FIG. 36 correspond to each other.

As same as the first production method of the first optical device, the bottom portion of the metallic mold 3003 of FIGS. 2A and 2B has the projection 3005 projecting out into the cavity 3003C, so the processing precision can be improved in comparison with a case of forming a concavity having a sunken shape in the cavity 3003C and preparing a convex lens by simple molding. In this way, by using the metallic mold 3003, it is possible to prepare a small sized convex lens having a higher processing precision than a convex lens obtained by simple molding.

Note that it is also possible to mold the lens by using an upper mold and a lower mold in place of the metallic mold shown in FIGS. 2A and 2B as same as the first production method of the first optical device.

Second Embodiment of Method of Production of Third Optical Device

FIGS. 38I to 38L are schematic explanatory views of a second embodiment of the method of production of the third optical device according to the present invention. By this method of production, it is possible to obtain an optical device having an identical configuration or substantially identical configuration to the optical device 3100 of FIG. 36.

Note that, this production method is the method of the process continued to the second production method of the first optical device described above with reference to FIGS. 4A to 5H, so that, here, only the process continued to the second production method will be explained.

Namely, at first, a convex lens is formed at the bottom of the base 3010 according to the second production method of the first optical device.

Figure 38I:
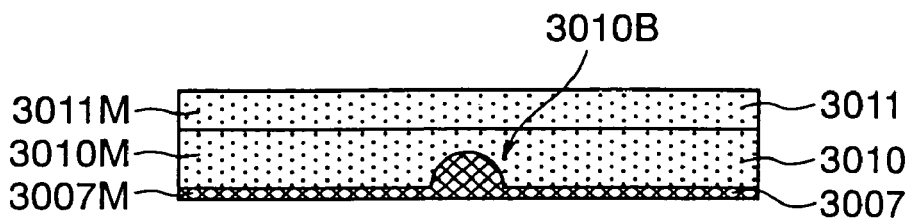
FIGS. 38I to 38L are schematic explanatory views of the second embodiment of the method of production of the third optical device according to the present invention.

Next, In FIG. 38I, the upper face of the base 11 is polished so as to become parallel or substantially parallel with respect to the polished face of the layer 3007. Also, by this polishing, the base 11 can be reduced to the intended thickness.

Figure 38J:
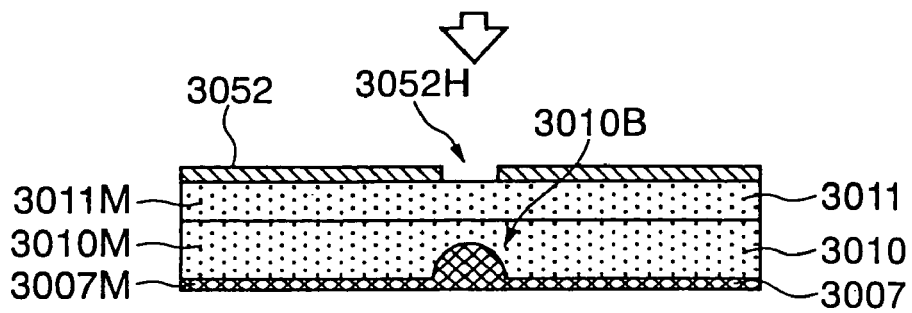

In FIG. 38J, a resist film 3052 having a window 3052H is formed on the upper face, that is, the flat face, of the base 11. The shape of the window 3052H is preferably made circular or substantially circular. The concavity 10B of the base 10 is located at the lower side of the window 3052H. As illustrated, the window 3052H comprises the hole and/or opening portion of the resist film 3052.

Figure 38K:
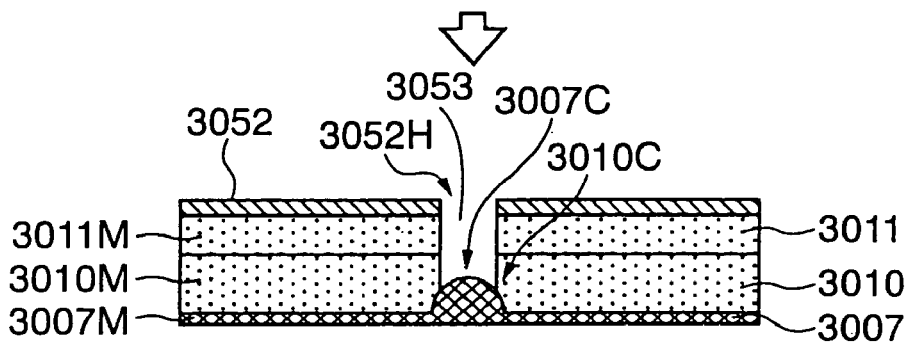

In FIG. 38K, a hole 3053 reaching the convex curved face 3007C of the convex lens from the window 3052H is formed by etching, and part of the convex curved face 3007C (preferably the center portion of the curved face 3007C) of the convex lens is exposed in the hole 3053. By the hole 3053, the surface of the concavity 10B of the base 10 is partially removed and becomes a concave curved face (specifically an annular inclined face) 10C closely contacting the convex curved face 3007C.

For example, the hole 3053 is formed by dry etching part of the bases 10 and 11 in a reactive ion etching apparatus (RIE apparatus) using $CF_4$ as the etching gas.

Figure 38L:
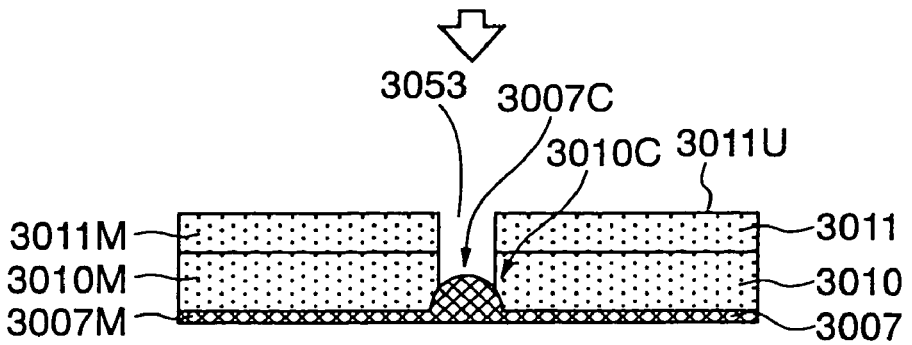

In FIG. 38L, the resist film 3052 is removed from the base 11 formed with the hole 3053. In this way, it is possible to obtain an optical device having an identical structure or substantially identical structure to the optical device 3100 of FIG. 36.

Note that the bases 10 and 11, hole 3053, convex curve 3007C, concave curve 10C, and upper face 11U of FIG. 38L and the base 3101, hole 3103, convex curve 3102C, concave curve 3101C, and upper face 3100U of the optical device 3100 of FIG. 36 correspond to each other.

Third Embodiment of Method of Production of Third Optical Device

FIGS. 39H to 39K are schematic explanatory views of a third embodiment of the method of production of the third optical device according to the present invention. By this method of production, it is possible to obtain an optical device having an identical configuration or substantially identical configuration to the optical device 3100 of FIG. 36.

Note that, this production method is the method of the process continued to the third production method of the first optical device described above with reference to FIGS. 6A to 7G, so that, here, only the process continued to the third production method will be explained.

Namely, at first, a convex lens is formed at the bottom of the base 3020 according to the third production method of the first optical device.

Figure 39H:
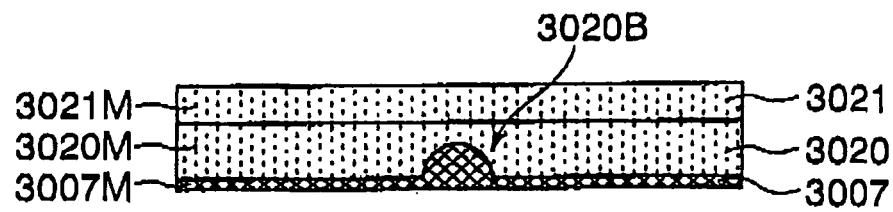
FIGS. 39H to 39K are schematic explanatory views of the third embodiment of the method of production of the third optical device according to the present invention.

Next, In FIG. 39H, the upper face of the base 3021 is polished so as to become parallel or substantially parallel with respect to the polished face of the layer 3007. Also, by this polishing, the base 3021 can be reduced to the intended thickness.

Figure 39I:
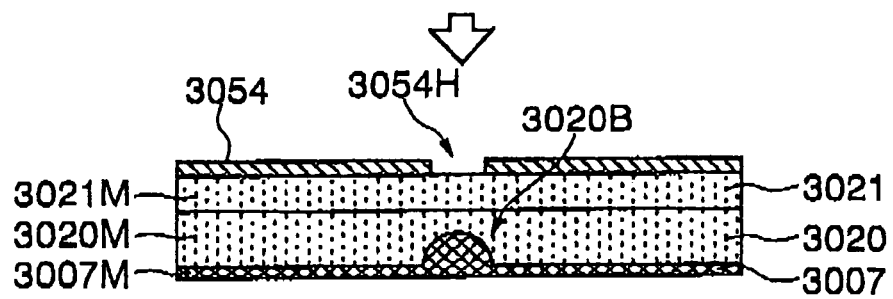

In FIG. 39I, a resist film 3054 having a window 3054H is formed on the upper face, that is, flat face, of the base 3021. The shape of the window 3054H is preferably made circular or substantially circular. The concavity 3020B of the base 3020 is located at the lower side of the window 3054H. As illustrated, the window 3054H comprises the hole and/or opening portion of the resist film 3054.

Figure 39J:
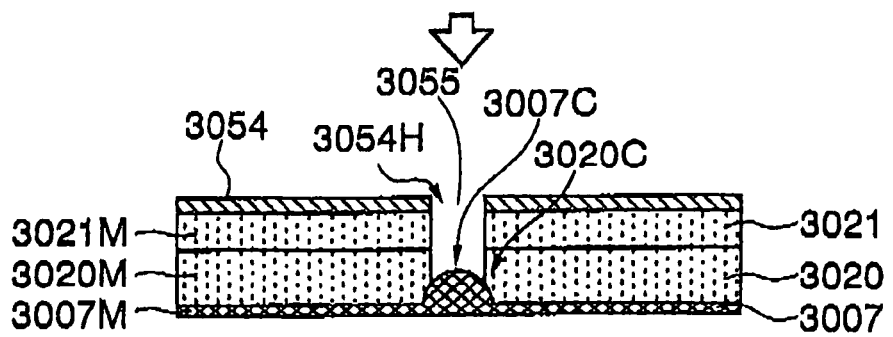

In FIG. 39J, a hole 3055 reaching the convex curved face 3007C of the convex lens from the window 3054H is formed by etching. Part of the convex curved face 3007C (preferably the center portion of the curved face 3007C) of the convex lens is exposed in the hole 3055. By the hole 3055, the surface of the concavity 3020B of the base 3020 is partially removed and becomes the concave curved face (concretely the annular inclined face) 3020C closely contacting the convex curved face 3007C.

For example, the hole 3055 is formed by dry etching part of the bases 3020 and 3021 in a reactive ion etching apparatus (RIE apparatus) using $CF_4$ as the etching gas.

Figure 39K:
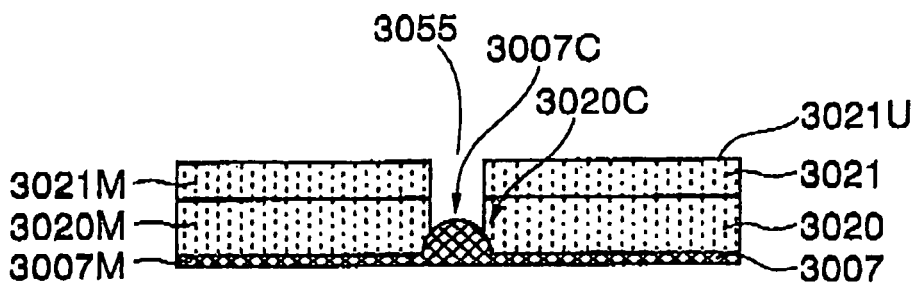

In FIG. 39K, the resist film 3054 is removed form the base 3021 formed with the hole 3055. In this way, it is possible to obtain an optical device having an identical structure or substantially identical structure to the optical device 3100 of FIG. 36.

Note that the bases 3020 and 3021, hole 3055, convex curve 3007C, concave curve 3020C, and upper face 3021U of FIG. 39K and the base 3101, hole 3103, convex curve 3102C, concave curve 3101C, and upper face 3100U of the optical device 3100 of FIG. 36 correspond to each other.

Fourth Embodiment of Method of Production of Third Optical Device

FIG. 40 are schematic explanatory views of a fourth embodiment of the method of production of the third optical device according to the present invention. By this method of production, it is possible to obtain an optical device having an identical configuration or substantially identical configuration to the optical device 3100 of FIG. 36.

Note that, this production method is the method of the process continued to the forth production method of the first optical device described above with reference to FIGS. 8A to 9E, so that, here, only the process continued to the forth production method will be explained.

Namely, at first, a convex lens is formed on the base 3031 according to the forth production method of the first optical device.

Figure 40F:
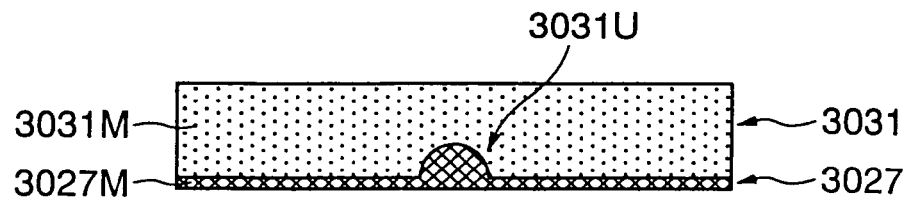
FIGS. 40F to 40I are schematic explanatory views of the fourth embodiment of the method of production of the third optical device according to the present invention.

Next, in FIG. 40F, the surface of the base 3031 is polished so as to become parallel or substantially parallel with respect to the polished face of the layer 3027. Also, by this polishing, the base 3031 can be reduced to the intended thickness.

Figure 40G:
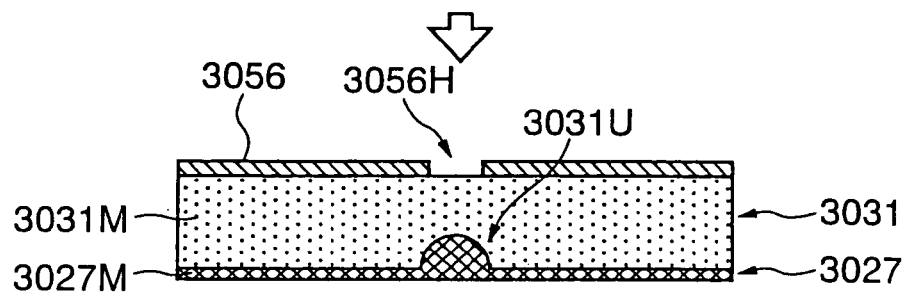

In FIG. 40G, a resist film 3056 having a window 3056H is formed on the polished flat face of the base 3031. The shape of the window 3056H is preferably made circular or substantially circular. The concavity 3031U of the base 3031 is located at the lower side of the window 3056H. As illustrated, the window 3056H comprises the hole and/or opening portion of the resist film 3056.

Figure 40H:
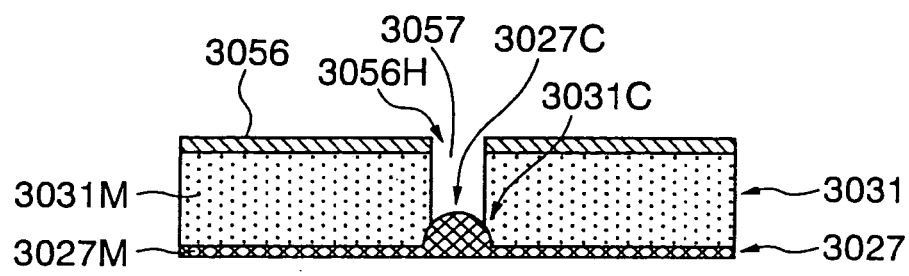

In FIG. 40H, a hole 3057 reaching a convex curved face 3027C of the convex lens from the window 3056H is formed by etching, and part of the convex curved face 3027C (preferably the center portion of the curved face 3027C) of the convex lens is exposed in the hole 3057. By the hole 3057, the surface of the concavity 3031U of the base 3031 is partially removed and becomes the concave curved face (concretely the annular inclined face) 3031C closely contacting the convex curved face 3027C.

For example, the hole 3057 is formed by dry etching part of the base 3031 in a reactive ion etching apparatus (RIE apparatus) using $CF_4$ as the etching gas.

Figure 40I:
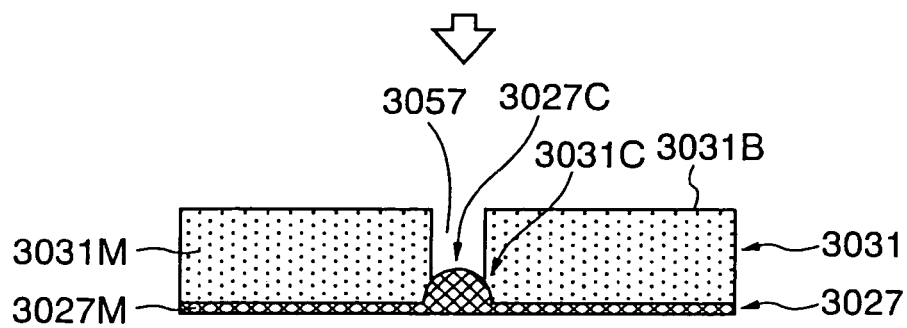

In FIG. 40I, the resist film 3056 is removed from the base 3031 formed with the hole 3057. In this way, it is possible to obtain an optical device having an identical structure or substantially identical structure to the optical device 3100 of FIG. 36.

Note that the base 3031, hole 3057, convex curve 3027C, concave curve 3031C, and flat face 3031B of FIG. 40I and the base 3101, hole 3103, convex curve 3102C, concave curve 3101C, and upper face 3100U of the optical device 3100 of FIG. 36 correspond to each other.

Fifth Embodiment of Method of Production of Third Optical Device

FIG. 41 are schematic explanatory views of a fifth embodiment of the method of production of the third optical device according to the present invention. By this method of production, it is possible to obtain an optical device having an identical structure or substantially identical structure to the optical device 3100 of FIG. 36.

Note that, this production method is the method of the process continued to the fifth production method of the first optical device described above with reference to FIGS. 10A to 10C, so that, here, only the process continued to the fifth production method will be explained.

Namely, at first, a convex lens is formed on the base 3041 according to the fifth production method of the first optical device.

Figure 41D:
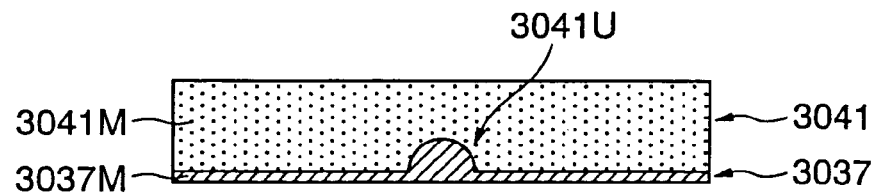
FIGS. 41D to 41G are schematic explanatory views of the fifth embodiment of the method of production of the third optical device according to the present invention.

Next, in FIG. 41D, the surface of the base 3041 is polished so as to become parallel or substantially parallel with respect to the polished face of the layer 3037. Also, by this polishing, the base 3041 can be reduced to the intended thickness.

Figure 41E:
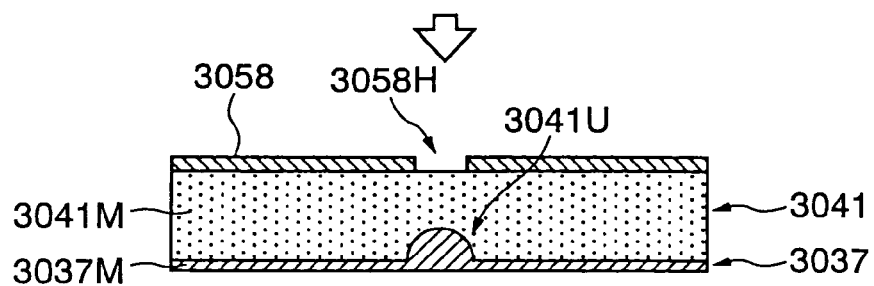

In FIG. 41E, a resist film 3058 having a window 3058H is formed on the polished flat face of the base 3041. The shape of the window 3058H is preferably made circular or substantially circular. The concavity 3041U of the base 3041 is located at the lower side of the window 3058H. As illustrated, the window 3058H comprises the hole and/or opening portion of the resist film 3058.

Figure 41F:
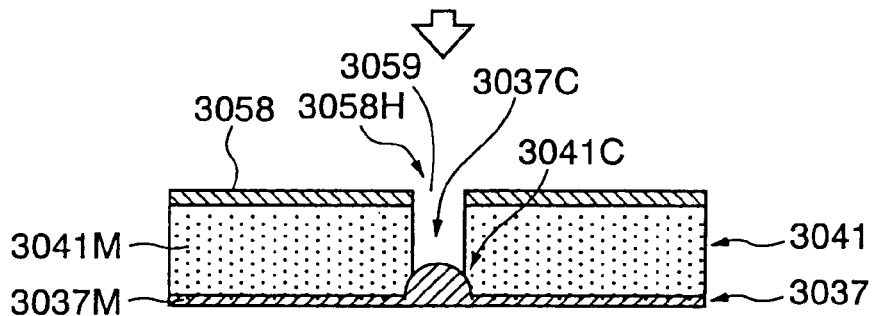

In FIG. 41F, a hole 3059 reaching a convex curved face 3037C of the convex lens from the window 3058H is formed by etching, and part of the convex curved face 3037C (preferably the center portion of the curved face 3037C) of the convex lens is exposed in the hole 3059. By the hole 3059, the surface of the concavity 3041U of the base 3041 is partially removed and becomes the concave curved face (concretely the annular inclined face) 3041C closely contacting the convex curved face 3037C.

For example, the hole 3059 is formed by dry etching part of the base 3041 in a reactive ion etching apparatus (RIE apparatus) using $CF_4$ as the etching gas.

Figure 41G:
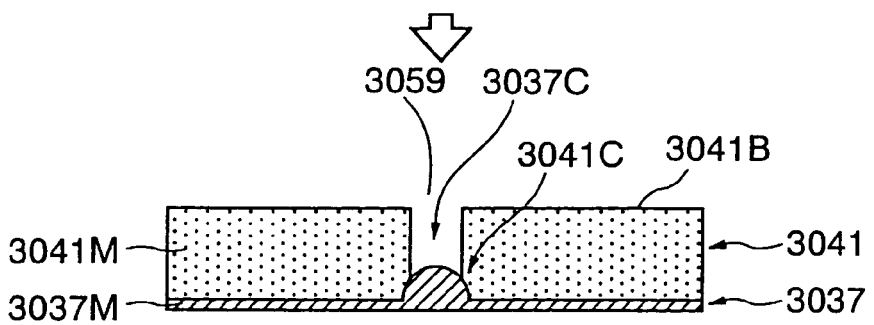

In FIG. 41G, the resist film 3058 is removed from the base 3041 formed with the hole 3059. In this way, it is possible to obtain an optical device having an identical structure or substantially identical structure to the optical device 3100 of FIG. 36.

Note that the base 3041, hole 3059, convex curve 3037C, concave curve 3041C, and flat face 3041B of FIG. 41G and the base 3101, hole 3103, convex curve 3102C, concave curve 3101C, and upper face 3100U of the optical device 3100 of FIG. 36 correspond to each other.

Sixth Embodiment of Method of Production of Third Optical Device

FIG. 42 and FIG. 43 are schematic explanatory views of a sixth embodiment of the method of production of the third optical device according to the present invention. By this method of production, it is possible to obtain an optical device having an identical structure or substantially identical structure to the optical device 3100 of FIG. 36.

Figure 42A:
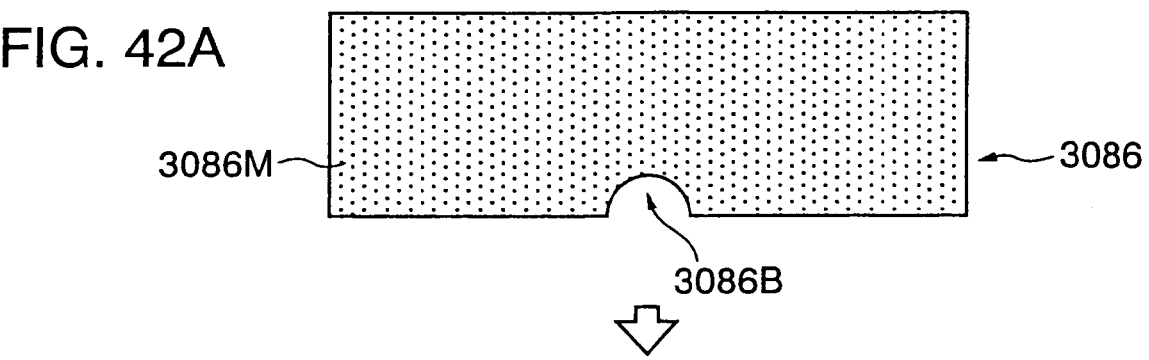
FIGS. 42A to 42C are schematic explanatory views of a sixth embodiment of the method of production of the third optical device according to the present invention.

In FIG. 42A, a base 3086 having a concavity 3086B is shown. The concavity 3086B has a rotationally symmetric or substantially rotationally symmetric shape. The circumference (or periphery) of the concavity 3086B in the base 3086 is flat. The base 3086 is made of a material 3086M. Below, an explanation will be made with reference to a case where the material 3086M is an optical material.

The size of the concavity 3086B is identical or substantially identical to the size of the convex lens 3102 in FIG. 36.

As this base 3086, use is made of for example the base 3006 mentioned above, the base 11 with the layer 10 bonded thereto mentioned above, the base 3021 with the layer 3020 bonded thereto also mentioned above, or the base 3031 still also mentioned above.

Figure 42B:
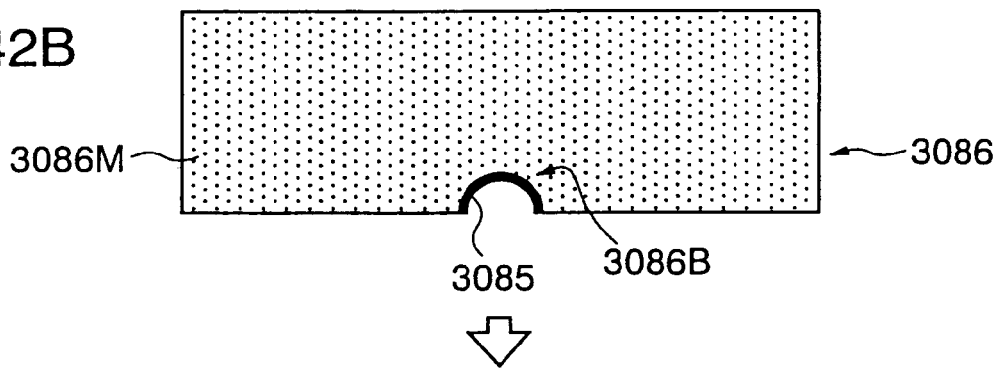

In FIG. 42B, a coating film 3085 covering the surface of the concavity 3086B of the base 3086 is formed. The coating film 3085 is made of a metal film, for example, aluminum or nickel.

Note that it is also possible to form the coating film 3085 so as to cover the concavity 3086B of the base 3086 and the flat portion (or flat face) at the area around it.

Figure 42C:
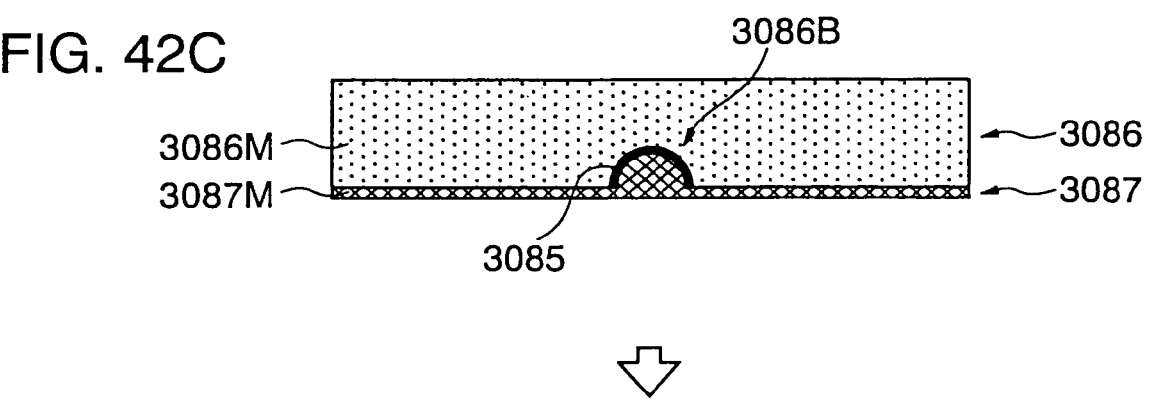

In FIG. 42C, an optical material 3087M is filled in the concavity 3086B of the base 3086 formed with the coating film 3085. The optical material 3087M has a refractive index different from the optical material 3086, preferably has a larger refractive index than the optical material 3086. Silicon nitride is used as an example.

For example, by forming a layer 3087 of the optical material 3087M on the bottom face of the base 3086 by sputtering, vapor deposition, or ion implantation, the optical material 3087M is filled in the concavity 3086B of the base 3086.

Then, the surface of the layer 3087 is flattened. For example, it is polished so that the concavity of the bottom face of the layer 3087 disappears. Preferably, the bottom face of the layer 3087 is polished so that a flat face vertical with respect to the symmetry axis of the concavity 3086B of the base 3086 is formed. Alternatively, the layer 3087 is polished so that the flat portion (or flat face) on the area around the concavity 3086B of the base 3086 and the bottom face of the layer 3087 become parallel or substantially parallel. Note that it is also possible to polish the layer 3087 so that the flat portion on the area around the concavity 3086B of the base 3086 is exposed.

In this way, a convex lens made of the optical material 3087M is formed. The convex curved face of this convex lens closely contacts (the surface of) the concavity 3086B of the base 3086 via the coating film 3085.

Next, the upper face of the base 3086 is polished so as to become parallel or substantially parallel with respect to the flat face of the flattened layer 3087.

In FIG. 43D, a resist film 3082 having a window 3082H is formed on the flat face of the upper face of the base 3086. The shape of the window 3082H is preferably made circular or substantially circular. The concavity 3086B of the base 3086 is located at the lower side of the window 3082H. As illustrated, the window 3082H comprises the hole and/or opening portion of the resist film 3082.

In FIG. 43E, a hole 3083 reaching the coating film 3085 from the window 3082H is formed by etching, and part of the coating film 3085 (preferably the center portion of the coating film 3085) is exposed in the hole 3083. By the hole 3083, the surface of the concavity 3086B of the base 3086 is partially removed and becomes the concave curved face (concretely the annular inclined face) 3086C closely contacting the convex curved face of the convex lens via the coating film 3085.

For example, the hole 3083 is formed by dry etching part of the base 3086 in a reactive ion etching apparatus (RIE apparatus) using $CF_4$ as the etching gas.

In FIG. 43F, the resist film 3082 is removed from the base 3086 formed with the hole 3083. Also, the exposed portion exposed in the hole 3083 in the coating film 3085 is removed to expose a convex curved face 3087C of the convex lens. For example, when the coating film 3085 is a metal film, it is also possible to dissolve and remove the exposed portion by using an alkali aqueous solution.

In this way, it is possible to obtain an optical device having an identical structure or substantially identical structure to the optical device 3100 of FIG. 36.

Note that the base 3086, hole 3083, convex curve 3087C, concave curve 3086C, and upper face 3086U of FIG. 43F and the base 3101, hole 3103, convex curve 3102C, concave curve 3101C, and upper face 3100U of the optical device 3100 of FIG. 36 correspond to each other.

First Embodiment of Optical System using Third Optical Device

FIG. 44 is a schematic view of the configuration of a first embodiment of an optical system using the third optical device according to the present invention.

This optical system 3119 has optical devices 3100 and 3110 and is comprised by stacking the optical devices 3100 and 3110. Note that the optical device 3100 is identical or substantially identical to the optical device 3100 of FIG. 36, so the explanation thereof will be appropriately omitted.

The optical device 3110 is shaped as a parallelopiped or a substantial parallelopiped provided with a hole 3113. The optical device 3110 has a base (substrate) 3111 and a convex lens 3112.

In the base 3111, a first face, that is, a lower face 3110B, and a second face, that is, an upper face 3110U, face each other.

In the base 3111, a concave curved face (concretely an annular inclined face) 3111C closely contacting a convex curved face 3112C of the convex lens 3112 is formed in the lower face 3110B of the base 3111. At the same time, a hole 3113 communicating with the upper face 3110U is formed from the deep side of the concave curved face 3111C.

Then, part (concretely the center portion) of the convex curved face of the convex lens 3112 is exposed in the hole 3113 of the base 3111.

The convex lens 3112 has a rotationally symmetric or substantially rotationally symmetric shape surrounded by the flat face and the convex curved face 3112C facing this flat face. The optical axis of the convex lens 3112 or the extension thereof passes through the hole 3113. The shape of the convex curved face 3112C when the convex lens 3112 is cut along its symmetry axis is preferably made circular or substantially circular.

The hole 3113 has the rotationally symmetric or substantially rotationally symmetric shape, and the symmetry axis of the hole 3113 and the optical axis of the convex lens 3112 coincide or substantially coincide. A radius of the hole 3113 is smaller than the radius of the convex lenses 3102 and 3112.

The flat face of the convex lens 3112 is parallel or substantially parallel to the upper face 3110U of the optical device 3110 (or the upper face of the base 3111). Also, the flat portion on the area around the concave curved face 3111C in the lower face 3110B of the base 3111 and the flat face of the convex lens 3112 are parallel or substantially parallel and located in the identical plane in FIG. 44.

It is also possible to make the material of the base 3111 for example quartz and make the material of the convex lens 3112 for example silicon nitride. Also, it is also possible to make the material of the base 3111 for example silicon nitride and make the material of the convex lens 3112 for example quartz.

The base 3111, convex lens 3112, upper face 3110U, and lower face 3110B of the optical device 3110 correspond to the base 3101, convex lens 3102, upper face 3100U, and lower face 3100B of the optical device 3100.

In the optical system 3119, the lower face 3100B of the optical device 3100 and the upper face 3110U of the optical device 3110 are bonded so that the optical axes of the convex lenses 3102 and 3112 coincide or substantially coincide.

It is also possible to form the optical devices 3100 and 3110 in a plate-like or substantially plate-like shape. It is possible to stack the optical devices 3100 and 3110 while positioning them with a high precision.

For example, by adding positioning marks like the marks for mask alignment used when semiconductor integrated circuits are manufactured on the bases 3101 and 3111, it is possible to use these marks to stack a plurality of optical devices with a high precision.

Also, by making the shapes of the optical devices 3100 and 3110 parallelepipeds or substantial parallelepipeds or plate-like or substantially plate-like, it is possible to prevent inclination of (the optical axes of) the lenses from occurring when the optical devices are stacked, the optical devices can be stacked while positioning them in the two-dimensional direction (vertical and lateral directions), and it is possible to easily prepare the optical system 3119.

Second Embodiment of Optical System Using Third Optical Device

FIG. 45 is a schematic view of the configuration of a second embodiment of an optical system using the third optical device according to the present invention. Note that the optical device 3100 in FIG. 45 is identical or substantially identical to the optical device 3100 of FIG. 36, so the explanation thereof will be appropriately omitted.

This optical system 3119A has optical devices 3100 and 3700 and is comprised by stacking the optical devices 3100 and 3700.

The optical device 3700 has a base 3701 and a lens 3702. The base 3701 is made of an optical material. The base 3701 and the lens 3702 have different refractive indexes. As the optical device 3700, it is also possible to use for example the base 3006 with the optical material 3007M filled in its concavity 3006B as shown in FIG. 37F. The material 3006M of the base 3006 in this case is made an optical material.

Similarly, as the optical device 3700, it is also possible to use the base 10 or 11 with the optical material 3007M filled in its concavity 10B as shown in FIG. 38I. The materials 10M and 11M of the bases 10 and 11 in this case are made optical materials. Note that the same is true for FIG. 39H, FIG. 40F, and FIG. 41D.

The base 3701 has a rotationally symmetric or substantially rotationally symmetric concavity 3701B in the lower face of the base 3701. The shape of the surface of the concavity 3701B when the concavity 3701B is cut along its symmetry axis is preferably made an arc or substantially arc.

The concavity 3701B is filled with an optical material having a refractive index different from the base 3701. The convex lens 3702 is comprised by the concavity 3701B filled with the related optical material.

The lower face of the convex lens 3702 is flat and is parallel or substantially parallel to an upper face 3700U of the optical device 3700 (or the upper face of the base 3701). Also, the flat portions of the lower face of the convex lens 3702 and a lower face 3700B of the base 3701 are located in the identical plane.

The convex curved face of the convex lens 3702 closely contacts the surface of the concavity 3701B of the base 3700.

The optical device 3700 has the shape of a parallelopiped or substantial parallelopiped and can converge (condense) or scatter a beam emitted from the flat face of the convex lens 3702 or can change the same to a parallel beam when light enters the upper face 3700U.

The lower face 3100B of the optical device 3100 and the upper face 3700U of the optical device 3700 are bonded so that the optical axes of the lenses 3102 and 3702 coincide or substantially coincide.

It is also possible to form the optical devices 3100 and 3700 plate-like or substantially plate-like. It is possible to stack the optical devices 3100 and 3700 while positioning them with a high precision.

Also, by making the shape of the optical devices 3100 and 3700 a parallelopiped or substantial parallelopiped or plate-like or substantially plate-like, it is possible to prevent inclination of (the optical axes of) the lenses from occurring in the case where the optical devices are stacked and it is possible to easily prepare the optical system 3119A.

Also, it is possible to comprise a solid immersion lens (SIL) by providing a convex lens 3702 smaller than the convex lens 3102 in the optical system 3119A, and it is possible to obtain a high numerical aperture.

Third Embodiment of Optical System Using Third Optical Device

FIG. 46 is a schematic view of the configuration of a third embodiment of an optical system using the third optical device according to the present invention. Note that in an optical system 3119B of FIG. 46, identical reference numerals are assigned to identical components as those of the optical system 3110 in FIG. 44. Explanations of the identical components will be appropriately omitted.

This optical system 3119B has optical devices 3110 and 3710 and is comprised by stacking the optical devices 3110 and 3710.

The optical device 3710 has a base 3711 and a convex lens 3712. The base 3711 is made of an optical material, and the base 3711 and the convex lens 3712 have different refractive indexes. As the optical device 3710, it is also possible to use for example a base 3006 with the optical material 3007M filled in its concavity 3006B as shown in FIG. 37F. The material 3006M of the base 3006 in this case is made an optical material.

Similarly, as the optical device 3710, it is also possible to use the base 10 or 11 with the optical material 3007M filled in its concavity 10B as shown in FIG. 38I. The materials 10M and 11M of the bases 10 and 11 in this case are made optical materials. Note that the same is true also for FIG. 39H, FIG. 40F, and FIG. 41D.

The base 3711 has a rotationally symmetric or substantially rotationally symmetric concavity 3711B in the lower face of the base 3711. The shape of the surface of the concavity 3711B when the concavity 3711B is cut along its symmetry axis is preferably made an arc or substantially arc.

The concavity 3711B is filled with an optical material having a refractive index different from the base 3711. The convex lens 3712 is comprised by the concavity 3711B filled with the related optical material.

The lower face of the convex lens 3712 is flat and is parallel or substantially parallel to an upper face 3710U of the optical device 3710 (or the upper face of the base 3711). Also, the flat portions of the lower face of the convex lens 3712 and a lower face 3710B of the base 3711 are located in the identical plane.

The convex curved face of the convex lens 3712 closely contacts the surface of the concavity 3711B of the base 3710.

The optical device 3710 has the shape of parallelopiped or substantial parallelopiped and can converge (condense) or scatter a beam emitted from the flat face of the convex lens 3712 or can change the same to a parallel beam when light enters the upper face 3710U.

The lower face 3710B of the optical device 3710 and the upper face 3110U of the optical device 3110 are bonded so that the optical axes of the lenses 3112 and 3712 coincide or substantially coincide.

It is also possible to form the optical devices 3110 and 3710 plate-like or substantially plate-like. It is possible to stack the optical devices 3110 and 3710 while positioning them with a high precision.

Also, by making the shapes of the optical devices 3110 and 3710 parallelepipeds or substantial parallelepipeds or plate-like or substantially plate-like, it is possible to prevent the inclination of (the optical axes of) the lenses from occurring in the case where the optical devices are stacked and it is possible to easily prepare the optical system 3119B.

Fourth Embodiment of Optical System Using Third Optical Device

Figure 47:
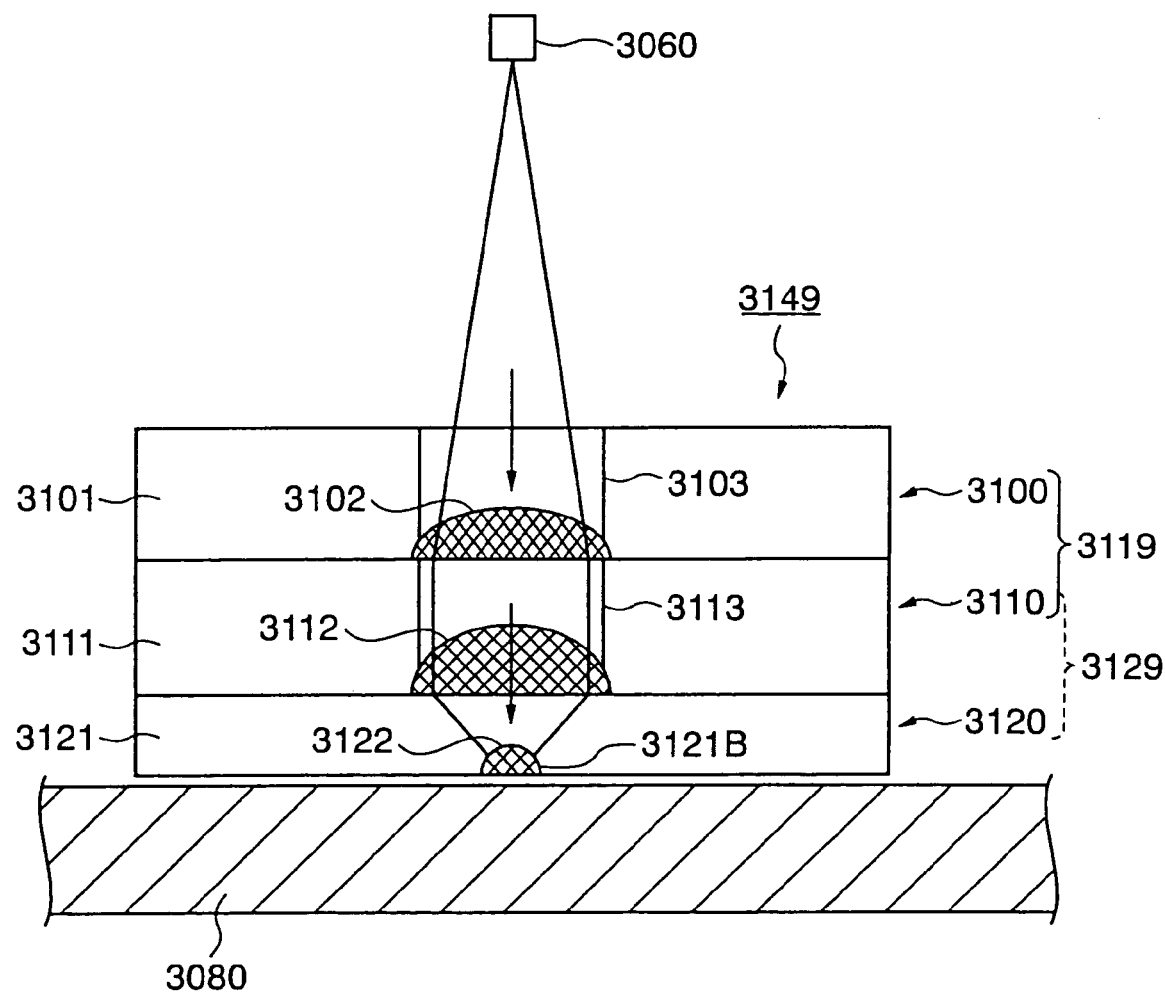
FIG. 47 is a schematic view of the configuration of a fourth embodiment of an optical system using the third optical devices according to the present invention.

FIG. 47 is a schematic view of the configuration of a fourth embodiment of an optical system using the third optical device according to the present invention. Note that in an optical system 3149 of FIG. 47, identical reference numerals are assigned to identical components as those of the optical system 3119 of FIG. 44. Explanations of the identical components will be appropriately omitted.

This optical system 3149 has optical devices 3100, 3110, and 3120, the optical device 3110 is stacked upon the optical device 3120, and the optical device 3100 is stacked upon the optical device 3110.

The optical devices 3100, 3110, and 3120 are bonded so that the optical axes of the convex lenses 3102, 3112, and 3122 of the optical devices 3100, 3110, and 3120 coincide or substantially coincide.

The optical system 3119 has the optical devices 3100 and 3110.

The convex lens 3102 of the optical device 3100 is a collimator lens. The convex lens 3102 receives a laser beam from a semiconductor laser 3060 through the hole 3103, changes the related laser beam to a parallel beam, and supplies the same to the optical device 3110.

The convex lens 3112 of the optical device 3110 receives the parallel beam from the optical device 3100 through the hole 3113 and condenses the laser beam of the related parallel beam to the convex lens 3122.

The optical device 3120 has a base 3121 and the convex lens 3122. The base 3121 is made of an optical material. The base 3121 and the convex lens 3122 are different in refractive index.

The base 3121 has a rotationally symmetric or substantially rotationally symmetric concavity 3121B in the lower face of the base 3121. The shape of the surface of the concavity 3121B when the concavity 3121B is cut along its symmetry axis is preferably made an arc or substantially arc.

The concavity 3121B is filled with an optical material having a refractive index different from the base 3121. The convex lens 3122 is comprised by the concavity 3121B filled with the related optical material.

The lower face of the convex lens 3122 is flat and is parallel or substantially parallel to the upper face of the optical device 3120 (or the upper face of the base 3121). Also, the flat faces of the lower face of the convex lens 3122 and the lower face of the base 3121 are located in the identical plane.

The optical device 3120 has the shape of a parallelopiped or substantial parallelopiped and can condense the beam emitted from the flat face of the convex lens 3122 of the optical device 3120 to the recording surface of an optical disc 3080 when light from the convex lens 3112 of the optical system 3119 strikes it.

The optical system 3129 has the optical devices 3110 and 3120. The combination of the optical devices 3110 and 3120 comprises a solid immersion lens (SIL). By enlarging the refractive index of the convex lens 3122, the numerical aperture NA of the optical system 3129 can be made higher.

In the optical devices 3100 to 3120, the convex lenses 3102 to 3122 are formed by filling the optical material in the concavities of the bases, so the range of selection of the material of the convex lenses 3102 to 3122 can be made larger and an optical material having a large refractive index can be used as the material of the convex lenses.

Note that, by rounding the edges of the bottom face of the optical device 3120 (face facing the optical disc 3080), it is possible to reduce collisions with and/or shock to the surface of the optical disc 3080.

Fifth Embodiment of Optical System Using Third Optical Device

Figure 48:
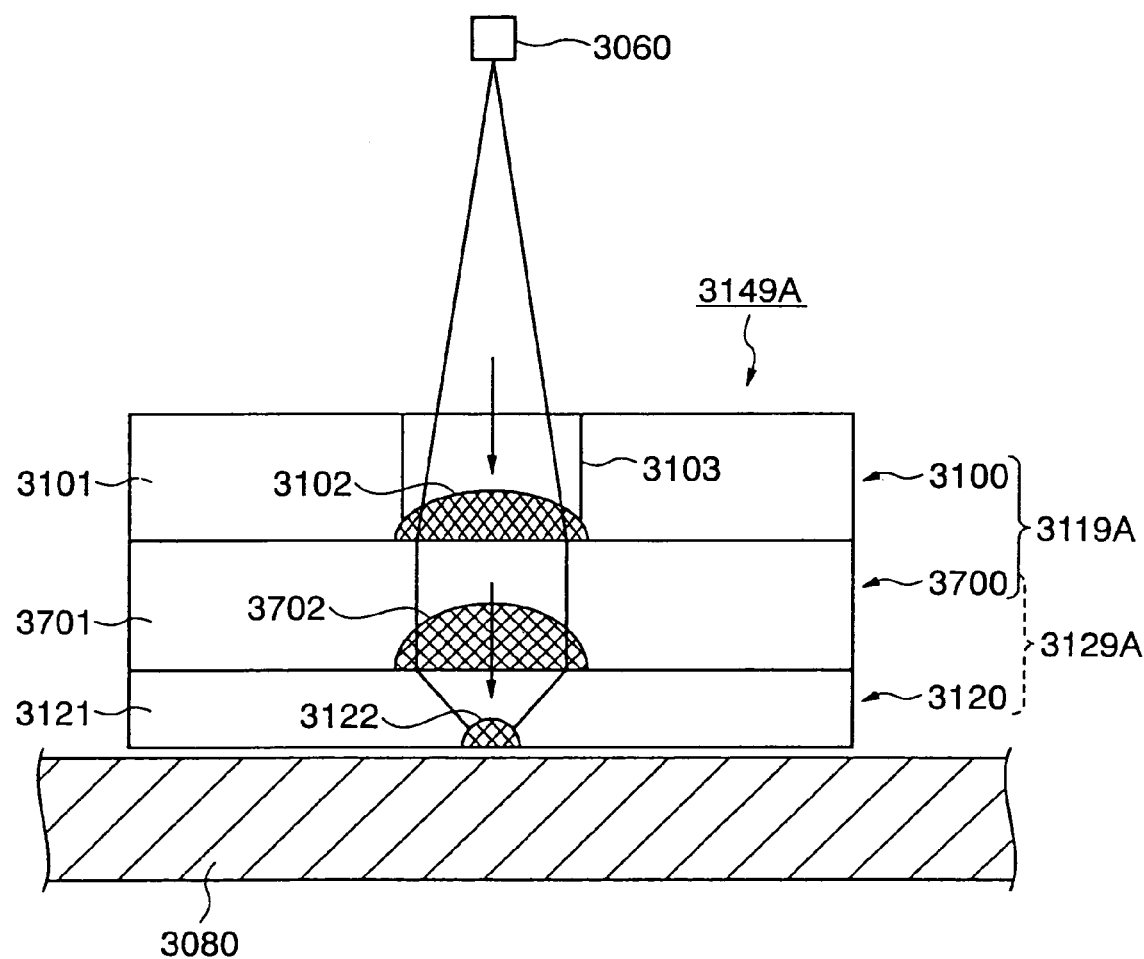
FIG. 48 is a schematic view of the configuration of a fifth embodiment of an optical system using the third optical devices according to the present invention.

FIG. 48 is a schematic view of the configuration of a fifth embodiment of an optical system using the third optical device according to the present invention. Note that in an optical system 3149A of FIG. 48, identical reference numerals are assigned to identical components as those of the optical system 3119A of FIG. 45. Explanations of the identical components will be appropriately omitted. Also, in the optical system 3149A of FIG. 48, the optical device 3120 in FIG. 47 is used. An explanation of this optical device 3120 will be appropriately omitted.

This optical system 3149A has optical devices 3100, 3120, and 3700, the optical device 3700 is stacked upon the optical device 3120, and the optical device 3100 is stacked upon the optical device 3700.

The optical devices 3100, 3120, and 3700 are bonded so that the optical axes of the convex lenses 3102, 3122, and 3702 of the optical devices 3100, 3120, and 3700 coincide or substantially coincide.

The optical system 3119A has the optical devices 3100 and 3700.

The convex lens 3102 of the optical device 3100 is a collimator lens. The convex lens 3102 receives the laser beam from the semiconductor laser 3060 through the hole 3103, changes the related laser beam to a parallel beam, and supplies the same to the optical device 3700.

The base 3701 of the optical device 3700 and the convex lens 3702 have different refractive indexes from each other. The convex lens 3702 receives the parallel beam from the optical device 3100 and condenses the laser beam of the related parallel beam to the convex lens 3122.

The optical device 3120 has the shape of a parallelopiped or substantial parallelopiped and can condense the beam emitted from the flat face of the convex lens 3122 of the optical device 3120 to the recording surface of an optical disc 3080 when light from the convex lens 3702 of the optical system 3119 enters it.

The optical system 3129A has the optical devices 3120 and 3700. The combination of the optical devices 3120 and 3700 constitutes a solid immersion lens (SIL). By enlarging the refractive index of the convex lens 3122, the numerical aperture NA of the optical system 3129A can be made higher.

In the optical devices 3100, 3120, and 3700, the convex lenses 3102, 3122, and 3702 are formed by filling an optical material in the concavities of the bases, so the range of selection of the material of the convex lenses 3102, 3122, and 3702 can be made larger, and an optical material having a large refractive index can be used as the material of the convex lenses.

Sixth Embodiment of Optical System Using Third Optical Device

Figure 49:
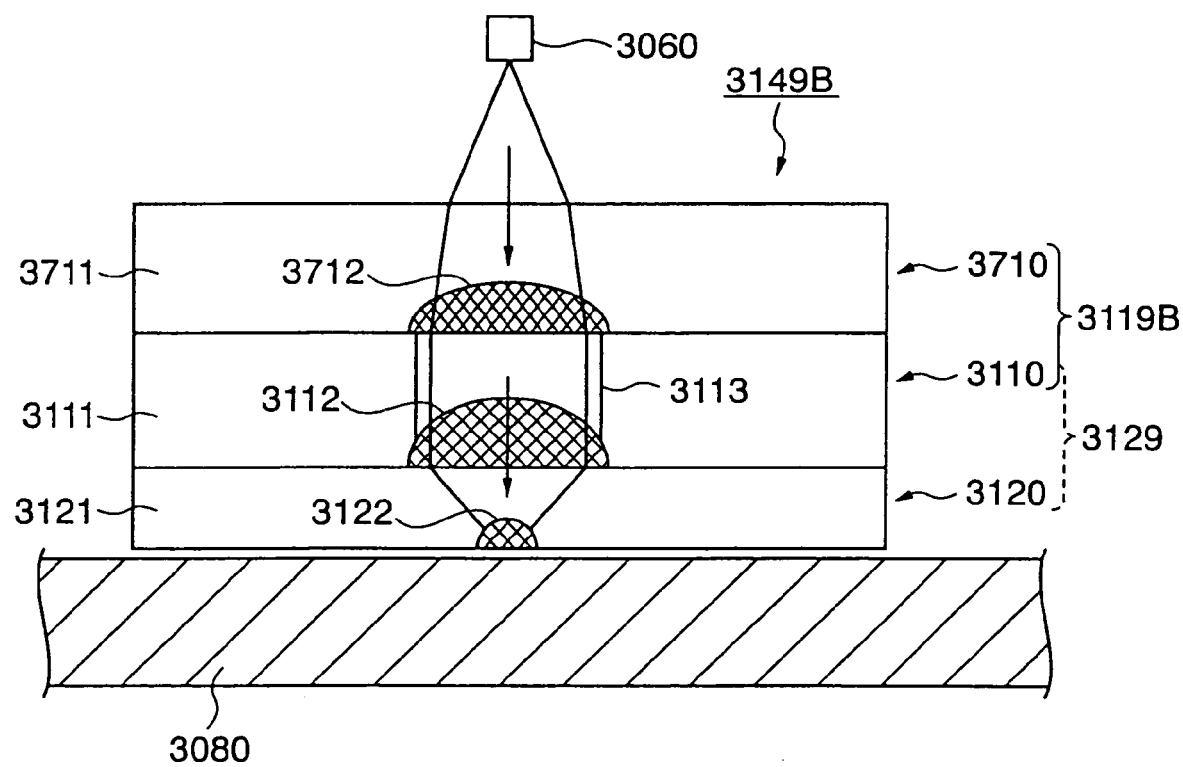
FIG. 49 is a schematic view of the configuration of a sixth embodiment of an optical system using the third optical devices according to the present invention.

FIG. 49 is a schematic view of the configuration of a sixth embodiment of an optical system using the third optical device according to the present invention. Note that in an optical system 3149B of FIG. 49, identical reference numerals are assigned to identical components as those of the optical system 3119B of FIG. 46. Explanations of the identical components will be appropriately omitted. Also, in the optical system 3149B of FIG. 49, the optical device 3120 in FIG. 47 is used. The explanation of this optical device 3120 will be appropriately omitted.

This optical system 3149B has optical devices 3110, 3120, and 3710, the optical device 3110 is stacked upon the optical device 3120, and the optical device 3710 is stacked upon the optical device 3110.

The optical devices 3110, 3120, and 3710 are bonded so that the optical axes of the convex lenses 3112, 3122, and 3712 of the optical devices 3110, 3120, and 3710 coincide or substantially coincide.

The optical system 3119B has the optical devices 3110 and 3710. The base 3711 and the convex lens 3712 of the optical device 3710 are different in refractive index from each other.

The optical device 3710 has the function of a collimator lens. The convex lens 3712 changes the laser beam from the semiconductor laser to a parallel beam and supplies this to the optical device 3110.

The convex lens 3112 of the optical device 3110 receives the parallel beam from the optical device 3710 incident through the hole 3113 and condenses the laser beam of the related parallel beam to the convex lens 3122.

The optical device 3120 has the shape of a parallelopiped or substantial parallelopiped and can condense the beam emitted from the flat face of the convex lens 3122 of the optical device 3120 to the recording surface of an optical disc 3080 when light from the convex lens 3712 of the optical system 3119B enters it.

The optical system 3129 has the optical devices 3110 and 3120. The combination of the optical devices 3110 and 3120 constitutes a solid immersion lens (SIL). By enlarging the refractive index of the convex lens 3122, the numerical aperture NA of the optical system 3129 can be made higher.

In the optical devices 3110, 3120, and 3710, the convex lenses 3112, 3122, and 3712 are formed by filling an optical material in the concavities of the bases, so the range of selection of the material of the convex lenses 3112, 3122, and 3712 can be made large, and an optical material having a large refractive index can be used as the material of the convex lenses.

Seventh Embodiment of Optical System Using Third Optical Device

Figure 50:
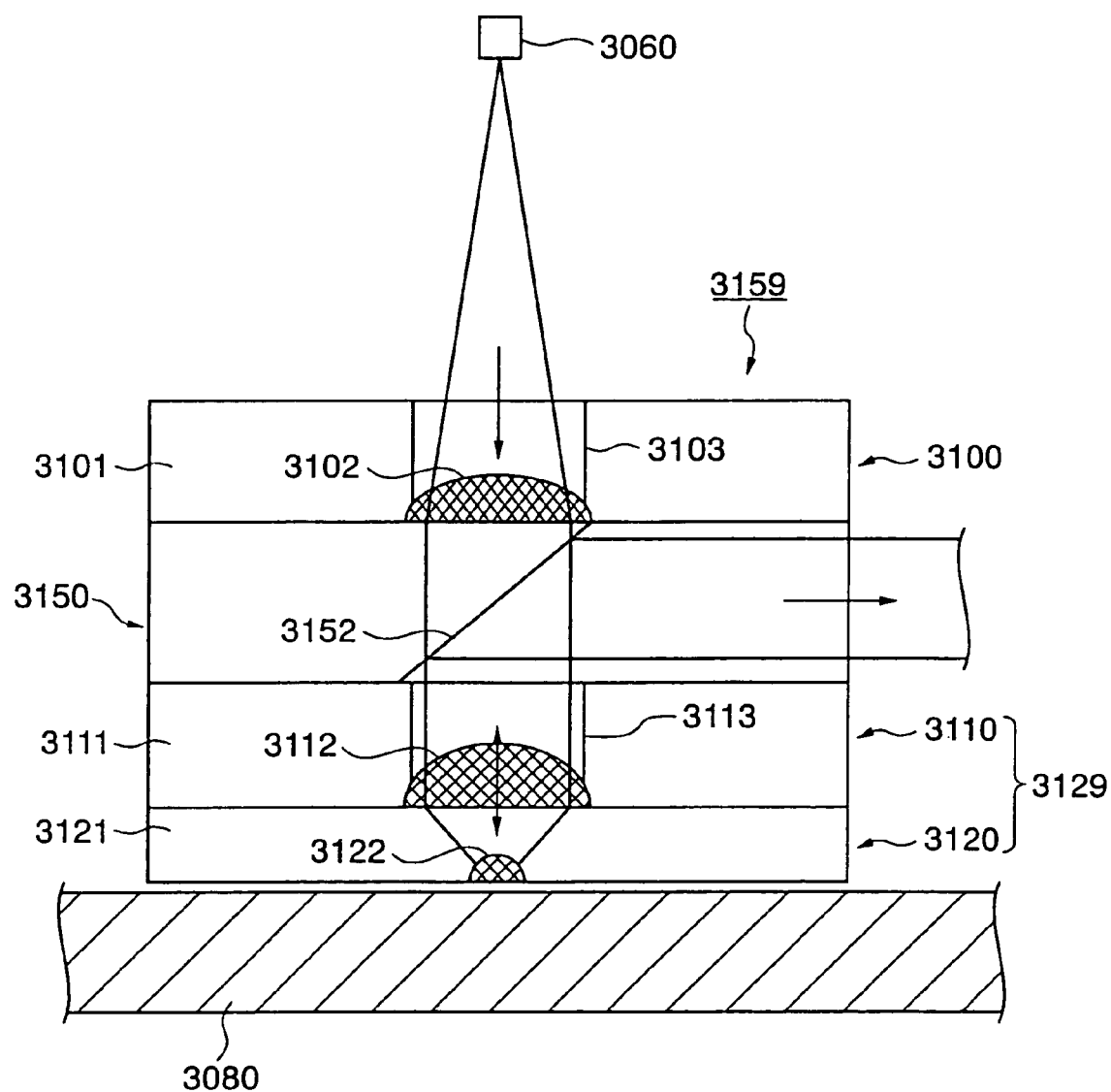
FIG. 50 is a schematic view of the configuration of a seventh embodiment of an optical system using the third optical devices according to the present invention.

FIG. 50 is a schematic view of the configuration of a seventh embodiment of an optical system using the third optical device according to the present invention. Note that in an optical system 3159 of FIG. 50, identical reference numerals are assigned to identical components as those of the optical system 3149 of FIG. 47. Explanation of the identical components will be appropriately omitted.

This optical system 3159 is configured as the optical system 3149 of FIG. 47 with an optical device 3150 inserted as a beam splitter between the optical devices 3100 and 3110.

The optical system 3159 has the optical devices 3100, 3110, 3120, and 3150, the optical device 3110 is stacked upon the optical device 3120, the optical device 3150 is stacked upon the optical device 3110, and the optical device 3100 is stacked upon the optical device 3150. The optical devices 3100, 3110, 3120, and 3150 are bonded so that the optical axes of the convex lenses 3102, 3112, and 3122 of the optical devices 3100, 3110, and 3120 coincide or substantially coincide.

The optical device 3150 located between the optical devices 3100 and 3110 has the function of a beam splitter. A film of semi-transparency (semi-transparent film) 152 is located between the convex lenses 3102 and 3112.

This semi-transparent film 152 passes the parallel beam from (the convex lens 3102 of) the optical device 3100 therethrough and reflects a returned beam from (the convex lens 3112 of) the optical device 3110.

The convex lens 3102 of the optical device 3100 is a collimator lens, changes the laser beam from the semiconductor laser 3060 to a parallel beam, and supplies this parallel beam via the optical device 3150 to the optical device 3110 in the optical system 3129.

The optical system 3129 emits the parallel beam from the optical device 3150 through the lenses 3112 and 3122 from the bottom face of the convex lens 3122, condenses the emitted beam to the recording surface of the optical disc 3080, and irradiates the related recording surface. Also, the optical system 3129 supplies the reflected laser beam reflected at the recording surface of) the optical disc 3080 (returned laser beam) to the optical device 3150.

By interposing the optical device 3150 as the beam splitter between the optical device 3100 and the optical system 3129, it is possible to extract the reflected laser beam reflected at the optical disc 3080 from the side face of the optical device 3150.

Eighth Embodiment of Optical System Using Third Optical Device

Figure 51:
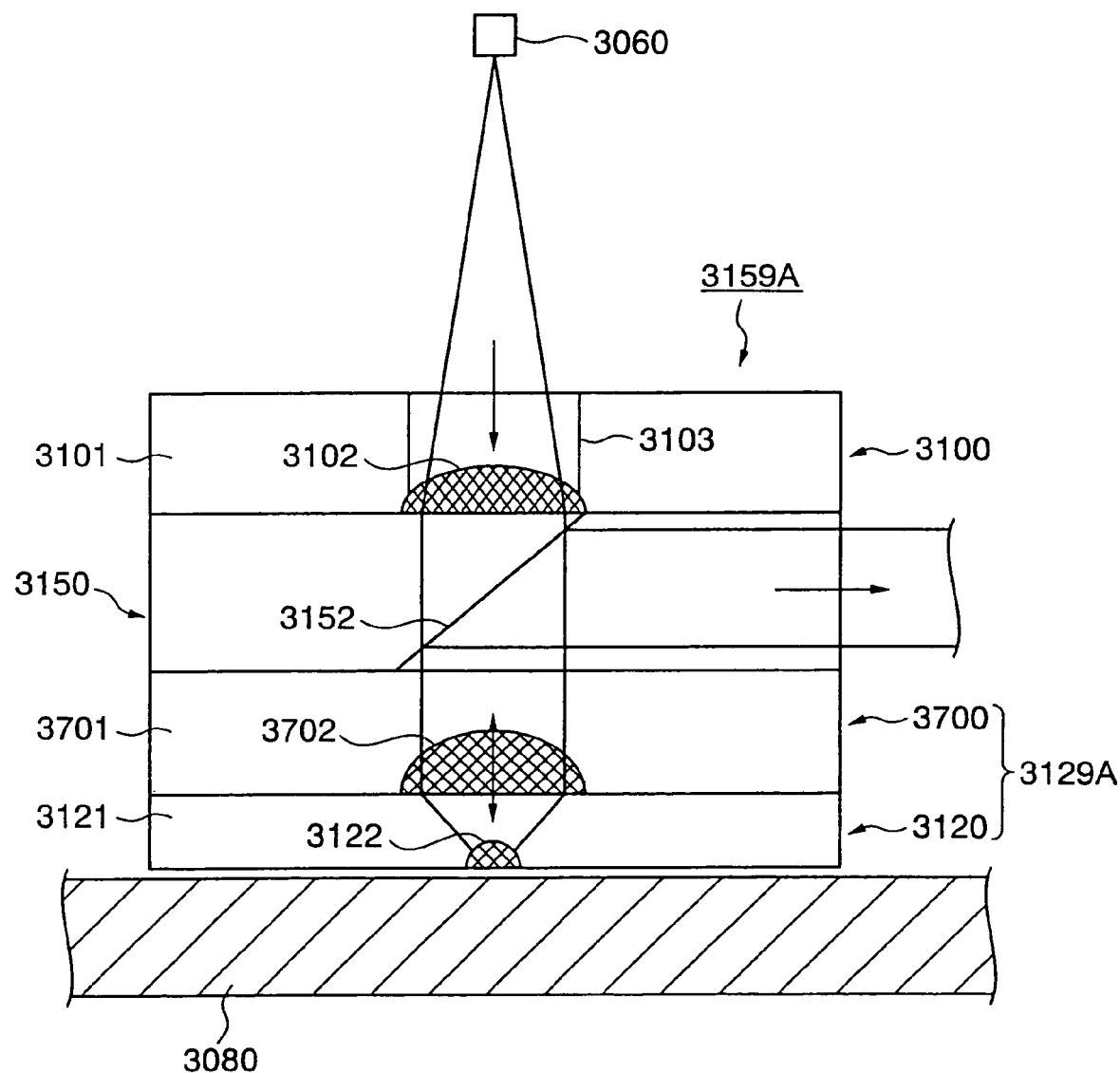
FIG. 51 is a schematic view of the configuration of an eighth embodiment of an optical system using the third optical devices according to the present invention.

FIG. 51 is a schematic view of the configuration of an eighth embodiment of an optical system using the third optical device according to the present invention. Note that in an optical system 3159A of FIG. 51, identical reference numerals are assigned to identical components as those of the optical system 3159 of FIG. 50 and the optical system 3149A of FIG. 48. Explanation of the identical components will be appropriately omitted.

This optical system 3159A is configured as the optical system 3149A of FIG. 48 with the optical device 3150 inserted as a beam splitter between the optical devices 3100 and 3700.

The optical system 3159A has the optical devices 3100, 3120, 3150, and 3700, the optical device 3700 is stacked upon the optical device 3120, the optical device 3150 is stacked upon the optical device 3700, and the optical device 3100 is stacked upon the optical device 3150. The optical devices 3100, 3120, 3150, and 3700 are bonded so that the optical axes of the convex lenses 3102, 3122, and 3702 of the optical devices 3100, 3120 and 3700 coincide or substantially coincide.

The optical device 3150 located between the optical devices 3100 and 3700 has the function of a beam splitter. A film having semi-transparency (semi-transparent film) 152 is located between the convex lenses 3102 and 3702.

This semi-transparent film 152 passes the parallel beam from (the convex lens 3102 of) the optical device 3100 therethrough and reflects a returned beam from (the convex lens 3702 of) the optical device 3700.

The convex lens 3102 of the optical device 3100 is a collimator lens, changes the laser beam from the semiconductor laser 3060 to a parallel beam, and supplies this parallel beam via the optical device 3150 to the optical device 3700 in the optical system 3129A.

The optical system 3129A emits the parallel beam from the optical device 3150 through the lenses 3702 and 3122 from the bottom face of the convex lens 3122, condenses the emitted beam to the recording surface of the optical disc 3080, and irradiates the related recording surface. Also, the optical system 3129A supplies the reflected laser beam reflected at (the recording surface of) the optical disc 3080 (returned laser beam) to the optical device 3150.

By interposing the optical device 3150 as the beam splitter between the optical device 3100 and the optical system 3129A, it is possible to extract the reflected laser beam reflected at the optical disc 3080 from the side face of the optical device 3150.

Ninth Embodiment of Optical System Using Third Optical Device

Figure 52:
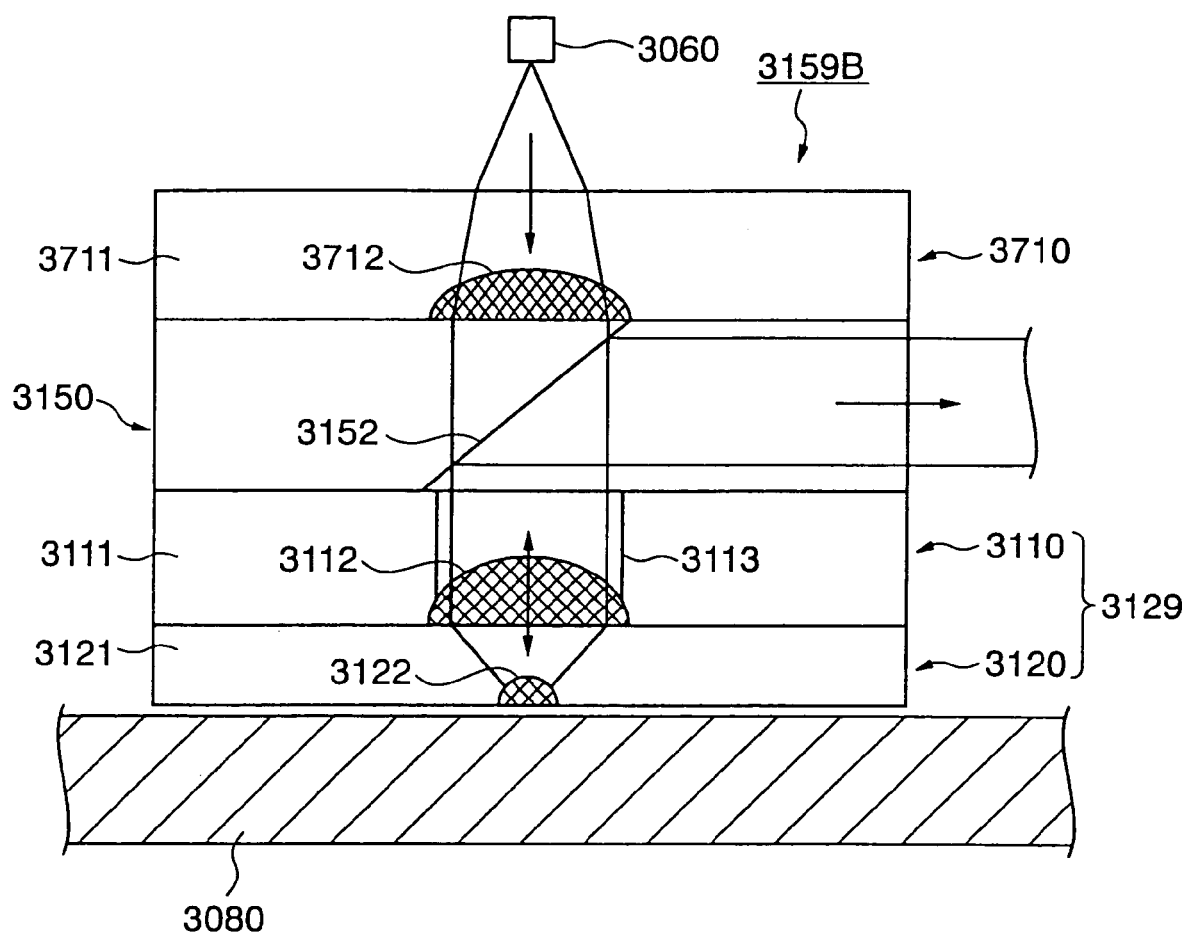
FIG. 52 is a schematic view of the configuration of a ninth embodiment of an optical system using the third optical devices according to the present invention.

FIG. 52 is a schematic view of the configuration of a ninth embodiment of an optical system using the third optical device according to the present invention. Note that in an optical system 3159B of FIG. 52, identical reference numerals are assigned to identical components as those of the optical system 3159 of FIG. 50 and the optical system 3149B of FIG. 49. Explanations of the identical components will be appropriately omitted.

This optical system 3159B is configured as the optical system 3149B of FIG. 49 with the optical device 3150 inserted as a beam splitter between the optical devices 3110 and 3710.

The optical system 3159B has the optical devices 3110, 3120, 3150, and 3710, the optical device 3110 is stacked upon the optical device 3120, the optical device 3150 is stacked upon the optical device 3110, and the optical device 3710 is stacked upon the optical device 3150. The optical devices 3110, 3120, 3150, and 3710 are bonded so that the optical axes of the convex lenses 3112, 3122, and 3712 of the optical devices 3110, 3120 and 3710 coincide or substantially coincide.

The optical device 3150 located between the optical devices 3110 and 3710 has the function of a beam splitter. A film having semi-transparency (semi-transparent film) 152 is located between the convex lenses 3112 and 3712.

This semi-transparent film 152 passes the parallel beam from (the convex lens 3712 of) the optical device 3710 therethrough and reflects the returned beam from (the convex lens 3112 of) the optical device 3110.

The optical device 3710 has the function of a collimator lens, changes the laser beam from the semiconductor laser 3060 to the parallel beam, and supplies this parallel beam via the optical device 3150 to the optical device 3110 in the optical system 3129.

The optical system 3129 emits the parallel beam from the optical device 3150 through the convex lenses 3112 and 3122 from the bottom face of the convex lens 3122, condenses the emitted beam to the recording surface of the optical disc 3080, and irradiates the related recording surface. Also, the optical system 3129 supplies the reflected laser beam reflected at (the recording surface of) the optical disc 3080 (returned laser beam) to the optical device 3150.

By interposing the optical device 3150 as the beam splitter between the optical device 3710 and the optical system 3129, it is possible to extract the reflected laser beam reflected at the optical disc 3080 from the side face of the optical device 3150.

Embodiment of Optical Head Using Third Optical Device

Figure 53:
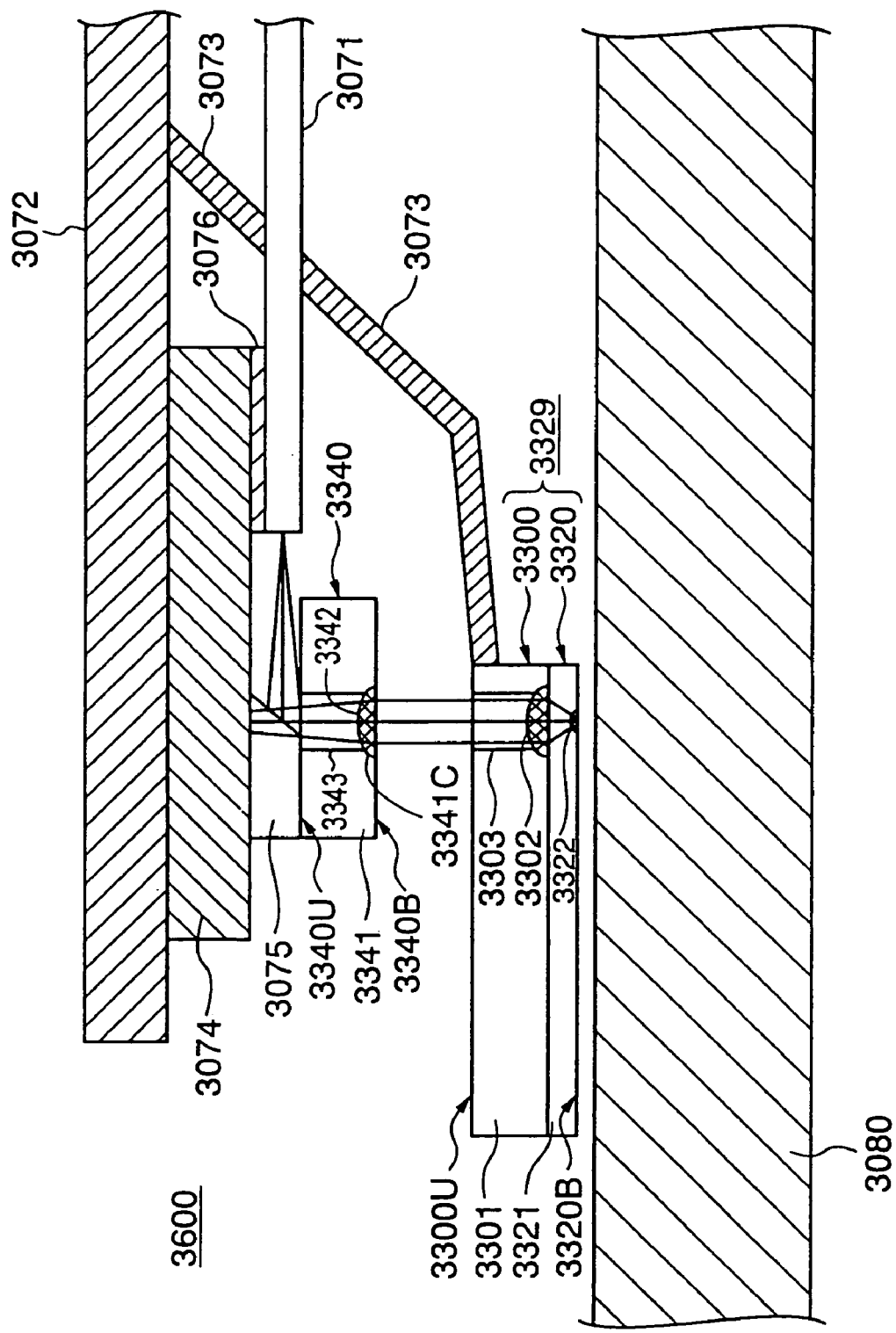
FIG. 53 is a schematic view of the configuration of an embodiment of an optical head using the third optical device according to the present invention.

FIG. 53 is a schematic view of the configuration of an embodiment of an optical head using the third optical device according to the present invention.

This optical head 3600 has an optical system 3329, an IC chip 3074, a prism 3075, and an optical device 3340. A flying head (floating type optical head) is comprised by a swing arm 3072 and a suspension 3073.

The optical system 3329 has optical devices 3300 and 3320. The optical device 3300 is stacked upon the optical device 3320. This optical system 3329 comprises a slider. A bottom face 3320B of the optical device 3320 of the optical system 3329 and the surface of the optical disc 3080 face each other. The bottom face 3320B of the optical device 3320 comprises a slider face.

The suspension 3073 is attached to the lower face (bottom face) of the swing arm 3072, or the suspension 3073 is formed there.

Also, the upper face of the IC chip 3074 is bonded to the front end of the lower face of the swing arm 3072.

The upper face of the prism 3075 and the upper face of a base 3076 are bonded to the lower face of the IC chip 3074.

The upper face of the optical device 3340 is bonded to the lower face of the prism 3075.

A flexible optical fiber 3071 is bonded to the lower face of the base 3076. For example, a V-shaped groove is formed in the lower face of the base 3076, and the optical fiber 3071 is tightly fixed so that the optical fiber 3071 is fit in the related V-shaped groove. Note that desirably the base 3076 is made of an identical material to the IC chip 3074.

The optical system 3329 is attached to the front end of the suspension 3073.

The optical device 3340 is shaped as a parallelopiped or a substantial parallelopiped provided with a hole 3343. The optical device 3340 has a base (substrate) 3341 and a convex lens 3342.

In the base 3341, a concave curved face (concretely the annular inclined face) 3341C closely contacting the convex curved face of the convex lens 3342 is formed in a lower face 3340B. At the same time, the hole 3343 communicating with an upper face 3340U is formed from the deep side of the concave curved face 3341C.

Then, part (concretely the center portion) of the convex curved face of the convex lens 3342 is exposed in the hole 3343 of the base 3341.

The convex lens 3342 is a collimator lens and has a rotationally symmetric or substantially rotationally symmetric shape surrounded by the flat face and the convex curved face facing this flat face. The optical axis of the convex lens 3342 or the extension thereof passes through the hole 3343. The shape of the convex curved face when the convex lens 3342 is cut along its symmetry axis is preferably made an arc or substantially arc.

The hole 3343 has a rotationally symmetric or substantially rotationally symmetric shape, and the symmetry axis of the hole 3343 and the optical axis of the convex lens 3342 coincide or substantially coincide.

The flat face of the convex lens 3342 is parallel or substantially parallel to the upper face 3340U of the optical device 3340 (or the upper face of the base 3341). Also, the flat portion (or flat face) on the area around the concave curved face 3341C in the lower face 3340B of the base 3341 and the flat face of the convex lens 3342 are parallel or substantially parallel and located in an identical plane in FIG. 53.

The optical device 3340 has the shape of a parallelopiped or substantial parallelopiped and can change a beam emitted from the lower face 3340B of the optical device 3340 to a parallel beam by the convex lens 3342 when light enters the upper face 3340U.

A half mirror is formed on the inclined face of the prism 3075. This half mirror reflects the laser beam radiated from an end face of the optical fiber 3071 and supplies the same to the optical device 3340.

The optical device 3340 supplies the laser beam from the half mirror of the prism 3075 to the convex lens 3342 through the hole 3343. The convex lens 3342 changes the laser beam from the half mirror to a parallel beam and supplies the same to the optical system 3329.

The optical system 3329 condenses the laser beam from the optical device 3340 to the optical disc 3080 by using lenses 3302 and 3322 and focuses it on the recording surface of the optical disc 3080. Also, the optical system 3329 returns the laser beam reflected at the recording surface of the optical disc 3080 (returned laser beam) to the prism 3075 via the convex lens 3342 and the hole 3343 of the optical device 3340.

The half mirror of the inclined face of the prism 3075 transmits the returned laser beam from the optical system 3329 therethrough and supplies the same to the IC chip 3074.

The IC chip 3074 is an optical semiconductor composite device. A photo-detector and an processing circuit are formed on the lower face of the IC chip 3074, or the photo-detector and the processing circuit are attached there.

The photo-detector receives the returned laser beam and supplies a reception light signal in accordance with the returned laser beam to the processing circuit.

The processing circuit performs the predetermined processing based on the reception light signal from the photo-detector and creates a signal indicating the processing result. This signal can be extracted from a signal line connected to the IC chip 3074.

Figure 54:
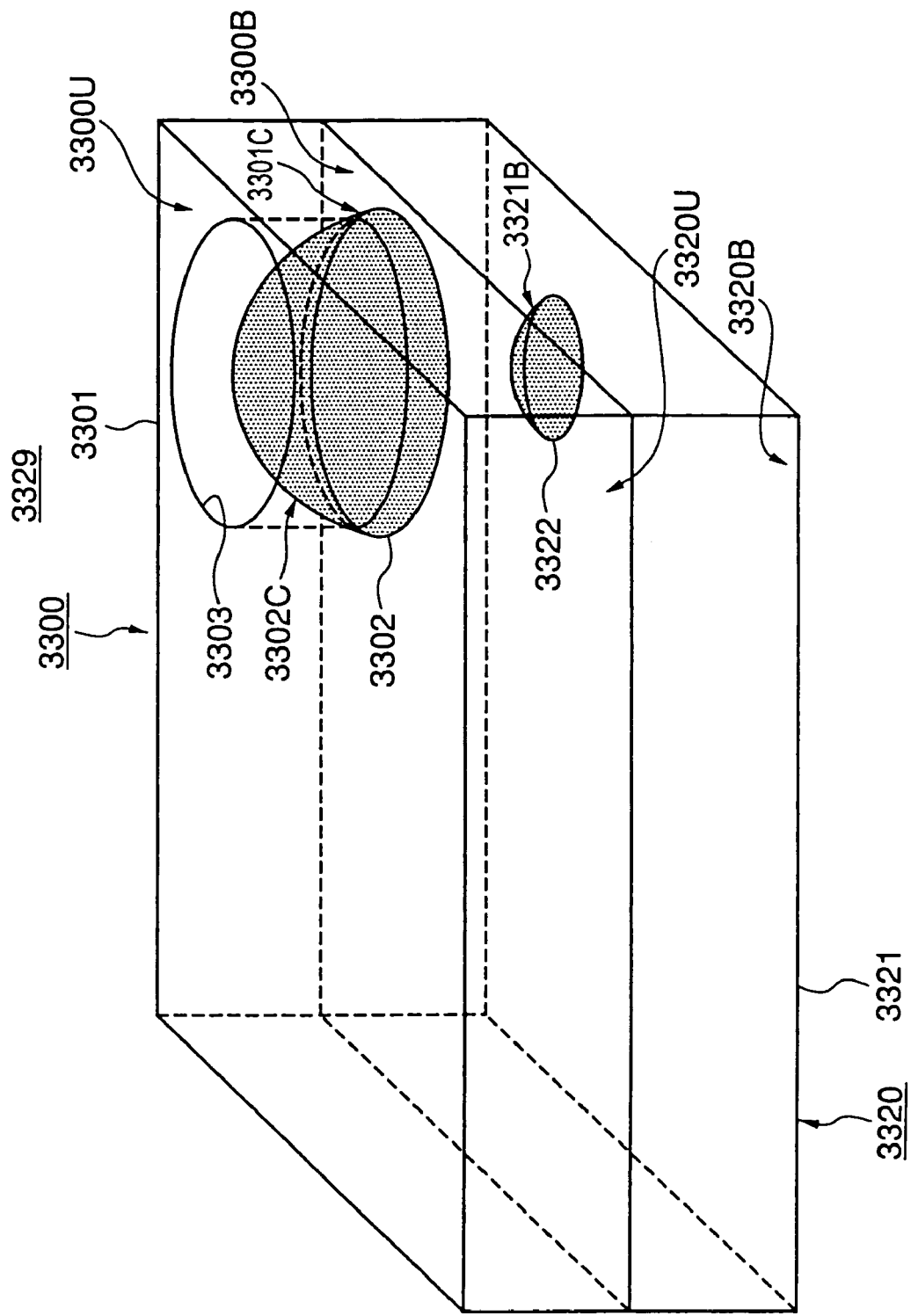
FIG. 54 is a schematic view of the configuration of an optical system shown in FIG. 53.

FIG. 54 is a schematic view of the configuration of the optical system 3329 in FIGS. 38I to 38L.

The optical system 3329 has the optical devices 3300 and 3320.

The optical device 3320 has a base 3321 and a convex lens 3322. The base 3321 is made of an optical material. The base 3321 and the convex lens 3322 are different in refractive index from each other.

The base 3321 has a rotationally symmetric or substantially rotationally symmetric concavity 3321B in the lower face of the base 3321. The shape of the surface of the concavity 3321B when the concavity 3321B is cut along its symmetry axis is preferably made an arc or substantially arc.

The concavity 3321B is filled with an optical material having a refractive index different from the base 3321. The convex lens 3322 is comprised of the concavity 3321B filled with the related optical material.

The lower face of the convex lens 3322 is flat and is parallel or substantially parallel to an upper face 3320U of the optical device 3320 (or the upper face of the base 3321). Also, the flat portions of the lower face of the convex lens 3322 and the lower face 3320B of the base 3321 are located in the identical plane and comprise the lower face of the optical device 3320.

The optical device 3320 exhibits the shape of a parallelopiped or substantial parallelopiped and can converge (condense) the beam emitted from the flat face of the convex lens 3322 when light enters the upper face 3320U.

The lower face 3300B of the optical device 3300 (or base 3301) and the upper face 3320U of the optical device 3320 are bonded so that the optical axes of the convex lenses 3302 and 3322 coincide or substantially coincide.

Note that, by rounding the edges of the bottom face 3320B of the optical device 3320 (face facing the optical disc 3080), it is possible to reduce collisions with and/or shock to the surface of the optical disc 3080.

It is also possible if the base 3321 of the optical device 3320 is made for example aluminum oxide or silicon nitride.

The optical system 3329 of the optical head 3600 desirably has a large rigidity and/or hardness. By forming the base 3321 of the optical device 3320 by aluminum oxide, the rigidity and/or hardness can be increased.

A high numerical aperture can be obtained by the optical system 3329. By comprising a solid immersion lens (SIL) by the optical system 3329 and using the related optical system 3329 in the near field region, it is possible to perform near field optical recording and/or reproduction and it is possible to improve a recording density of the optical disc.

It is also possible to form rails for floating the optical system 3329 as the slider on the bottom face 3320B of the optical device 3320.

It is also possible to form on the bottom face 3320B of the optical device 3320 a coil generating a magnetic field (or a magnetic flux) at the time of opto-magnetic recording when the optical disc 3080 is an opto-magnetic disc.

It is also possible to easily prepare the rails and/or coil of the bottom face 3320B of the optical device 3320 by forming the optical device 3320 in a parallelopiped or substantially parallelopiped or plate-like or substantially plate-like shape by utilizing a semiconductor manufacturing process.

As an example, the size of the optical system 3329 in a lateral direction is made about 1 mm, the size in a vertical direction is made about 0.5 mm, and the size in a height direction is made about 0.4 mm.

As an example, the size of the optical device 3300 in the height direction is made about 0.3 mm, and the size of the optical device 3320 in the height direction is made about 0.13 mm.

As an example, a diameter of the bottom face (or the flat face) of the lens 3302 is made about 0.2 mm, and the diameter of the bottom face (or the flat face) of the lens 3322 is made about 0.1 mm.

Figure 55:
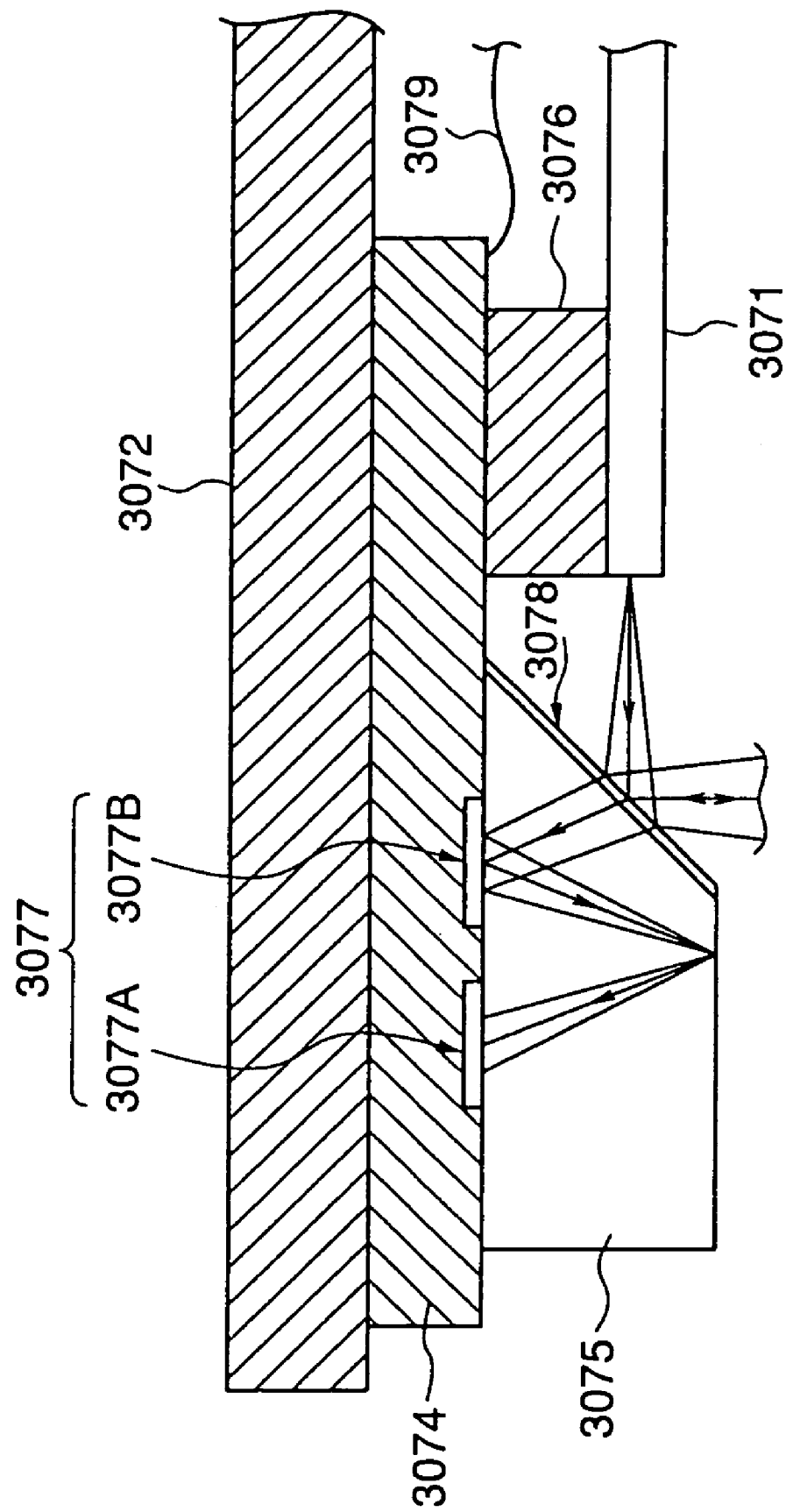
FIG. 55 is a schematic explanatory view of an example of the configuration of an IC chip shown in FIG. 53 and the periphery thereof.

FIG. 55 is a schematic explanatory view of an example of the configuration of the IC chip 3074 in FIG. 53 and the periphery thereof.

To the IC chip 3074 receives drive power from a not illustrated power supply line. Also, the IC chip 3074 can extract an output signal of the IC chip 3074 by a flexible signal line 3079, and can supply the signal to the IC chip 3074. Note the signal line 3079 may also be configured as an ultra-fine wire of a metal of copper or the like given a thin insulative coating.

The upper face of the prism 3075 and the upper face of the base (sub mount) 3076 are bonded to the lower face of the IC chip 3074. The optical fiber 3071 is bonded to the lower face of the base 3076.

A half mirror 3078 is formed on the inclined face of the prism 3075. The half mirror 3078 reflects the laser beam radiated from the end face of the optical fiber 3071 and supplies the same to the convex lens 3342 of the optical device 3340.

The laser beam passed through the convex lens 3342 is irradiated to the optical disc 3080 via the optical system 3329, reflected at the recording surface of the optical fiber 3080, and returned to the convex lens 3342.

The half mirror 3078 transmits the returned laser beam from the convex lens 3342 therethrough and supplies the same to the inclined face of the prism 3075. The inclined face of the prism 3075 supplies the returned laser beam transmitted through the half mirror 3078 to the IC chip 3074.

Note that the half mirror 3078 is comprised by a multi-layer film reflecting the laser beam from the direction of the end face of the optical fiber 3071 and transmitting the laser beam from the direction of the convex lens 3342 therethrough.

A photo-detector 3077 is formed on the lower face of the IC chip 3074. This photo-detector 3077 has first and second photo-detectors 3077A and 3077B.

The returned laser beam transmitted through the inclined face of the prism 3075 is condensed onto the second photo-detector 3077B and reflected, reflected again at the lower face of the prism 3075, and condensed onto the first photo-detector 3077A. Note that a not illustrated reflection film is formed on the lower face of the prism 3075.

The IC chip 3074 supplies the output signals from the photo-detectors 3077A and 3077B to the processing circuit in the IC chip 3074.

By comprising the photo-detector 3077 as a six-divided photo-detector and comprising the photo-detectors 3077A and 3077B as three-divided photo-detectors, a focus error signal can be created by a D–3DF (difference–3 Divided Focusing), a tracking error signal can be created by a push pull method, and the reproduction signal can be created by a sum of the output signals of the photo-detector 3077A or the photo-detector 3077B.

Further, the IC chip 3074 can fetch the focus error signal, tracking error signal, and reproduction signal from the signal line 3079.

In the optical head 3600 of FIG. 53, a reduction of the size of the optical head is possible in comparison with an optical head provided with a semiconductor laser, and it is possible to quickly move the optical head.

For example, in order to provide a semiconductor laser in the optical head, heat dissipating parts for countering the heat generation of the semiconductor laser, a sealed vessel for protecting the semiconductor laser, etc. are necessary, but in the optical head 3600, the heat dissipation parts and sealed vessel are unnecessary. A reduction of size is possible in this point.

In this way, by using the light weight and small sized optical head 3600, reduction of size of the optical disc apparatus is possible, and high speed access to the optical disc 3080 is possible.

Also, in the optical head 3600, since the reflected laser beam from the optical disc 3080 (returned laser beam) is converted to an electric signal, it becomes unnecessary to send the returned laser beam to the optical fiber 3071. Accordingly, a highly precise arrangement of the parts for sending the returned laser beam into the optical fiber 3071 becomes unnecessary, so an optical head 3600 which can be easily manufactured can be obtained.

Further, an optical head 3600 having a high reliability against a vibration and high signal quality can be obtained.

Metallic Mold for Production of Optical Device

Figure 56:
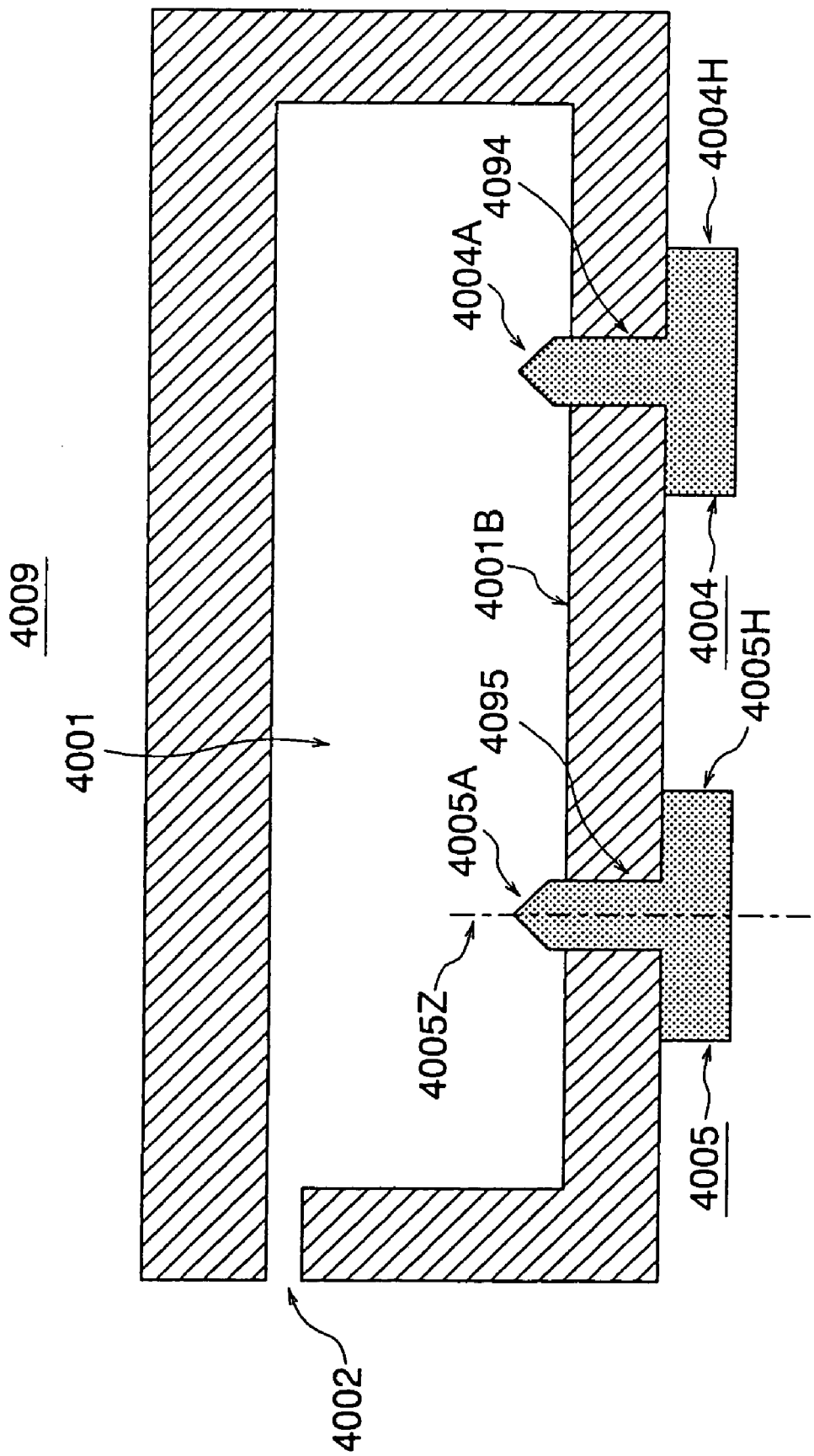
FIG. 56 is a schematic view of the configuration of an embodiment of a metallic mold for production of an optical device according to the present invention.

FIG. 56 is a schematic view of the configuration of an embodiment of a metallic mold for production of an optical device according to the present invention.

This production use metallic mold 4009 of an optical device is formed with a passageway 4002 for passing an optical material in the molten state or softened state and with a cavity 4001. Also, in the cavity 4001 of the metallic mold 4009, parts of projections 4004A and 4005A of metallic mold pins 4004 and 4005 project out from a bottom face 4001B of the cavity 4001. The bottom face 4001B of the cavity 4001 is flat, and areas around the projections 4004A and 4005A in the bottom face 4001B are flat. Also, an upper wall (upper face) of the cavity 4001 is flat.

The metallic mold pins 4004 and 4005 have heads 4004H and 4005H of flat shapes and projections 4004A and 4005A projecting out from the heads 4004H and 4005H in a vertical direction. The metallic mold pins 4004 and 4005 have identical shapes.

The heads 4004H and 4005H of the metallic mold pins 4004 and 4005 closely contact the bottom face of the metallic mold 4009, and the projections 4004A and 4005A of the metallic mold pins 4004 and 4005 partially project out into the cavity 4001 while penetrating through holes 4094 and 4095 provided in a bottom wall of the metallic mold 4009.

Figure 57:
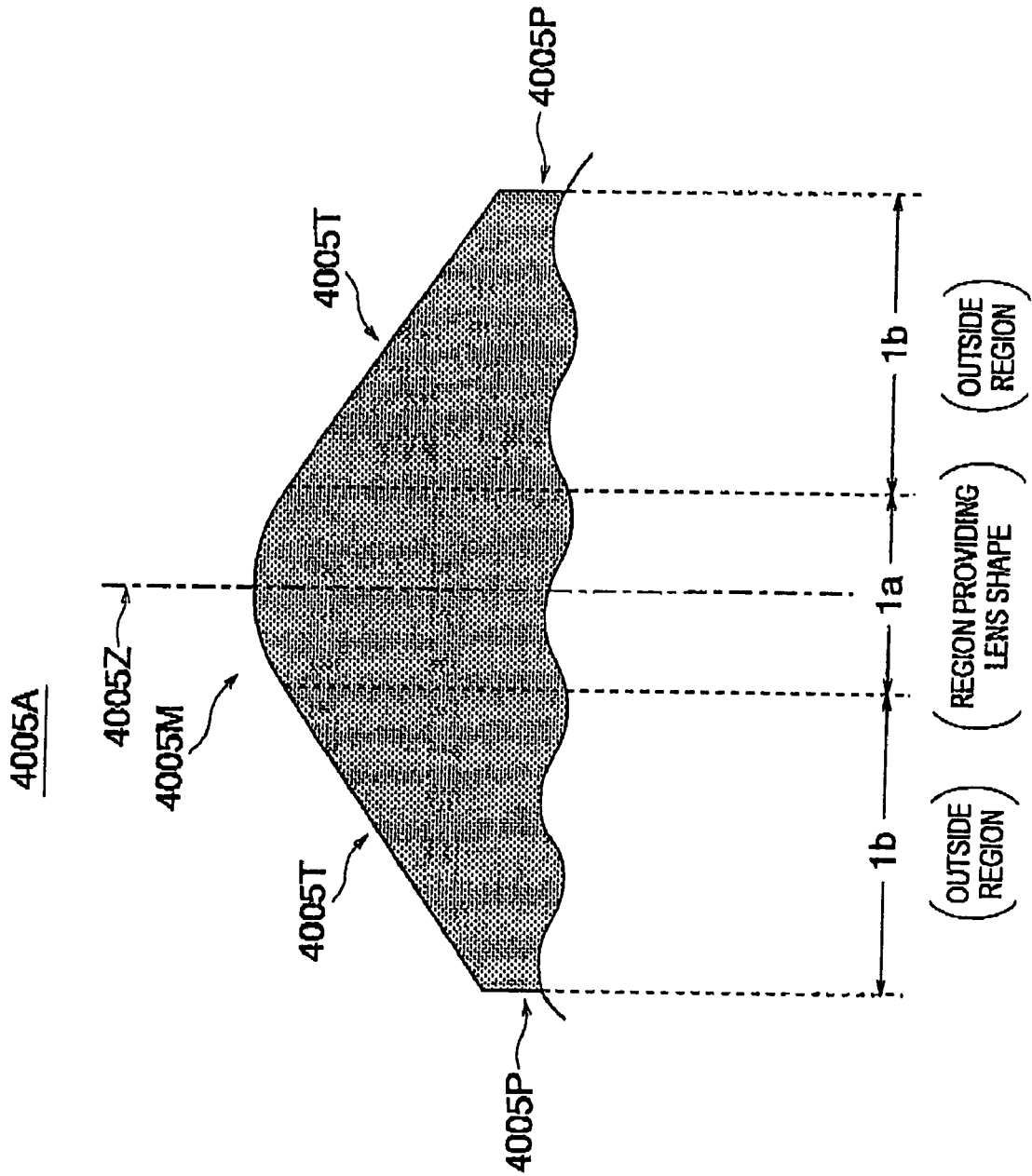
FIG. 57 is a schematic partially enlarged view of a projection of a metallic mold pin shown in FIG. 56.

FIG. 57 is a schematic enlarged view of part of the projection 4005A of the metallic mold pin 4005. The projection 4005A has a front end 4005M, a taper 4005T, and a pole 4005P. The projection 4005A has a rotationally symmetric shape about an axis 4005Z. The axis 4005Z is vertical to the head 4005H of the metallic mold pin 4005 (or a bottom plane thereof).

The boundary between the front end 4005M and the taper 4005T forms a circle having a radius of (1a)/2 from the rotational symmetry axis 4005Z. The front end 4005M is a region providing the lens shape (or a region imparting a lens function) and has a rounded projecting shape.

The taper 4005T is located between the front end 4005M and the pole 4005P. The surface thereof forms a tapered face flaring out from the front end 4005M in the direction of the pole 4005P.

The pole 4005P has a constant diameter (1a+1b×2). The pole 4005P and the taper 4005T are regions outside the region providing the lens shape.

Figure 58:
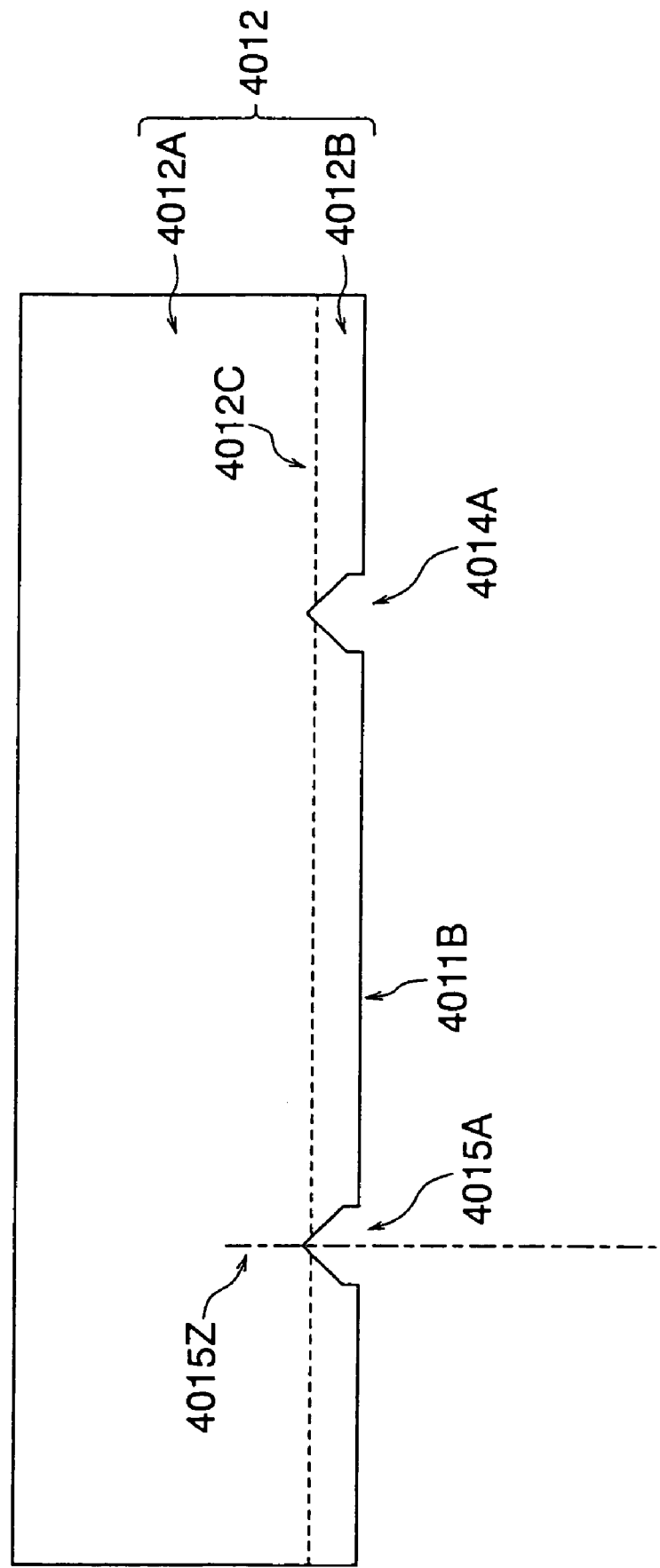
FIG. 58 is an explanatory view of a molded article produced by the metallic mold for production of the optical device shown in FIG. 56.

FIG. 58 is an explanatory view of a molded article produced by the production use metallic mold 4009 of an optical device of FIG. 56.

An optical material in the molten state or softened state is filled in the cavity 4001 of the metallic mold 4009 of FIG. 56, this optical material is hardened, the metallic mold 4009 is opened, and the molded article is taken out. Then, the portion corresponding to the passageway 4002 is removed from the molded article to obtain a molded article 4011 as shown in FIG. 58. Alternatively, by filling the optical material in the molten state or softened state, then removing the portion corresponding to the passageway 4002 from the filled optical material in the molten state or softened state and hardening the same, opening the metallic mold 4009, and taking out the molded article, a molded article 4011 as shown in FIG. 58 can be obtained.

Note that the optical material to be injected into the cavity 4001 may be for example quartz, glass, plastic, or a synthetic resin in the molten state.

The bottom face 4011B of the molded article 4011 is formed with concavities 4014A and 4015A of shapes transferred from the projections 4004A and 4005A of the metallic mold pins 4004 and 4005. The areas around the concavities 4014A and 4015A are flat. An upper side base 4012A in the base 4012 comprising the molded article 4011 is located at an upper side of a boundary 4012C, and a lower side base 4012B is located at a lower side of the boundary 4012C.

The base 4012B on the lower side of the molded article 4011 has the shapes of the poles 4004P and 4005P and tapers 4004T and 4005T of the metallic mold pins 4004 and 4005 transferred to it.

The base 4012A on the upper side of the molded article 4011 has the shapes of the front ends 4004M and 4005M of the metallic mold pins 4004 and 4005 transferred to it.

Figure 59:
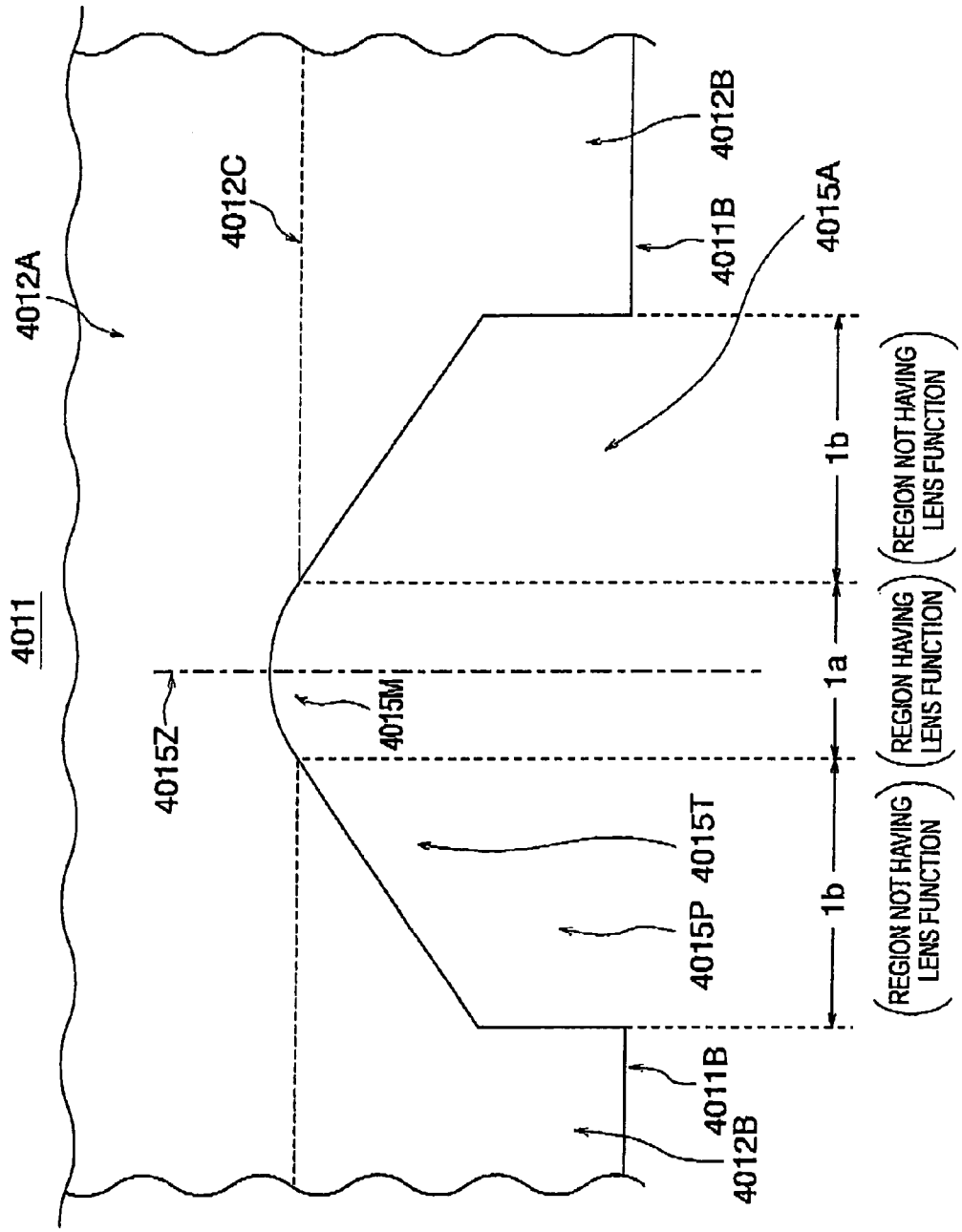
FIG. 59 is an enlarged view of a concavity of a molded article shown in FIG. 58 and the area around it.

FIG. 59 is an enlarged view of the concavity 4015A of the molded article 4011 of FIG. 58 and the area around it. The concavity 4015A has a rotationally symmetric shape about an axis 4015Z.

The base 4012B at the lower side of the molded article 4011 is formed with a hole 4015P having a constant diameter (1a+1b×2) of the shape of the pole 4005P of the metallic mold pin 4005 transferred to it and with a hole 4015T of the shape of the taper 4005T transferred to it and having a diameter decreasing in a depth direction by a constant rate. The (inner walls of) holes 4015P and 4015T of the lower side base 4012B are regions not having or substantially not having a lens function.

The upper side base 4012A of the molded article 4011 is formed with a spherical or substantially spherical hole 4015M of the shape of the front end 4005M of the metallic mold pin 4005 transferred to it and of a radius of curvature which is constant or substantially constant. The (inner wall of) hole 4015M of this upper side base 4012A is a region having the lens function. The maximum diameter of the hole 4015M is 1a.

Figure 60:
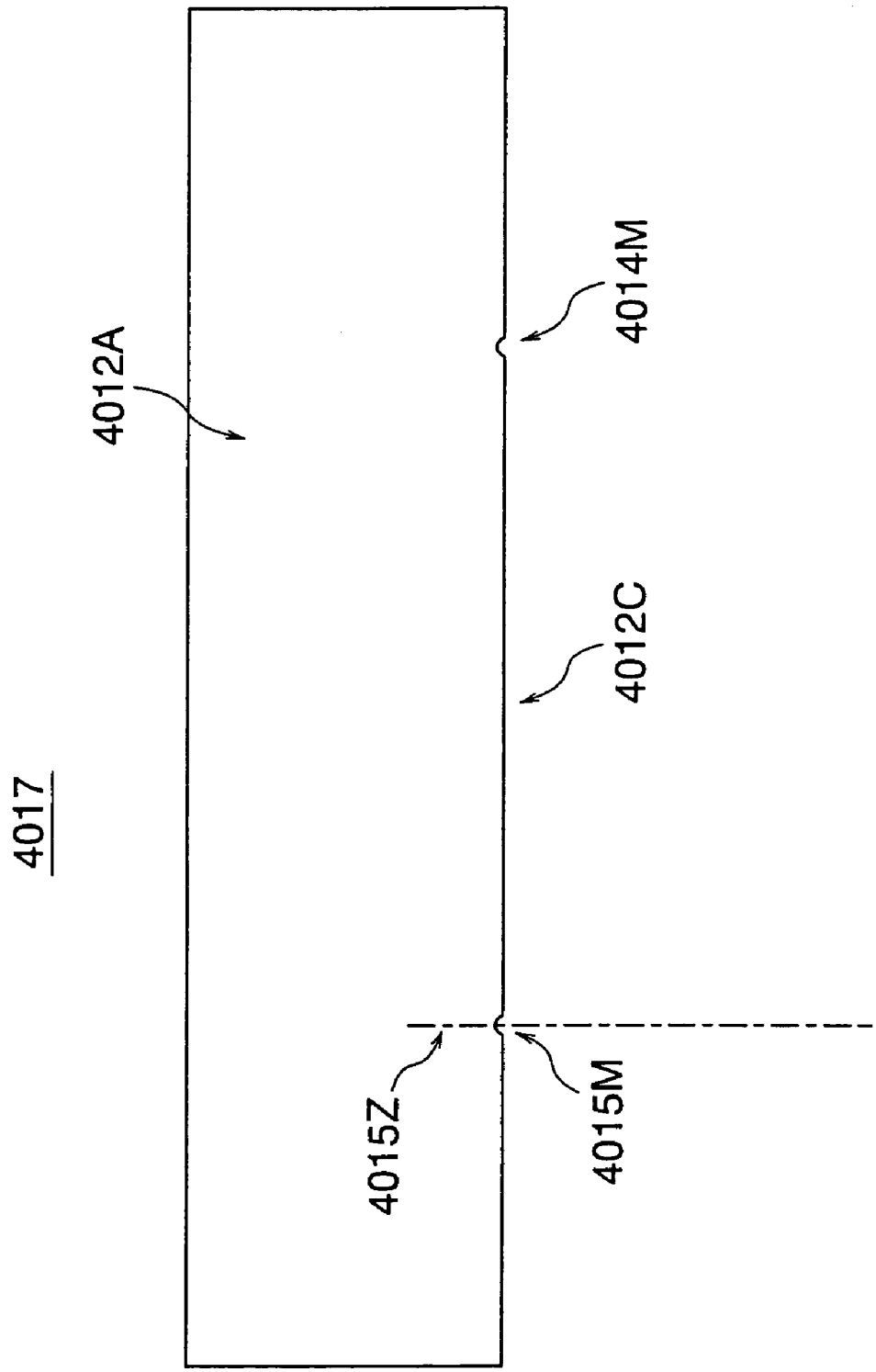
FIG. 60 is a schematic view of the configuration of a forth embodiment of an optical device according to the present invention.

FIG. 60 is a schematic view of the configuration of an optical device.

This optical device 4017 is comprised of the upper side base 4012A of the molded article 4011 of FIG. 59. By removing the lower side base 4012B from the molded article 4011 by for example polishing or grinding, the upper side base 4012A can be obtained and the optical device 4017 can be produced. The bottom face of the optical device 4017 is formed with holes 4014M and 4015M of the front ends of the concavities 4014A and 4015A. The flat portion of the bottom face of the optical device 4017 coincides with the boundary 4012C.

Figure 61:
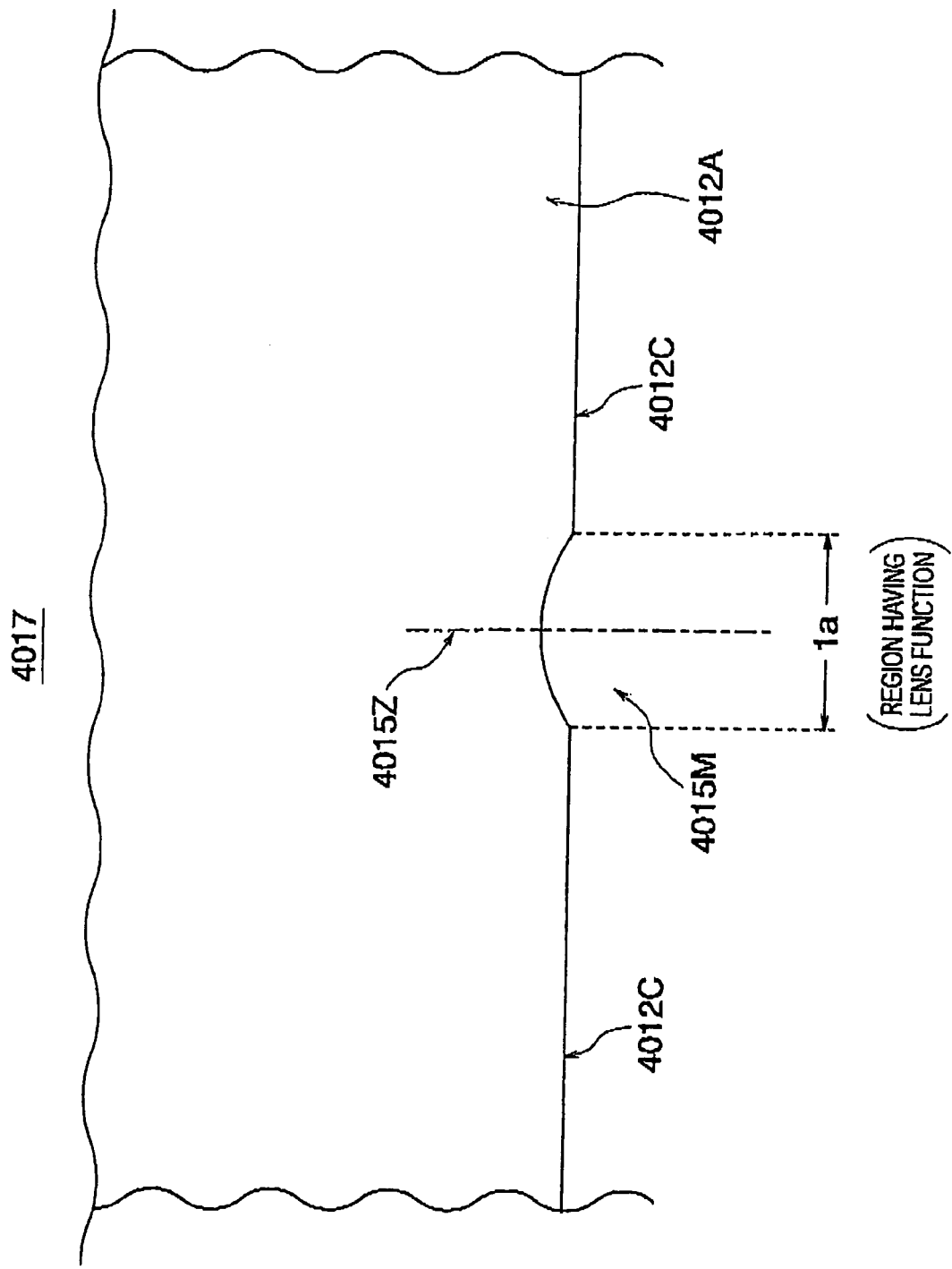
FIG. 61 is an enlarged view of a hole of the forth optical device shown in FIG. 60 and the area around it.

FIG. 61 is an enlarged view of the hole 4015M of FIG. 60 and the area around it. The hole 4015M has a rotationally symmetric shape about the axis 4015Z and forms a concave lens.

By using the metallic mold 4009 in this way, it is possible to form an optical device 4017 having a hole 4015M having a small radius or diameter and having a lens function.

Figure 62:
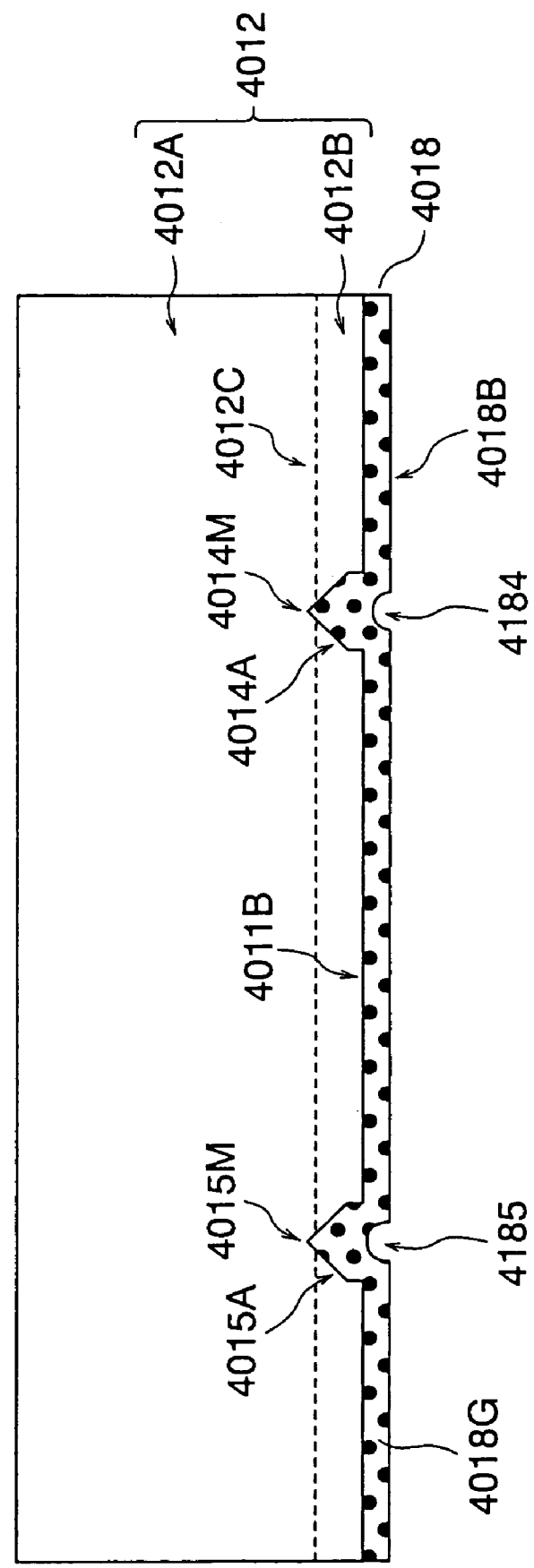
FIG. 62 is an explanatory view of a state where a layer of an optical material is laminated on a bottom face of the molded article shown in FIG. 58.
Figure 63:
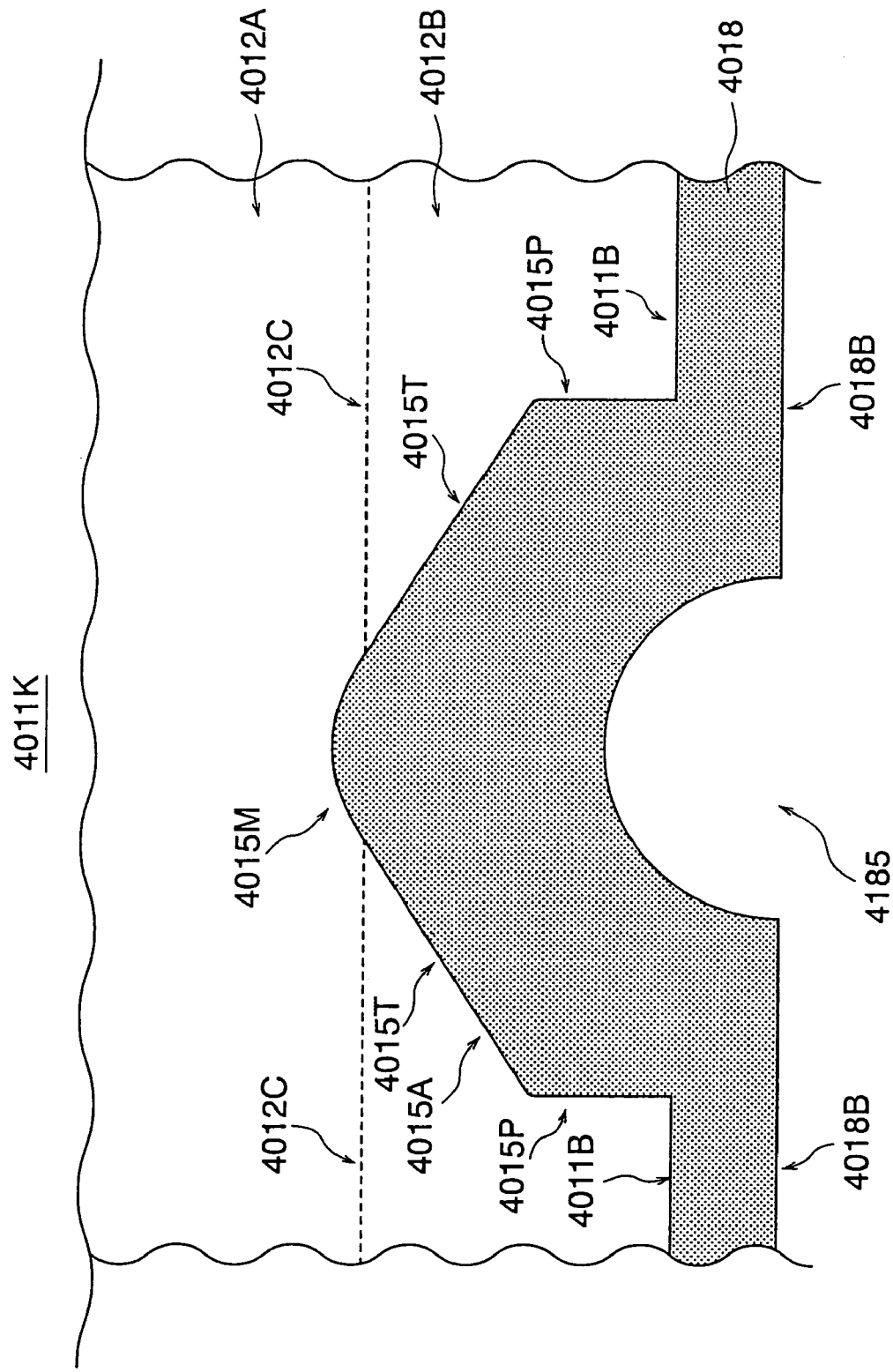
FIG. 63 is an enlarged view of the concavity of the molded article shown in FIG. 62 and the area around it.

FIG. 62 is an explanatory view of a molded article 4011K in a state where a layer 4018 of an optical material 4018G is laminated on the bottom face 4011B of the molded article 4011 of FIG. 58. FIG. 63 is an enlarged view of the concavity 4015A in FIG. 62 and the area around it. The optical material of the molded article 4011 and the optical material 4018G of the layer 4018 have different refractive indexes.

The layer 4018 of the optical material 4018G is laminated on the bottom face 4011B by the technique of for example sputtering, vapor deposition, or ion implantation. By laminating the layer 4018, the optical material 4018G can be filled in the concavities 4014A and 4015A or holes 4014M and 4015M of the molded article 4011.

The bottom face 4018B of the layer 4018 is formed with concavities 4184 and 4185 corresponding to the concavities 4014A and 4015A.

Figure 64:
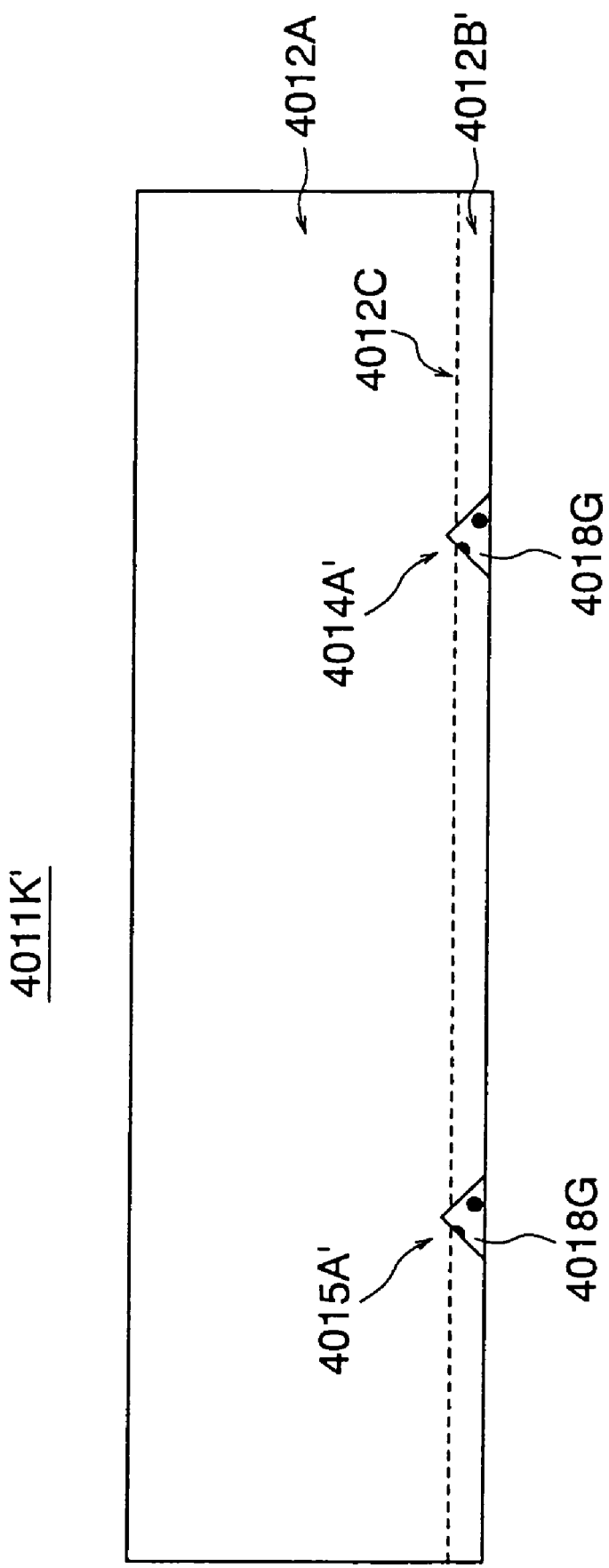
FIG. 64 is an explanatory view of an optical device produced from the molded article shown in FIG. 62.

FIG. 64 is an explanatory view of an optical device produced from the molded article 4011K of FIG. 62.

In this optical device 4011K', a bottom face 4018B of the molded article 4011K of FIG. 62 and the lower side base 4012B are polished and the polished face (lens bottom face) is flattened.

At the bottom face of the optical device 4011K, a lower side base 4012B' and the optical material 4018G filled in the holes 4014A' and 4015A' are exposed. The bottom face of the optical device 4011K' is parallel to the upper face.

Note that the base 4012B on the lower side of the molded article 4011K is polished to form the lower side base 4012B'. Along with this, the holes 4014A and 4015A become the holes 4014A' and 4015A'.

Figure 65:
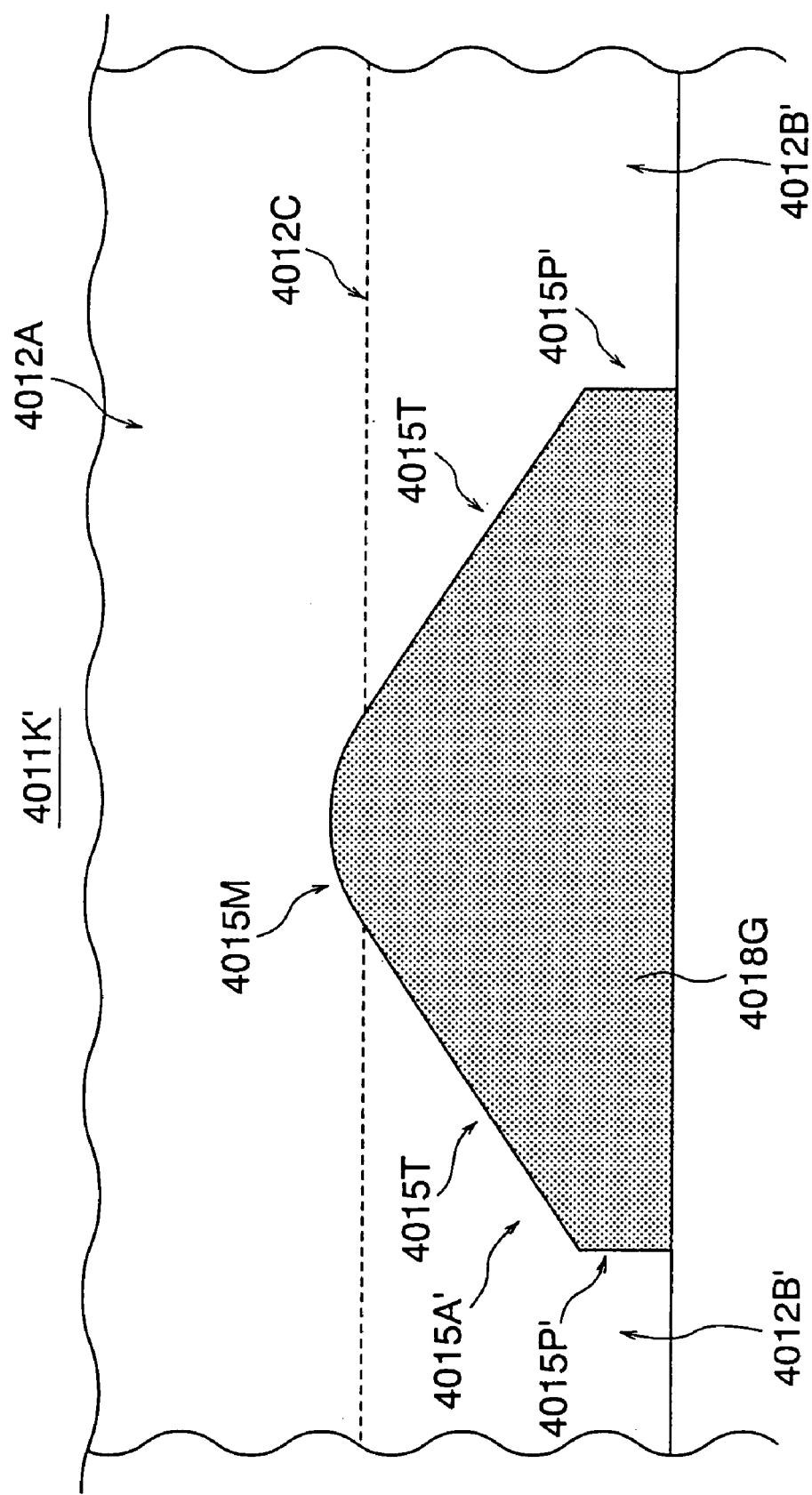
FIG. 65 is an enlarged view of the hole of the optical device shown in FIG. 64 and the area around it.

FIG. 65 is an enlarged view of the hole 4015A in FIG. 64 and the area around it.

The optical device 4011K is formed with a hole 4015P' having a constant diameter, a hole 4015T having a diameter which becomes proportionally smaller in accordance with a distance from the hole 4015P' in the depth direction, and a hole 4015M of a spherical or substantially spherical shape. The holes 4015P', 4015T, and 4015M are filled with the optical material 4018G. The optical material filled in the hole 4015M forms the convex lens. The hole 4015P' becomes shorter in length in the depth direction than the hole 4015P by the polishing of the layer 4018 and the base 4012B.

In the optical device 4011K of FIG. 65, the hole 4015P' of the constant diameter remains, but the bottom face of the optical device 4011K may be further polished so as to remove the hole 4015P' of the constant diameter. In this case, the polishing is carried out so that the polished face becomes parallel to the boundary 4012C.

Figure 66:
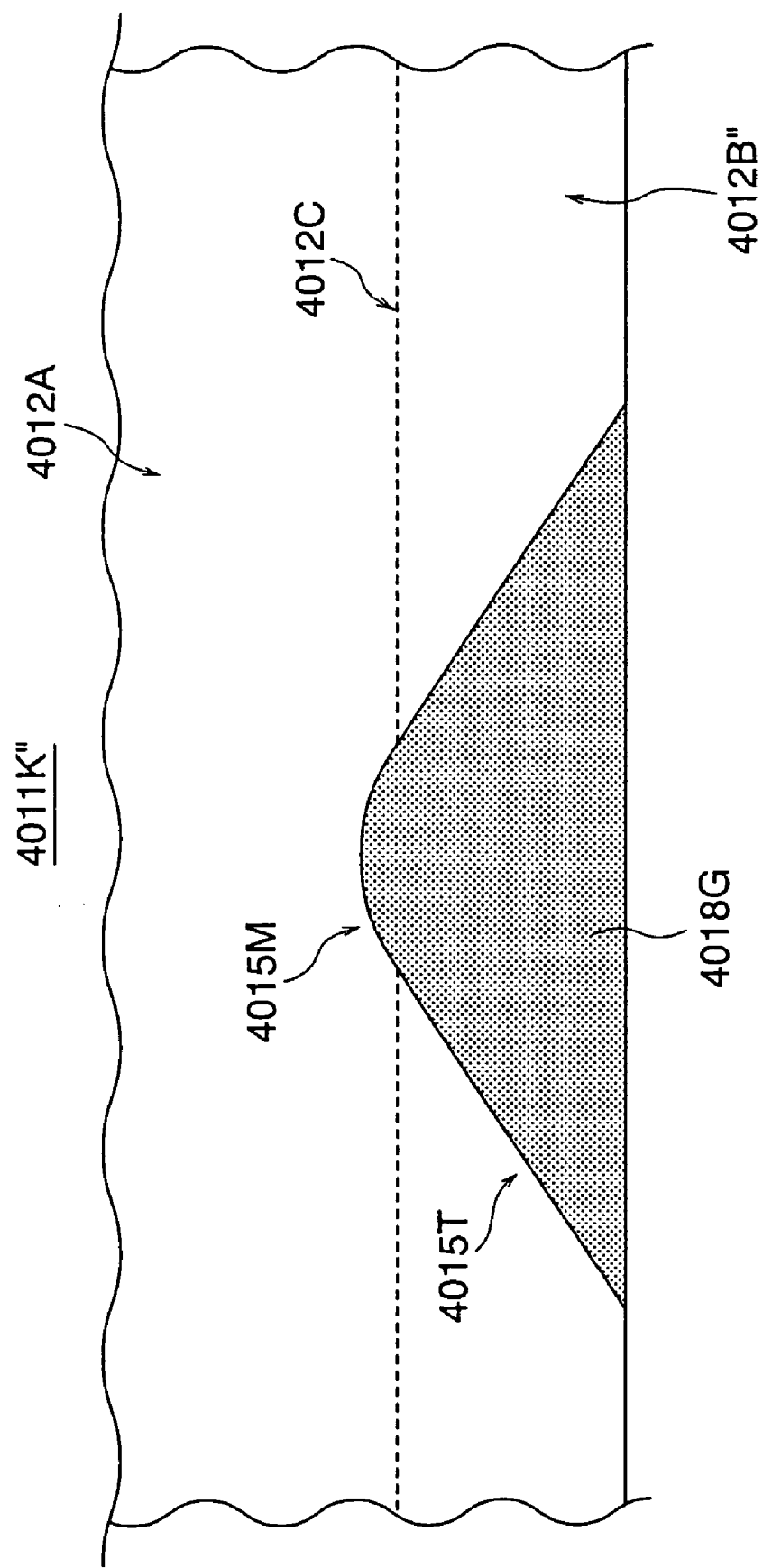
FIG. 66 is a view of the configuration of an optical device obtained by polishing the bottom face of the optical device shown in FIG. 64 and FIG. 65.

FIG. 66 is a view of the configuration of an optical device 4011K" formed by polishing the bottom face of the optical device 4011K' of FIG. 64 and FIG. 65. In this optical device 4011K", the bottom face of the optical device 4011K' is polished to remove the hole 4015P'. Note that the base 4012B at the lower side of the optical device 4011K' is polished to form a lower side base 4012B".

In the lens 4011K" of FIG. 66, the hole 4015T remains, but the bottom face of the optical device 4011K" may be further polished so as to remove the hole 4015T. In this case, the polishing is carried out so that the polished face becomes parallel to the boundary 4012C.

Figure 67:
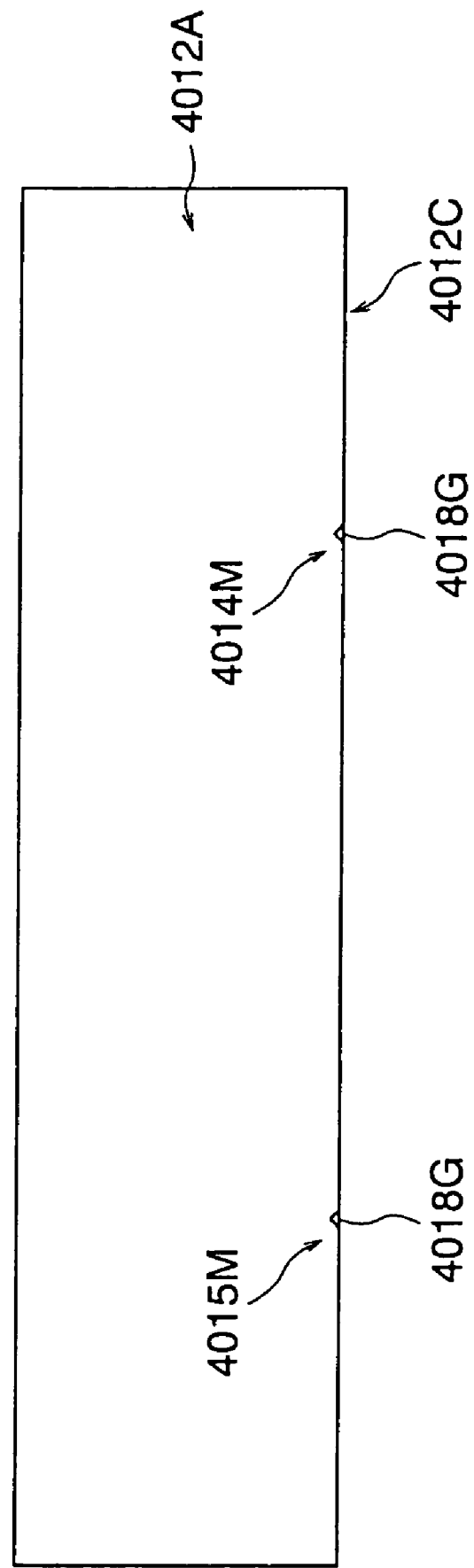
FIG. 67 is a view of the configuration of an optical device obtained by polishing the bottom face of the optical device shown in FIG. 66.

FIG. 67 is a view of the configuration of an optical device 4011N obtained by polishing the bottom face of the optical device 4011K" of FIG. 66. FIG. 68 is an enlarged view of the hole 4015M in FIG. 67.

In this optical device 4011N, the lower side base 4012B" is removed from the optical device 4011K" by polishing.

The bottom face of the optical device 4011N coincides with the boundary 4012C, and the optical material 4018G is filled in the holes 4014M and 4015M. In FIG. 68, a convex lens is formed by the optical material 4018G of the hole 4015M.

Note that the optical device 4011N may be made thinner to the desired thickness by polishing the upper face of the optical device 4011N.

Figure 69A:
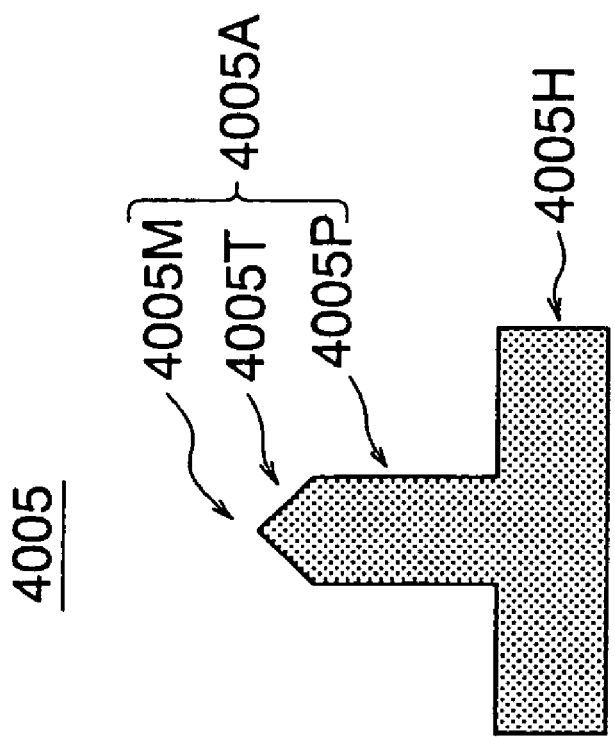
FIGS. 69A and 69B are explanatory views of a metallic mold pin.
Figure 69B:
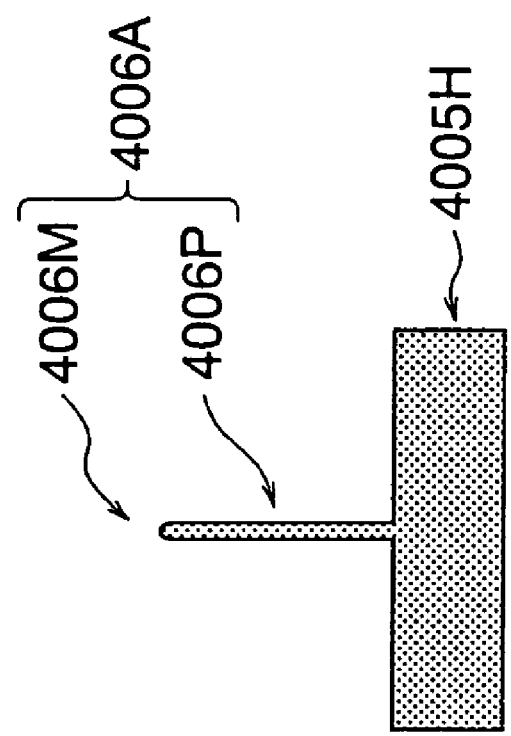

FIGS. 69A and 69B are explanatory views of a metallic mold pin.

FIG. 69A shows the metallic mold pin 4005 used in the metallic mold 4009 of FIG. 56, while FIG. 69B shows a comparison use metallic mold pin 4006 compared with the related metallic mold pin 4005.

The metallic mold pin 4005 of FIG. 69A has a head 4005H and a projection 4005A projecting out from the head 4005H in the vertical direction. The projection 4005A has a pole 4005P, taper 4005T, and front end 4005M.

On the other hand, the metallic mold pin 4006 of FIG. 69B has a head 4005H and a projection 4006A projecting out from the head 4005H in the vertical direction. The projection 4006A has a pole 4006P and a front end 4006M.

FIG. 70 is an explanatory view comparing the shapes of the projections 4005A and 4006A of the metallic mold pins 4005 and 4006 of FIGS. 69A and 69B and draws part of the projections 4005A and 4006A overlappingly.

The front end 4005M of the projection 4005A of the metallic mold pin 4005 has the same shape as the front end 4006M of the projection 4006A of the metallic mold pin 4006, and its maximum diameter is 1a.

The diameter of the pole 4005P of the projection 4005A of the metallic mold pin 4005 is a constant value (1a+1b×2), while the diameter of the pole 4006P of the projection 4006A of the metallic mold pin 4006 is the constant value (1a).

The projection 4005A of the metallic mold pin 4005 is thicker than the projection 4006A, so can improve the strength of the projection in comparison with the metallic mold pin 4006. At the same time, the machining of the front end of the projection is easy.

In the embodiment, the metallic mold 4009 uses two metallic mold pins 4004 and 4005, but a further larger number of metallic mold pins can be used as well. By arranging a plurality of metallic mold pins having sharp front ends (for example arranging them in a matrix form), it is possible to form a micro-lens array.

Note that the optical material to be injected into the cavity 4001 may be made a molten glass made of silicon oxide, while the optical material 4018G may be tantalum oxide, niobium oxide, titanium oxide, gallium phosphate (gallium phosphorus), gallium nitride, a compound of tantalum, titanium, and oxygen, and so on.

By making the refractive index of the optical material 4018G larger than the refractive index of the optical material of the base 4012, the function of a convex lens can be imparted to the holes 4014M and 4015M and the base 4012A adjacent to the related holes 4014M and 4015M.

By making the refractive index of the optical material 4018G smaller than the refractive index of the optical material of the base 4012, the function of a concave lens can be imparted to the holes 4014M and 4015M and the base 4012A adjacent to the related holes 4014M and 4015M.

The metallic mold pins 4004 and 4005 may be provided at an upper side of the metallic mold 4009 or may be provided at a lower side.

Note that the above embodiments are illustrations of the present invention. The present invention is not limited to the above embodiments.

Note that the refractive index of the glass used in the mold lens is 1.4 to 1.7 as an example.

As the optical material of the optical device according to the present invention, particularly an optical material having a large refractive index (or high refractive index) filled in the concavity of the base, use can be made of for example aluminum oxide ($Al_2O_3$ having a refractive index of for example about 1.8), titanium oxide ($TiO_2$ having a refractive index of for example about 2.5), tantalum oxide ($Ta_2O_5$ having a refractive index of about 2.4), or gallium phosphate (GaP having a refractive index of for example about 3.3). By using the above optical materials, an optical device having a large numerical aperture can be prepared.

Also, as the optical material of the optical device according to the present invention, particularly the optical material filled in the concavity of the base, use can be made of compounds such as $Ta_{X1}O_{Y1}$, $Ti_{X2}O_{Y2}$, $Al_{X3}O_{Y3}$, $Si_{X4}O_{Y4}$, $Si_{X5}N_{Y5}$, $Mg_{X6}F_{Y6}$, $Ga_{X7}N_{Y7}$, $Ga_{X8}P_{Y8}$, $Ti_{X9}Nb_{Y9}O_{Z9}$, $Ti_{Z6}Ta_{Z7}O_{Z8}$, and $Nb_{Z4}O_{Z5}$. Note X1 to X9, Y1 to Y9 and Z6 to Z9 are numerals enabling the above compounds.

Note that the above embodiments are illustrations of the present invention. The present invention is not limited to the above embodiments.

Summarizing the effects of the invention, in this way, according to the present invention, an optical device having a small size, or a small size and a large numerical aperture is provided.

Further, an optical system comprising the optical device, that is the optical device having a small size, or a small size and a large numerical aperture, is provided.

Further, a method of production of an optical device for producing such optical device, that is the optical device having a small size, or a small size and a large numerical aperture, is provided.

Still further, a mold for production of an optical device for using in such method of the optical device is provided.

What is claimed is:

1. An optical device, comprising:
    a convex lens formed with a convex curved face and a flat surface; and
    a first optical portion closely contacting a portion of the convex curved face of the convex lens, wherein;
    the first optical portion has first and second faces facing each other, a concave curved face closely contacting the portion of the convex curved face being formed in the first face, and a hole communicating with the second face being formed from a deep side of the concave curved face, and
    part of the convex curved face of the convex lens is exposed in the hole of the first optical portion,
    wherein an area around the concave curved face in the first face of the first optical portion is flat or substantially flat and located in an identical plane of said flat surface of the convex lens, and
    wherein the convex curved face of the convex lens faces away from the flat surface of the convex lens.

2. An optical device as set forth in claim 1, wherein, the convex lens has a rotationally symmetric or substantially rotationally symmetric shape surrounded or substantially surrounded by the flat surface, and an optical axis of the convex lens or an extension thereof passes through the hole.

3. An optical device as set forth in claim 2, wherein the area around the concave curved face in the first face of the first optical portion is substantially flat and substantially parallel to the flat surface of the convex lens.

4. An optical device as set forth in claim 2, wherein, the hole has a rotationally symmetric or substantially rotationally symmetric shape, the rotational symmetry axis of the hole and the optical axis of the convex lens coincide or substantially coincide, and the concave curved face forms an annular inclined face.

5. An optical device as set forth in claim 2, wherein the material of the convex lens is one of titanium oxide, tantalum oxide, niobium oxide, gallium phosphate, gallium nitride, a compound of titanium, niobium, and oxygen, a compound of titanium, tantalum, and oxygen, or silicon nitride.

6. An optical system comprising first and second optical devices, wherein;
    the first optical device has a first convex lens formed with a convex curved face and a flat surface and a first optical portion with the convex curved face of the first convex lens bonded thereto;
    the first optical portion has first and second faces facing each other, a concave curved face closely contacting a portion of the convex curved face being formed in the first face, and a hole communicating with the second face being formed from a deep side of the concave curved face;
    part of the convex curved face of the first convex lens is exposed in the first hole of the first optical portion;
    the second optical device has a second convex lens with the convex curved face formed thereon and a second optical portion with the convex curved face of the second convex lens bonded thereto; and
    the second optical portion has third and fourth faces facing each other, a concave curved face closely contacting a portion of the convex curved face of the second convex lens being formed in the third face, and the first and second optical devices being bonded so that the optical axes of the first and second convex lenses coincide or substantially coincide,
    wherein an area around the concave curved face in the first face of the first optical portion is flat or substantially flat and located in an identical plane of said flat surface of the first convex lens, and
    wherein the convex curved face of the first convex lens faces away from the flat surface of the convex lens.

* * * * *